United States Patent [19]

Aghajanian et al.

[11] Patent Number: 5,633,213
[45] Date of Patent: May 27, 1997

[54] METHOD FOR IN SITU TAILORING THE COMPONENT OF CERAMIC ARTICLES

[75] Inventors: Michael K. Aghajanian; Marc S. Newkirk; Christopher R. Kennedy; Robert C. Kantner, all of Newark, Del.; Michael A. Rocazella, Oxford, Pa.; Jerry G. Weinstein, Newark, Del.; Danny R. White, Elkton, Md.; Gerhard H. Schiroky, Hockessin; William B. Johnson, Newark, both of Del.

[73] Assignee: Lanxide Technology Company, LP, Newark, Del.

[21] Appl. No.: 356,335

[22] PCT Filed: Jun. 25, 1993

[86] PCT No.: PCT/US93/06064

§ 371 Date: Feb. 21, 1995

§ 102(e) Date: Feb. 21, 1995

[87] PCT Pub. No.: WO94/00399

PCT Pub. Date: Jan. 6, 1994

Related U.S. Application Data

[63] Continuation-in-part of Ser. No. 904,739, Jun. 26, 1992, Pat. No. 5,268,339, which is a continuation-in-part of Ser. No. 793,933, Nov. 14, 1991, Pat. No. 5,185,303, which is a continuation of Ser. No. 568,618, Aug. 16, 1990, Pat. No. 5,066,618, which is a continuation of Ser. No. 269,152, Nov. 9, 1988, abandoned, which is a continuation of Ser. No. 152,518, Feb. 5, 1988, Pat. No. 4,818,734, which is a continuation of Ser. No. 908,454, Sep. 17, 1986, abandoned.

[51] Int. Cl.$^6$ .................................................. C04B 35/65
[52] U.S. Cl. ...................... 501/87; 501/96.1; 264/82; 264/332
[58] Field of Search .............................. 501/127, 87, 96, 501/97, 98; 264/65

[56] References Cited

U.S. PATENT DOCUMENTS

| | | | |
|---|---|---|---|
| 2,741,822 | 4/1956 | Udy | 264/65 |
| 3,255,027 | 6/1966 | Talsma | 264/65 |
| 3,296,002 | 1/1967 | Hare | 501/80 |
| 3,298,842 | 1/1967 | Suefert | 501/127 |
| 3,419,404 | 12/1968 | Mao | 501/98 |
| 3,421,863 | 1/1969 | Bawa et al. | 501/128 |
| 3,437,468 | 4/1969 | Suefert | 75/235 |
| 3,473,938 | 10/1969 | Oberlin | 264/65 |
| 3,473,987 | 10/1969 | Sowards | 501/119 |
| 3,789,096 | 1/1974 | Church et al. | 264/60 |
| 3,864,154 | 2/1975 | Gazza et al. | 264/60 X |
| 3,973,977 | 8/1976 | Wilson | 501/120 |
| 4,605,440 | 8/1986 | Halverson et al. | 75/238 |
| 4,702,770 | 10/1987 | Pyzik et al. | 75/236 |
| 4,713,360 | 12/1987 | Newkirk et al. | 501/134 |
| 4,718,941 | 1/1988 | Halverson et al. | 75/236 |
| 4,806,508 | 2/1989 | Dwivedi et al. | 501/94 |
| 4,818,454 | 4/1989 | Urquhart et al. | 264/59 |
| 4,818,734 | 4/1989 | Kantner | 501/127 |
| 4,828,785 | 5/1989 | Newkirk et al. | 264/59 |
| 4,834,938 | 5/1989 | Pyzik et al. | 419/6 |
| 4,847,220 | 7/1989 | Lesher et al. | 501/89 |
| 4,851,375 | 7/1989 | Newkirk et al. | 501/127 |
| 4,853,352 | 8/1989 | Newkirk et al. | 501/88 |
| 4,859,640 | 8/1989 | Newkirk | 501/128 |
| 4,868,143 | 9/1989 | Newkirk et al. | 501/127 |
| 4,874,569 | 10/1989 | Kuszyk et al. | 264/60 |
| 4,921,818 | 5/1990 | Lesher et al. | 501/89 |
| 4,923,832 | 5/1990 | Newkirk et al. | 501/128 |
| 5,000,248 | 3/1991 | Newkirk et al. | 164/97 |
| 5,017,526 | 5/1991 | Newkirk et al. | 501/89 |
| 5,019,539 | 5/1991 | Claar et al. | |
| 5,024,794 | 6/1991 | Newkirk et al. | 264/57 |
| 5,064,788 | 11/1991 | Newkirk et al. | 501/92 |
| 5,066,618 | 11/1991 | Kantner et al. | 501/127 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0437169 | 7/1991 | European Pat. Off. . |

OTHER PUBLICATIONS

"Oxidation of Molten Aluminum Alloys, Reaction with Refractories", M. Drouzy and M. Richard, Mar. 1974, fonderie, France, No. 332, pp. 121–128.

"Refractories for Aluminum Alloy Melting Furnaces", B. Clauvaud and V. Jost, Sep. 1980, Lillian Brassinga (from French), Jan. 1985.

R. E. Loehman, "Interfacial Reactions in Ceramic–Metal Systems", Ceramic Bulletin, pp. 891–896, vol. 68, No. 4, Apr. 1989, The American Ceramic Society. Inc. Westerville, OH.

X. S. Ning, T. Okamoto, Y. Miyamoto, A. Koreeda and K. Suganuma, "reaction Chemistry at Joined Interfaces Between Silicon Nitride and Aluminum", Journal of Materials Science, pp. 4142–4149, vol. 26, 1991, Chapman and Hall, Ltd., London.

F. Weitzer, K. Remschnig, J. C. Schuster, and P. Rogl, "Phase Equilibria and Structural chemistry in the Ternary Systems M–Si–N and M–B–N (M=Al, Cu, Zn, Ag, Cd, In, Sn, Sb, Au, Tl, Pb, Bi)", Journal of Materials Research, pp. 2152–2159, vol. 5, No. 10, Oct. 1990, Materials Research Society, Pittsburgh, PA.

*Primary Examiner*—Karl Group
*Attorney, Agent, or Firm*—Kevin J. Boland

[57] ABSTRACT

There is disclosed a method for producing a self-supporting ceramic body by oxidation of a molten precursor metal with a vapor-phase oxidant to form an oxidation reaction product and inducing a molten flux comprising said molten precursor metal through said oxidation reaction product. A second metal is incorporated into said molten flux during the oxidation reaction. The resulting ceramic body includes sufficient second metal such that one or more properties of said ceramic body are at least partially affected by the presence and properties of said second metal in the metallic constituent.

21 Claims, 12 Drawing Sheets

METHOD FOR IN SITU TAILORING THE COMPONENT OF CERAMIC ARTICLES

BACKGROUND ART AND DESCRIPTION OF COMMONLY OWNED U.S. PATENTS AND PATENT APPLICATIONS

This application is a continuation-in-part of U.S. patent application Ser. No. 07/904,739, filed Jun. 26, 1992, issued Dec. 7, 1993, as U.S. Pat. No. 5,268,339, which is a continuation-in-part of U.S. patent application Ser. No. 07/793,933, filed Nov. 14, 1991, which issued on Feb. 9, 1993, as U.S. Pat. No. 5,185,303, which is a continuation of U.S. patent application Ser. No. 07/568,618, filed Aug. 16, 1990, which issued on Nov. 19, 1991, as U.S. Pat. No. 5,066,618, which is a continuation of U.S. patent application Ser. No. 07/269,152, filed Nov. 9, 1988, now abandoned, which is a continuation of U.S. patent application Ser. No. 07/152,518, filed Feb. 5, 1988, which issued on Apr. 4, 1989, as U.S. Pat. No. 4,818,734, which is a continuation of U.S. patent application Ser. No. 06/908,454, filed Sep. 17, 1986, now abandoned, all in the names of Marc S. Newkirk, et al. and all of which were originally entitled "Method for In Situ Tailoring the Metallic Component of Ceramic Articles and Articles Made Thereby". The entire disclosures of the above-mentioned Commonly Owned patent applications are incorporated by reference herein.

TECHNICAL FIELD

This invention relates to a novel method for producing self-supporting ceramic and ceramic composite bodies, formed by the oxidation reaction of a precursor metal and a vapor-phase oxidant, and having a metallic component including a second metal introduced during formation of the body and/or the formation of reaction product, each of which may impart certain desirable properties to the formed body. The invention also relates to ceramic and ceramic composite bodies produced by the novel method.

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse types of filler materials such as particulates, fibers, rods, and the like.

There are several known limitations or difficulties in substituting ceramics for metals, such as scaling versatility, capability to produce complex shapes, satisfying the properties required for the end use application, and costs. Several copending patent applications assigned to the same owner as this application (hereinafter referred to as Commonly Owned Patent Applications), overcome these limitations or difficulties and provide novel methods for reliably producing ceramic materials, including composites. The method is disclosed generically in Commonly Owned U.S. Pat. No. 4,713,360, issued on Dec. 15, 1987 and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the precursor metal, as described in Commonly Owned and Copending U.S. Pat. No. 4,853,352, which issued on Aug. 1, 1989, which is a continuation of U.S. patent application Ser. No. 06/822,999, filed Jan. 27, 1986, which is a continuation-in-part of Ser. No. 06/776,965, filed Sep. 17, 1985, now abandoned, which is a continuation-in-part of U.S. patent application Ser. No. 06/747,788, filed Jun. 25, 1985, now abandoned, which is a continuation-in-part of U.S. patent application Ser. No. 06/632,636, filed Jul. 20, 1984, now abandoned, all in the names of Marc S. Newkirk et al., and entitled "Methods of Making Self-Supporting Ceramic Materials".

This oxidation phenomenon was utilized in producing ceramic composite bodies as described in Commonly Owned U.S. Pat. No. 4,851,375, which issued on Jul. 25, 1989, from U.S. patent application Ser. No. 06/819,397, filed Jan. 17, 1986, which is a continuation-in-part of U.S. patent application Ser. No. 06/697,876, filed Feb. 4, 1985, now abandoned, both in the names of Marc S. Newkirk et al and entitled "Composite Ceramic Articles and Methods of Making Same". This Patent discloses novel methods for producing a self-supporting ceramic composite by growing an oxidation reaction product from a precursor metal into a permeable mass of filler, thereby infiltrating the filler with a ceramic matrix. The resulting composite, however, has no defined or predetermined geometry, shape, or configuration.

A method for producing ceramic composite bodies having a predetermined geometry or shape is disclosed in Commonly Owned U.S. Pat. No. 5,017,526, which issued on May 21, 1991, which is a continuation of U.S. patent application Ser. No. 06/861,025, filed May 8, 1986, now abandoned, in the names of Marc S. Newkirk et al. In accordance with the method in this U.S. Patent, the developing oxidation reaction product infiltrates a permeable preform of filler material in the direction towards a defined surface boundary. It was discovered that high fidelity is more readily achieved by providing the preform with a barrier means, as disclosed in Commonly Owned U.S. Pat. No. 4,923,832, which issued May 8, 1990, in the names of Marc S. Newkirk et al. This method produces shaped self-supporting ceramic bodies, including shaped ceramic composites, by growing the oxidation reaction product of a precursor metal to a barrier means spaced from the metal for establishing a boundary or surface. Ceramic composites having a cavity with an interior geometry inversely replicating the shape of a positive mold or pattern are disclosed in Commonly Owned U.S. Pat. No. 4,828,785, which issued on May 9, 1989, in the names of Marc S. Newkirk, et al, and in U.S. Pat. No. 4,859,640, which issued on Aug. 22, 1989, in the name of Marc S. Newkirk.

The above-discussed Commonly Owned Patents and Patent Applications disclose methods for producing ceramic and/or ceramic composite articles which overcome some of the traditional limitations or difficulties in producing ceramic articles as substitutes for metals in end-use applications.

Common to each of these Commonly Owned Patent Applications is the disclosure of embodiments of a ceramic body comprising an oxidation reaction product interconnected in one or more dimensions (usually in three dimensions) and, if desired, one or more metallic constituents or components. The volume of metal, which typically includes non-oxidized constituents of the parent metal and/or metal reduced from an oxidant or filler, depends on such factors as the temperature at which the oxidation reaction product is formed, the length of time during which the oxidation reaction is allowed to proceed, the composition of the parent metal, the presence of dopant materials, the presence of reduced constituents of any oxidant or filler materials, etc. Some of the metallic components can be isolated or enclosed, but also a substantial volume percent of metal can be interconnected and accessible, or rendered accessible, from an external surface of the ceramic body. It has been observed for these ceramic bodies that this metal-containing component or constituent (both isolated and interconnected) can range from about 1 to about 40 percent by volume, and sometimes higher. The metallic component can impart certain favorable properties to, or improve the performance of, the ceramic articles in many product applications. For example, the presence of metal in the ceramic structure may have a substantial benefit with respect to imparting fracture toughness, thermal conductivity, or electrical conductivity to the ceramic body.

The present invention discloses a method for tailoring the constituency of the metallic component (both isolated and interconnected) of such ceramics during formation of the ceramic body to impart one or more desirable characteristics to the resulting ceramic body. Thus, desired performance characteristics for the ceramic body are advantageously achieved by incorporating the desired metallic component in situ, rather than from an extrinsic source, or by post-forming.

The entire disclosures of all of the foregoing Commonly Owned Patents and Patent Applications are expressly incorporated herein by reference.

DEFINITIONS

As used herein in the specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents (isolated and/or interconnected), most typically within a range of from about 1–40% by volume, but may include still more metal.

A metal "Different" from the precursor metal is a metal which does not contain, is a primary constituent, the same metal as the precursor metal, e.g. if the primary constituent of the precursor metal is aluminum, the "different" metal could have a primary constituent of, for example, nickel.

"Flux" of molten metal means the flow or transport of molten metal within the oxidation reaction product, induced by the process conditions. "Flux" as used herein is not meant to define a substance as used in reference to classical metallurgy.

"Oxidation reaction product" means one or more metals in any oxidized state wherein the metal(s) has given up electrons to or shared electrons with another element, compound, or combination thereof. Accordingly, an "oxidation reaction product" under this definition includes the product of reaction of one or more metals with an oxidant such as oxygen, nitrogen, a halogen, sulphur, phosphorus, arsenic, carbon, boron, selenium, tellurium, and compounds and combinations thereof, for example, methane, ethane, propane, acetylene, ethylene, propylene (the hydrocarbon as a source of carbon), and mixtures such as air, $H_2/H_2O$ and $CO/CO_2$ (as sources of oxygen), the latter two (i.e., $H_2/H_2O$ and $CO/CO_2$) being useful in reducing the oxygen activity of the environment.

"Precursor metal" refers to the metal which reacts with the vapor-phase oxidant to form the polycrystalline oxidation reaction product, and includes that metal as a relatively pure metal or a commercially available metal with impurities; and when a specified metal is mentioned as the precursor metal, e.g. aluminum, the metal identified should be read with this definition in mind unless indicated otherwise by the context.

"Precursor metal Carcass" refers to any remaining precursor metal which has not been consumed during formation of the ceramic or ceramic composite body, and typically, which remains in at least partial contact with the formed ceramic or ceramic composite body. It should be understood that the carcass may also typically include some oxidized constituents of the precursor metal and/or a second or foreign metal therein.

"Reaction Product", as used herein, means the product of a reaction between a second (or different) metal (or a precursor to a second metal) or a second material with at least one of a filler material or preform and/or a matrix metal.

"Second or foreign metal" means any suitable metal, combination of metals, alloys, intermetallic compounds, or sources of either, which is, or is desired to be, incorporated into the metallic component of a formed ceramic body in lieu of, in addition to, or in combination with unoxidized constituents of the precursor metal. This definition includes intermetallic compounds, alloys, solid solutions or the like formed between the precursor metal and a second metal.

"Vapor-phase oxidant", which identifies the oxidant as containing or comprising a particular gas or vapor, means an oxidant in which the identified gas or vapor is the sole, predominant or at least a significant oxidizer of the precursor metal under the conditions obtained in the oxidizing environment utilized. For example, although the major constituent of air is nitrogen, the oxygen content of air is the sole oxidizer for the precursor metal because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant is "forming gas", which typically contains about 96 volume percent nitrogen and about 4 volume percent hydrogen.

SUMMARY OF THE INVENTION

In accordance with the present invention, there is provided a method for producing a self-supporting ceramic body by the oxidation of a precursor metal, wherein said body comprises the oxidation reaction product of a molten precursor metal with a vapor-phase oxidant, and a metallic component. A second or foreign metal is introduced or incorporated into the metallic component of the ceramic body during the formation of the ceramic body in a quantity sufficient to at least partially affect one or more properties of the ceramic body.

Generally, in the method for producing a self-supporting ceramic body by the oxidation of a precursor metal, the precursor metal is heated in the presence of a vapor-phase oxidant to form a body of molten metal. The molten precursor metal is reacted with the oxidant, at a suitable temperature, to form an oxidation reaction product, which product is maintained at least partially in contact with, and extends between, the body of molten precursor metal and the vapor-phase oxidant. At this temperature, molten precursor metal is transported through the oxidation reaction product towards the vapor-phase oxidant to continue the reaction. During the process, a second or foreign metal is incorporated into the flux of molten metal (described below in detail) and thence into the resulting metal component of the ceramic body. The resulting metallic constituent, comprising molten precursor metal and foreign metal, is transported through the oxidation reaction product, and the precursor metal oxidizes as it contacts the vapor-phase oxidant thereby continuously developing a ceramic polycrystalline body. The oxidation reaction is continued for a time sufficient to form a self-supporting ceramic body comprising the oxidation reaction product and a metallic component. The metallic component comprises nonoxidized constituents of the precursor metal and the second or foreign metal which is present in a significant quantity such that one or more properties of the ceramic body are at least partially affected by the presence and/or properties of the second or foreign metal. By reason of the process of this invention, the ceramic body exhibits one or more predetermined or desired properties.

In accordance with the present invention, the second or foreign metal is introduced into the flux of molten precursor metal during the formation of the ceramic body, and is transported with molten precursor metal through the oxidation reaction product. A portion of the precursor metal reacts with the vapor-phase oxidant to form the oxidation reaction product while the foreign metal remains substantially unoxidized by the vapor-phase oxidant, and typically is dispersed throughout the metal component. Upon formation of the ceramic body, the second or foreign metal, as a constituent of the metallic component, is an integral part of the ceramic body, thereby altering or improving one or more properties of the product.

In another aspect of the present invention, a second metal is incorporated into the flux of molten precursor metal and thence into the ceramic body. During the process, molten precursor metal is converted to oxidation reaction product, and the oxidation reaction is continued for a time sufficient to deplete the amount of precursor metal in the flux of molten metal, relative to the amount of second metal present in the flux, thereby leading to the formation of one or more desired metallic phases comprising the second metal and precursor metal within the metallic component of the ceramic body. The desired phase formation can occur at or within the range of the reaction temperature, on post-process cooling or heat treatment of the ceramic body, or during service or application of the ceramic product fabricated in accordance herewith. The resulting ceramic body has a metallic component having therein incorporated one or more metallic phases which impart one or more predetermined desired properties to the ceramic product.

The second or foreign metal may be provided for incorporation into the flux of molten metal or ceramic body by any one of several means, or a combination of means. The second or foreign metal may be alloyed with the precursor metal in a pre-process step, which is intended to include employing commercially available precursor metal alloys having a desired composition, or may be applied onto one or more surfaces of the precursor metal, preferably the growth surface of the precursor metal. During the oxidation reaction process, the second or foreign metal is incorporated into the flux of molten metal, is transported into the oxidation reaction product, and becomes an integral part of the interconnected metallic component and thus of the ceramic body.

In another embodiment, wherein a composite is formed, and the oxidation reaction product is grown into a mass of filler material or a shaped preform, the second metal may be provided by admixing it with the filler or preform material, or may be applied to one or more of its surfaces. As the oxidation reaction product infiltrates the filler material, and thus the molten metal is transported through the developing oxidation reaction product, the molten precursor metal contacts the second metal (or its source). On contact, the second metal, or some portion thereof, is introduced or incorporated into the flux of molten precursor metal and transported along with it into the ceramic matrix. The precursor metal, or a portion thereof, continues to be oxidized by the vapor-phase oxidant at the interface between the vapor-phase oxidant and previously formed oxidation reaction product, while the second metal is being transported in the flux within the formed composite. Hence the second or foreign metal is incorporated into the flux of molten metal.

In still another embodiment, the second or foreign metal is provided in the form of a compound or mixture which reacts with the molten metal, and/or dissociates under process conditions, to liberate the second metal which is then introduced or incorporated into the flux of molten metal. In addition, at least a portion of the compound may be reactive in situ with the molten metal and/or filler material or preform. Specifically, the compound may react with molten metal to form, for example, desirable intermetallics and/or other reaction products (e.g., oxides, nitrides, carbides, borides, etc.) which improve, for example, the high temperature strength, corrosion resistance, erosion resistance, electrical conductivity (or resistivity), surface hardness, etc., of the composite. For example, in the case of an aluminum parent metal, a second material comprising, for example, copper oxide, iron oxide or nickel oxide (i.e., oxides which tend to be less stable than alumina under the reaction conditions) may be mixed, homogeneously or heterogeneously, into the filler material. Under the processing conditions, the second material would react with, for example, the molten aluminum metal to liberate the second metal into the aluminum metal and, in addition, result in an aluminum oxide reinforcement phase being formed within the composite body. Another example, in the case of an aluminum metal, is a second material comprising at least one nitride such as silicon nitride (i.e., nitrides which tend to be less stable than aluminum nitride under the reaction conditions) or precursors thereof (e.g., preceramic polymers) which may be placed into the filler material or preform. Under the processing conditions, such nitride materials would react with, for example, molten aluminum metal which would liberate at least one second metal (e.g., silicon) into the metal and, in addition, result in an aluminum nitride reinforcement phase being present within at least a portion of the composite body. Further examples of desirable second material additions which can be used in combination with an aluminum metal include: boron carbide ($B_4C$), which may result in a plurality of reaction products being formed including aluminum borides, aluminum borocarbides, etc.; titanium dioxide ($TiO_2$), which may result in a plurality of reaction products being formed including $Al_2O_3$ and Al—Ti intermetallics; mixtures of materials including $Si_3N_4$ with $MoO_3$, which may result in the formation of, for example, AlN, $Al_2O_3$, $MoSi_2$, etc.; mixtures of materials including $SiO_2$ with $MoO_3$, which may result in the formation of, for example, $Al_2O_3$ and $MoSi_2$; mixtures of materials including $MgSiO_3$ or $Mg_2SiO_4$ which may result in the formation of, for example, $MgAl_2O_4$; mixtures of materials including $SiO_2$ which may result in the formation of, for example, $Si_2Al_6O_{13}$ and $TiO_2$ with $Si_3N_4$, which may result in the formation of $Al_2O_3$, AlN, Al—Ti intermetallics, etc. Various other combinations of materials should be readily apparent to those of ordinary skill in the art. In some cases, certain desirable material additions may react rapidly with, for example, the molten metal. To moderate or delay such a reaction, the desirable second material(s) may be coated by, for example, chemical vapor deposition (e.g., a CVD silicon carbide coating on $SiO_2$ or $MgSiO_3$ or $Mg_2SiO_4$), a colloidal ceramic (e.g., colloidal alumina) or use of any other appropriate means. Through the use of such a coating process, the number of desirable second materials available for use in the process is expanded. Specifically, any combination of materials which when subjected to the appropriate reaction conditions react to form reaction products which desirably impact a composite body are also the subject of this preferred embodiment.

When a second material is added to a filler material or preform, the volume percent of second material added can vary over a wide range depending on a number of different considerations. For example, if the composite formation conditions had an upper limit on the amount of filler material that could be grown into successfully by an oxidation reaction product, however such upper limit did not permit the composite body to function in a commercially acceptable manner, then an appropriate amount of a second material could be added to the filler material or preform to result in an effective increase in the volume percent of reinforcement in the composite body due to the formation of reaction product. Moreover, if a substantial amount of an appropriate second material was added to a filler material or preform, and a sufficient amount of, for example, metal was present to react with such second material, the amount of reaction product formed could cause the reaction product to form an at least partially, or substantially completely, interconnected reaction product matrix. Still further, in some cases it may be desirable for only a small amount of reaction product to be formed. Accordingly, only a small amount of second material would need to be added to the filler material or preform.

DETAILED DESCRIPTION OF THE INVENTION AND PREFERRED EMBODIMENTS

Figure 1:
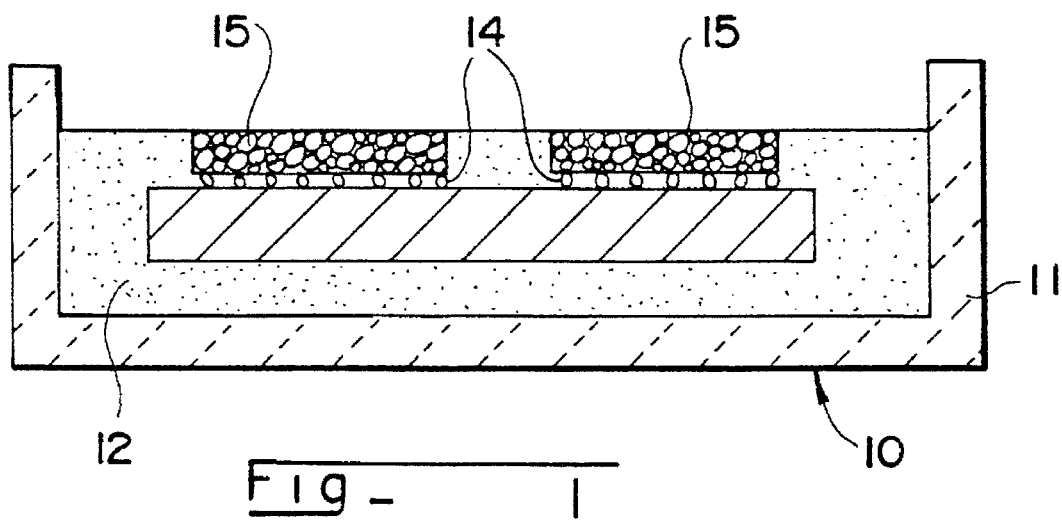
FIG. 1 is a cross-sectional schematic view of a growth lay-up used to produce the ceramic composite body of Example 10.

In accordance with the present invention, the precursor metal, which may be doped (as explained below in greater detail), and is the precursor to the oxidation reaction product, is formed into an ingot, billet, rod, plate, or the like; and is placed into a setup of an inert bed, crucible or other refractory container. It has been discovered that a second or foreign metal can be introduced into the flux of molten precursor metal during formation of the ceramic body. The resulting constituency comprising precursor metal and second metal is transported through the oxidation reaction product by the flux of molten metal which includes capillary transport of the molten metal, as described in the Commonly Owned Patent Applications. Thus, the second or foreign metal becomes an integral part of the metallic component of the formed ceramic body.

A predetermined quantity of a second metal is provided to the setup comprising precursor metal, refractory containment vessel, and optionally a composite filler material or preform, by (1) pre-process alloying or mixing of the second metal with the precursor metal or employing a commercially available alloy having a desired composition, (2) applying the second metal on one or more surfaces of the precursor metal, or (3) in cases where a composite is formed, by admixing the second metal with the filler or preform material (which techniques are discussed in greater detail below) such that a desired quantity of second metal will be introduced into the flux of molten precursor metal and transported through the oxidation reaction product which is formed as described in the above-referenced Commonly Owned Patent Applications. The ceramic body is recovered having a metallic component comprising the second metal and unoxidized constituents of the precursor metal. The metallic component of the formed ceramic body comprises interconnected and/or isolated metallic inclusions.

In the practice of the present invention, the choice of second metal is based primarily upon one or more properties sought for the ceramic body. The metal component can impart certain favorable properties to, or improve the performance of, the formed ceramic body with respect to its intended use. For example, metal in the ceramic body can beneficially improve the fracture toughness, thermal conductivity, environmental compatibility, and electrical conductivity of the ceramic body, depending upon such factors as the identity of the metal and the amount and distribution of the metal throughout the microstructure of the ceramic body. By providing a method for tailoring the constituency of the metal to include metals or metallic phases other than the precursor metal, the invention adds substantial latitude to the end-use application of such ceramic bodies. In order to impart the desired property(ies) to the formed ceramic body, the second or foreign metal remains substantially nonreactive with the vapor-phase oxidant. Therefore, second metals should be chosen which do not form an oxidation reaction product preferentially to the precursor metal under the particular process conditions used. Typically, a second metal satisfies that criterion if its oxide has a less negative free energy of formation (per oxygen atom) at a given reaction temperature than that of the precursor metal, with respect to the particular oxidation reaction occurring with the vapor-phase oxidant present.

The second or foreign metal may alloy or react with the precursor metal within the metallic component to form alloys or intermetallic compounds, which may be desirable, or impart desirable attributes to the resulting ceramic body. Thus, in accordance with the present invention, there is also provided a method for the in situ formation of one or more desired metallic phases comprising the precursor metal and the second metal. Such metallic phases include intermetallic compounds, solid solutions, alloys or combinations of each. In the present embodiment, a suitable second metal is selected satisfying the criteria set out above and, additionally, which forms one or more metallic phases in combination with the precursor metal, at a given temperature and relative concentration, which are desirable to be incorporated into the ceramic body. The second metal is provided and introduced into the flux of molten precursor metal in a lower relative concentration than is needed to form the desired metallic phase or phases. As the molten precursor metal reacts with the vapor-phase oxidant at a given reaction temperature, forming the oxidation reaction product, the relative concentration of precursor metal within the interconnected metallic constituency is depleted or reduced. Therefore, the relative concentration of the second metal increases within the metallic constituency of the ceramic body. The reaction is continued at a given reaction temperature or within a temperature range until a sufficient quantity of precursor metal has been depleted from the constituency leading to the formation of a desired metallic phase, thereby forming or enriching the desired metallic phase comprising, in some cases, the precursor metal and second metal; or, alternatively, the oxidation reaction can be continued for a time sufficient to deplete an amount of precursor metal such that on reducing the reaction temperature, or cooling the formed ceramic body, the desired metallic phase formation occurs, thus forming or enriching the desired metallic phase comprising, in some cases, the precursor metal and second metal. The resulting metallic phase or phases can either inherently impart a desirable property or properties to the ceramic body, or can be of such a composition that will form one or more additional phases at a given service temperature, thereby imparting the desired property or properties to the ceramic body. Additionally, by the manipulation of reaction parameters, i.e. reaction time, reaction temperature, etc., or by the appropriate combination or addition of certain metals, the desired metallic phase(s) can be further tailored as in, for example, precipitation hardening of a desired alloy within the metallic component.

It should be understood that in the practice of the present invention, it may be necessary to provide a greater quantity of second metal in a setup than is desired or needed to be incorporated into the metallic component of the ceramic body. The amount of second metal which needs to be provided in the setup in order that the desired quantity of second metal will be introduced into the flux of molten precursor metal, and thus be incorporated into the ceramic body, will depend primarily upon the identities and interactive properties of the second metal and precursor metal, reaction conditions, and the means by which the second metal is provided.

Since the method herein disclosed of incorporating a second metal into the metallic component of a ceramic body involves the intimate combination of two or more metals, viz. the second metal and precursor metal, it should be understood that the latitude afforded with respect to the identity, quantity, form, and/or concentration of second metal relative to the precursor metal to be employed will depend upon the metallic constituents which are desired to be incorporated into the ceramic body, and the process conditions necessary for the formation of the oxidation reaction product. The inclusion and/or formation of the desired metallic constituents will be governed, at least in part, by the properties and/or physical metallurgy associated with the combination or interaction of the particular metals present under the particular process conditions, and/or the means chosen to provide the second metal for introduction to the precursor metal. This combination of metals may effect the formation of various metallic phases, including alloys, intermetallic compounds, solid solutions (including relatively pure elements), precipitates, or mixtures thereof, and may be affected by the presence and concentration of impurities or dopant materials. Thus, the constituency resulting from combination of the metals in the practice of the present invention can have properties which vary significantly from those of the several metals individually. Such combinations in the form of metallic phases comprising the precursor metal and second metal incorporated into the metallic component of the formed ceramic body can advantageously affect properties of the ceramic body. For example, the combination of second metal and precursor metal may form metallic phases such as solid solutions, alloys or one or more intermetallic compounds which have a melting point above that of the precursor metal, thereby, for example, expanding the service temperature range of a ceramic body having such a metallic phase incorporated therein. Moreover, it should be understood that in some cases the melting point of the resulting metallic phase or phases may be above the operable temperature range for the formation of the intended oxidation reaction product. Additionally, the formation of metallic phases resulting from certain combinations of parent and second metals may impart added viscosity to the resulting molten metal at the reaction temperature, as compared with molten precursor metal without the addition of second metal at the same temperature, such that the transport of molten metal through the formed oxidation reaction product substantially slows or does not occur. As such, care should be taken with respect to designing a desired system which includes such a metallic combination in order to ensure that the metallic constituency remains sufficiently liquid while the oxidation reaction product is being formed to facilitate the continued flux of molten metal at a temperature which is compatible with the parameters of the oxidation reaction process.

When providing the second metal by pre-process alloying with the precursor metal, or employing a commercially available alloy of desired composition, introduction of the second metal into the flux of molten metal is effected by the transport of molten metal from the body of molten metal into the formed oxidation reaction product. Thus, introduction will depend upon the constituency of the molten metal which is transported from the body of molten metal, formed in the heating step, into the formed oxidation reaction product. This transported constituency will be determined by such factors as the homogeneity of the metallic constituency, and the metallic phases associated with the particular combination of metals chosen at a given reaction temperature and relative concentration.

In embodiments of the present invention wherein the second metal, or source of same, is provided external to the precursor metal, additional parameters should be considered. More specifically, one should consider the metallurgical properties associated with the contact of the molten precursor metal with the second metal in order to effect introduction of the desired quantity of second metal into the flux of molten precursor metal. When the second metal is provided external to the precursor metal body, introduction may be effected on contact of the molten precursor metal with the second metal by dissolution of one metal into the other, interdiffusion of the two metals, or reaction of the two metals as in the formation of one or more intermetallic compounds or other metallic phases between the precursor metal and second metal. Thus, the introduction and/or rate of introduction of second metal into the flux of molten precursor metal will depend on one or more of several such metallurgical factors. Such factors include the physical state of the second metal at the particular reaction temperature, the rate of interdiffusion between the precursor metal and second metal, the degree and/or rate of solubility of the second metal into the precursor metal or the precursor metal into the second metal, and the formation of intermetallics or other metallic phases between the precursor metal and second metal. Thus, care should be taken to ensure that the reaction temperature is maintained such that the metallic constituency, resulting from the introduction of second metal into the flux of molten precursor metal, remains at least partially liquid to facilitate the transport of the metallic constituency into the formed oxidation reaction product, and thus enable contact of the molten precursor metal with the vapor-phase oxidant in order to facilitate growth of the ceramic body. In accordance with the present invention, the introduction of second metal into the flux of molten precursor metal, or the depletion of precursor metal from the flux of molten metal due to formation of the oxidation reaction product, can result in the formation of one or more metallic phases comprising the precursor metal and second metal. However, certain combinations of precursor metal and second metal may impart significant viscosity to the flux, or otherwise impede the flux of molten metal such that transport of metal toward the vapor-phase oxidant ceases prior to the complete development of the desired oxidation reaction product. In such cases, the formation of the desired oxidation reaction product may be halted or substantially slowed by those phenomena and, therefore, care should be exercised to avoid the premature formation of such constituents.

As explained above in accordance with the present invention, the desired quantity of a second or foreign metal may be provided by alloying with the precursor metal prior to the fabrication process. For example, in a system wherein aluminum (or an aluminum-based metal) is the precursor metal employing air as the vapor-phase oxidant to form an alumina oxidation reaction product, second metals such as titanium, copper, nickel, silicon, iron, or chromium may be alloyed, in amounts which may be limited and/or dictated as discussed above, with the aluminum precursor metal. It may be desirable, for example, to include copper, or a metallic phase including copper, in the metallic component of the ceramic body. In order for the metallic component to impart one or more properties to, or improve the performance of, a ceramic body, it is desirable that properties of the particular metal, combination of metals or metallic phases incorporated into the metallic component do not substantially degrade at the service temperature of the ceramic product. Certain aluminum-copper metallic phases, for example, $Cu_gAl_4$, have a service temperature range which is higher than that of aluminum. Thus, by incorporating or enriching such a phase within the interconnected metallic component of the ceramic, the improved performance of the ceramic due to the presence of the metallic component will be exhibited at increased service temperatures. To incorporate a suitable quantity of copper in order to effect the desired phase transformation(s) to obtain the desired aluminum-copper metallic phase $Cu_gAl_4$, the copper may be alloyed with the aluminum precursor metal, for example, at 10% by weight of the total copper-aluminum alloy. The alloy comprising the aluminum precursor metal and the second metal copper is heated below the melting point of the intended oxidation reaction product, alumina, but above the melting point of the copper-aluminum alloy (as described in above-referenced Commonly Owned Patent Applications). When the molten aluminum precursor metal is contacted with the oxidant, there is formed a layer comprising alumina as the oxidation reaction product. Molten alloy is then transported through the formed oxidation reaction product, towards the oxidant. As the molten alloy contacts the air oxidant, the aluminum metal constituent of the alloy is at least partially oxidized thus forming a progressively thicker layer of oxidation reaction product. The second or foreign metal copper, also being a constituent of the molten alloy, is likewise transported into the formed oxidation reaction product. However, since the copper is not depleted from the ceramic body by the oxidation reaction, the relative concentration of the copper increases as the aluminum is oxidized and thus depleted from the flux of molten metal. The oxidation of the aluminum metal is continued for a time sufficient to form the desired ceramic body and to achieve the appropriate metallic constituency for the formation of the desired metallic phases. Referring to a binary metallic phase diagram for a copper aluminum system, the $Cu_9Al_4$ phase is formed in a relative concentration range of approximately 80–85% copper, balance aluminum, in a service temperature range for the ceramic body not exceeding approximately 780° C.

Where the desired quantity of second or foreign metal is applied, as in layering, or contacted with, one or more surfaces of an aluminum precursor metal, and the precursor metal is reacted with air as the vapor-phase oxidant, suitable second metals, include for example, silicon, nickel, titanium, iron, copper, or chromium, preferably in powder or particulate form. For example, nickel or a metallic phase containing nickel may be a desirable constituent in a ceramic body fabricated in accordance with the present invention. Nickel-aluminide intermetallics such as $NiAl$, $Ni_2Al_3$ or $NiAl_3$ might be desirable to improve the corrosion resistance of the metallic component of the ceramic body. Therefore, in order to effect the introduction of a suitable quantity of nickel to form or enrich the desired nickel-aluminum metallic phases, a predetermined quantity of powdered nickel metal is dispersed over the growth surface of the aluminum precursor metal body. As the molten aluminum precursor metal contacts the nickel metal, an amount of the nickel metal is introduced into the flux of molten aluminum precursor metal. The introduced nickel metal is then transported, as a constituent of the flux of molten metal, into the alumina oxidation reaction product. Analogous to the copper example above, as the aluminum metal is oxidized, the relative concentration of nickel metal within the forming ceramic body increases, and the appropriate composition is achieved to form the desired phases. Where the product is a ceramic composite, fabricated by growing the oxidation reaction product into a mass or aggregate of filler material, or a permeable preform, placed adjacent to the precursor metal, the second or foreign metal may be provided by admixing with the filler material or preform material, or applied, as in layering, to one or more surfaces of same. For example, if the desired composite product comprises an alumina ceramic matrix, fabricated by the oxidation of aluminum precursor metal (with a vapor-phase oxidant) into a bed of silicon carbide particles, which may be preformed into a green body, powders or particles of second metals such as titanium, iron, lead, nickel, copper, chromium, or silicon can be admixed with the silicon carbide filler material. For example, it may be desirable to incorporate an amount of silicon into the ceramic body in order to improve the compatibility of the metallic component of the composite ceramic body with high temperature applications. Therefore, a quantity of silicon metal (i.e., elemental silicon), which may be limited or governed as discussed above, is admixed with the silicon carbide filler material. As the formed alumina oxidation reaction product embeds the silicon carbide particles, and the molten aluminum is transported therethrough, the molten aluminum metal contacts the admixed silicon metal. A quantity of silicon metal is thus introduced into the continued flux of molten metal, and thus into the forming ceramic composite body. In the present embodiment, the portion of the second metal which is not introduced into the flux of molten metal, but is included in that portion of the mass of filler or preform which is infiltrated by the oxidation reaction product, may be present in the composite body as isolated inclusions of second metal. The second or foreign metal may also be applied on only one or more surfaces of a mass or aggregate of filler or shaped preform. For this composite example, the silicon particulate or powder is applied as a layer onto a surface of the silicon carbide particles or a preform comprising particles of same. As the flux of molten aluminum precursor metal contacts this surface, a quantity of silicon metal is introduced into the flux and becomes a part of the metallic component in the recovered ceramic composite body. Application of second metal to one or more surfaces of a mass of filler or preform in accordance with the present embodiment can result in a composite body wherein the exposed portions of the metallic component are rich in the second or foreign metal relative to other portions of metallic component within the formed ceramic composite body.

In the practice of the present invention wherein the second or foreign metal is provided external to the precursor metal, the second or foreign metal can be provided in the form of a mixture or compound which may react with the molten metal, and/or dissociate under process conditions, to liberate the second or foreign metal which is then introduced, as discussed above, into the flux of molten metal. Such a compound may be a metal oxide which is reducible by, or will react with, the precursor metal to liberate the second metal. For example, if a ceramic composite body is desired comprising an alumina ceramic matrix, fabricated by the oxidation of aluminum precursor metal, to embed particles of alumina filler material, an oxide (i.e., a single, binary, ternary or higher order oxide) of a desired second metal such as silicon, nickel, iron, or chromium may be admixed with the alumina bedding material, or layered on top of the aluminum precursor metal. For example, if chromium is desired as a second metal, chromium metal can be introduced into the flux of molten metal by admixing chrome oxide with a bedding material. When the flux of the molten aluminum contacts the chrome oxide, the molten aluminum will reduce the chrome oxide and liberate chromium metal. A quantity of the liberated chromium metal is then introduced into the flux of molten aluminum, as discussed above, and transported through and/or into the oxidation reaction product which is formed as the molten aluminum precursor metal continues to contact the vapor-phase oxidant.

In addition, at least a portion of the compound may be reactive in situ with the molten metal and/or filler material or preform. Specifically, the compound may react with molten metal to form, for example, desirable intermetallics and/or other reaction products (e.g., oxides, nitrides, carbides, borides, etc.) which improve, for example, the high temperature strength, corrosion resistance, erosion resistance, electrical conductivity (or resistivity), surface hardness, etc., of the composite. For example, in the case of an aluminum parent metal, a second material comprising, for example, copper oxide, iron oxide or nickel oxide (i.e., oxides which tend to be less stable than alumina under the reaction conditions) may be mixed, homogeneously or heterogeneously, into the filler material. Under the processing conditions, the second material would react with, for example, the molten aluminum metal to liberate the second metal into the aluminum metal and, in addition, result in an aluminum oxide reinforcement phase being formed within the composite body. Another example, in the case of an aluminum metal, is a second material comprising at least one nitride such as silicon nitride (i.e., nitrides which tend to be less stable than aluminum nitride under the reaction conditions) or precursors thereof (e.g., preceramic polymers) which may be placed into the filler material or preform. Under the processing conditions, such nitride materials would react with, for example, molten aluminum metal which would liberate at least one second metal (e.g., silicon) into the metal and, in addition, result in an aluminum nitride reinforcement phase being present within at least a portion of the composite body. Further examples of desirable second material additions which can be used in combination with an aluminum metal include: boron carbide ($B_4C$), which may result in a plurality of reaction products being formed including aluminum borides, aluminum borocarbides, etc.; titanium dioxide ($TiO_2$), which may result in a plurality of reaction products being formed including $Al_2O_3$ and Al—Ti intermetallics; mixtures of materials including $Si_{34}$ with $MoO_3$, which may result in the formation of, for example, AlN, $Al_2O_3$, $MoSi_2$, etc.; mixtures of materials including $SiO_2$ with $MoO_3$, which may result in the formation of, for example, $Al_2O_3$ and $MoSi_2$; mixtures of materials including $MgSiO_3$ or $Mg_2SiO_4$ which may result in the formation of, for example, $MgAl_2O_4$; mixtures of materials including $SiO_2$ which may result in the formation of, for example, $Si_2Al_6O_{13}$ and $TiO_2$ with $Si_3N_4$, which may result in the formation of $Al_2O_3$, AlN, Al—Ti intermetallics, etc. Various other combinations of materials should be readily apparent to those of ordinary skill in the art. In some cases, certain desirable material additions may react rapidly with, for example, the molten metal. To moderate or delay such a reaction, the desirable second material(s) may be coated by, for example, chemical vapor deposition (e.g., a CVD silicon carbide coating on $SiO_2$, $MgSiO_3$ or $Mg_2SiO_4$), a colloidal ceramic (e.g., colloidal alumina) or use of any other appropriate means. Through the use of such a coating process, the number of desirable second materials available for use in the process is expanded. Specifically, any combination of materials which when subjected to the appropriate reaction conditions react to form reaction products which desirably impact a composite body are also the subject of this preferred embodiment.

When a second material is added to a filler material or preform, the volume percent of second material added can vary over a wide range depending on a number of different considerations. For example, if the composite formation conditions had an upper limit on the amount of filler material that could be grown into successfully by an oxidation reaction product, however such upper limit did not permit the composite body to function in a commercially acceptable manner, then an appropriate amount of a second material could be added to the filler material or preform to result in an effective increase in the volume percent of reinforcement in the composite body due to the formation of reaction product. Moreover, if a substantial amount of an appropriate second material was added to a filler material or preform, and a sufficient amount of, for example, metal was present to react with such second material, the amount of reaction product formed could cause the reaction product to form an at least partially, or substantially completely, interconnected reaction product matrix. Still further, in some cases it may be desirable for only a small amount of reaction product to be formed. Accordingly, only a small amount of second material would need to be added to the filler material or preform.

In certain cases where a reaction product is formed subsequent to substantially complete infiltration of a filler material mixture or preform, the reaction product, in combination with any liberated components (e.g., metal(s)) into the metal, may actually occupy a smaller volume than the materials which reacted to form the reaction product(s). In such cases, it may be desirable to contact the formed composite with a source of additional metal. Specifically, if porosity was not a desired constituent in the formed composite, then the source of additional metal could flow into the already existing metallic constituent and resupply or replenish any metallic constituent used to form reaction product. The source of additional metal could have a composition which was substantially the same as, or substantially different from, the composition of the metallic constituent of the formed composite body. It has been discovered that the amount of additional metal supplied and the precise location of the additional metal can favorably influence the resultant composite body, as shown in some of the Examples appended hereto.

Moreover, the above-discussed alteration methods, the amount or portion of the composite body and/or filler material which is to be converted or altered can be varied. Thus, each of the above-discussed processes could be limited to primarily a surface area of a composite body, or, if conversion was permitted to occur for a sufficient amount of time, substantially complete conversion could occur. Moreover, factors such as temperature, time, atmospheric pressure, atmospheric composition, reacting species, paticulate size or morphology of the reacting species, etc., could enhance or reduce the rate of conversion of at least a portion of the formed composite body. Moreover, depending on a desired result, composite bodies may be modified using any combination of the modification techniques discussed herein.

The objective of forming a heat treatable metal in the formed composite body may also, in certain circumstances, influence the selection of a second material (or a precursor to a second material). For example, a second material could be added to a preform or a filler material, such second material providing (1) a second metal to the metal which enhances the ability of the metal to be heat-treated and (2) desirable reaction product(s) due to a reaction of, for example, metal with the second material.

In the above discussed alteration methods, it is possible to conduct such alterations in an atmosphere which is substantially similar to, or substantially different from, the atmosphere which is present during the formation of the composite bodies. To select an appropriate atmosphere, a number of different criteria should be examined including whether any desirable/undesirable reactions may occur between any constituent in the composite body and the atmosphere, whether the atmosphere favorably/unfavorably influences the formation of any desirable/undesirable reaction products in the composite body, etc. Accordingly, depending on a totality of the circumstances, any one of an oxidizing atmosphere, a reducing atmosphere and/or an inert atmosphere may be used in combination with various preferred embodiments of the invention.

As explained in the Commonly Owned Patent Applications, dopant materials, used in conjunction with the precursor metal, favorably influence the oxidation reaction process, particularly in systems employing aluminum as the precursor metal. Additionally, in the practice of the present invention, in certain cases a dopant material may be chosen to, in addition to its doping qualities, provide a second or foreign metal or a source of the same which is desirable to be incorporated into the metallic component of the ceramic body. For example, silicon is a useful dopant material and can also impart desirable characteristics to the metallic component of the ceramic body such as improved high temperature performance in certain systems. Therefore, silicon can be employed in elemental form, or as silicon dioxide, in accordance with the above embodiment, to serve the dual purpose of acting as a dopant material and supplying a source of second metal. However, in some cases, a suitable dopant material will not be available which supplies both the necessary doping characteristics and a source of the desired second or foreign metal. Therefore, a dopant material will need to be used in conjunction with the second or foreign metal. It should be noted, however, that when employing a dopant material in conjunction with a second metal, the presence of each may have an effect upon the function and/or performance of the other. Thus, in practicing the embodiment of the present invention, wherein it is desirable to effect the formation of one or more metallic phases comprising the precursor metal and second metal, and, additionally, a separate dopant material is employed, the respective concentrations of precursor metal and second metal necessary to effect formation of the desired phase(s) may be different than the concentrations necessary to effect formation of the phases in the binary system comprising the precursor metal and second metal. Therefore, care should be taken to consider the effect of all metals present in a specific case when designing a system wherein it is desired to effect the formation of one or more metallic phases within metallic component of the ceramic body. The dopant or dopants used in conjunction with the precursor metal, as in the case of second metals, (1) may be provided as alloying constituents of the precursor metal, (2) may be applied to at least a portion of the surface of the precursor metal, or (3) may be applied to or incorporated into part or all of the filler material or preform, or any combination of two or more of techniques (1), (2), or (3) may be employed. For example, an alloyed dopant may be used solely or in combination with a second externally applied dopant. In the case of technique (3), wherein additional dopant or dopants are applied to the filler material, the application may be accomplished in any suitable manner as explained in the Commonly Owned Patent Applications.

The function or functions of a particular dopant material can depend upon a number of factors. Such factors include, for example, the particular combination of dopants when two or more dopants are used, the use of an externally applied dopant in combination with a dopant alloyed with the precursor metal, the concentration of dopant employed, the oxidizing environment, process conditions, and as stated above, the identity and concentration of the second metal present.

Dopants useful for an aluminum precursor metal, particularly with air as the oxidant, include magnesium, zinc, and silicon either alone or in combination with each other or in combination with other dopants, as described below. These metals, or a suitable source of the metals, may be alloyed into the aluminum-based precursor metal at concentrations for each of between about 0.1–10% by weight based on the total weight of the resulting doped metal. These dopant materials or a suitable source thereof (e.g., MgO, ZnO, or $SiO_2$) may be used externally to the precursor metal. Thus an alumina ceramic structure is achievable for an aluminum precursor metal using air as the oxidant by using MgO as a dopant in an amount greater than about 0.0008 grams per gram of precursor metal to be oxidized, and greater than about 0.003 grams per square centimeter of precursor metal upon which the MgO is applied. However, the concentration of dopant needed, as discussed above, may depend upon the identity, presence, and concentration of a second or foreign metal.

Additional examples of dopant materials for aluminum precursor metal include sodium, germanium, tin, lead, lithium, calcium, boron, phosphorus, and yttrium which may be used individually or in combination with one or more dopants depending on the oxidant, identity and quantity of second or foreign metal present and process conditions. Rare earth elements such as cerium, lanthanum, praseodymium, neodymium, and samarium are also useful dopants for this system, and herein again especially when used in combination with other dopants. All of the dopant materials, as explained in the Commonly Owned Patent Applications, are effective in promoting polycrystalline oxidation reaction growth for the aluminum-based precursor metal systems.

As disclosed in the above-discussed Copending U.S. Application Serial No. 861,024, a barrier means may be used to inhibit growth or development of the oxidation reaction product beyond the barrier. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers include calcium sulfate (Plaster of Paris), calcium silicate, and Portland cement, and combinations thereof, which typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the preform comprises alumina and the resulting ceramic comprises alumina, the barrier may be admixed with alumina particulate, desirably having a mesh size of about 20–1000. Other suitable barriers include refractory ceramics or metal sheaths, which are open on at least one end to permit the vapor-phase oxidant to permeate the bed and contact the molten precursor metal. In certain cases, it may be possible to supply a source of second metal with the barrier means. For example, certain stainless steel compositions, when reacted under certain oxidizing process conditions as at a high temperature in an oxygen-containing atmosphere, form their component oxides such as iron oxide, nickel oxide, or chromium oxide depending on the composition of the stainless steel. Thus, in some cases, a barrier means such as a stainless steel sheath may provide a suitable source of second or foreign metal, and which may effect introduction of second metals such as iron, nickel, or chromium into the flux of molten metal on contact of same.

EXAMPLE 1

In accordance with the present invention, an alumina ceramic body was fabricated such that the metal component contained copper-aluminum intermetallic compounds. Thus, copper was provided as a second metal as a pro-process alloy addition to the precursor metal body.

A 2×1×½ inch bar of an aluminum alloy comprising 10 weight percent copper and 3 weight percent magnesium (a dopant), balance aluminum, was placed into a bed of alumina particles (E1 Alundum, from Norton Co., 90 mesh), which was contained in a refractory vessel, such that a 2×1 inch face of the bar was exposed to the atmosphere and substantially flush with the bed. A thin layer of silicon dioxide dopant material was uniformly dispersed over the exposed surface of the bar. This setup was placed into a furnace and heated up over 5 hours to 1400° C. The furnace was held at 1400° C. for 48 hours, and then cooled down over 5 hours to ambient. The setup was removed from the furnace, and the ceramic body was recovered. The ceramic structure was cross-sectioned for metallographic and phase analyses. X-ray diffraction analysis of the metallic component of the ceramic showed $Cu_9Al_4$ copper-aluminum intermetallic present toward the top of the structure, and $CuAl_2$ copper-aluminum intermetallic and non-oxidized aluminum toward the initial growth surface of the ceramic.

EXAMPLE 2

Ceramic materials with an aluminum-based metallic constituent enriched in nickel were prepared to determine whether such materials would have enhanced mechanical characteristics. The procedure followed in preparing these materials involved the use of sedimentation casting to make preforms of aluminum oxide particles containing metallic nickel powder. These preforms were subsequently infiltrated with an aluminum oxide ceramic matrix. During the growth process, the molten aluminum interacted with the nickel powder to form a metallic constituent enriched in nickel.

In more detail, either 10% or 30% by weight of nickel metal powder was added to a mixture of aluminum oxide powders (Norton 38 Alundum) consisting of 70% by weight 220 mesh and 30% by weight 500 mesh particle sizes. The resulting blend of oxide and metal particles was slurried in water containing also 2% by weight of a polyvinyl acetate latex binder (Elmer's Wood Glue). The ratio of powder to water (plus binder) was 2.5:1, by weight. Preforms were prepared by pouring the slurry into 2 inch by 2 inch square molds and allowing the solid particles to settle into a layer approximately ½ thick. Excess water in the casting process was poured and sponged from the surface.

Each preform was assembled with a 2×2×½ inch bar of aluminum alloy 380.1 along a 2×2 inch common surface with a thin layer of silicon powder placed on the interface as a dopant to promote the oxidation reaction. The 380.1 alloy lot used in these experiments was found by chemical analysis to be consistent with the nominal specification for this alloy (i.e., 7.5–9.5% Si, 3.0–4.0% Cu, $\leq$2.9% Zn, $\leq$1.0% Fe, $\leq$0.5% Mn, 0.5% Ni, $\leq$0.35% Sn, and $\leq$0.1% Mg), except that the Mg concentration was found to be approximately 0.17% to 0.18% by weight. The higher Mg level is believed to be important in view of the established role of Mg as a dopant or promoter of the oxidation reaction.

The metal/preform assemblies were placed individually in inert refractory boats and surrounded on all sides by a layer of coarse grit wollastonite particles, which served as a barrier material to confine the oxidation reaction to the volume contained within the preform. The refractory boats with their contents were placed in a furnace and heated in air at 1000° C. for 80 hours.

Upon removal from the furnace, it was found that an aluminum oxide ceramic matrix had grown from the surface of the molten aluminum alloy and infiltrated the preform. Metallographic examination of cross sections of these materials showed particles of the filler material (38 Alundum) bonded together by an aluminum oxide matrix containing a metallic constituent comprised of aluminum (from the parent metal), silicon (from the parent metal and the dopant layer) and nickel (from the nickel powder added to the preform), plus other minor constituents of the parent metal.

Mechanical properties measurements were obtained on specimens prepared from these ceramic materials. Most noteworthy was an increase in the toughness of the material containing nickel, as determined by a standard Chevron notch fracture toughness test. Thus, the material prepared from the preform with 10% nickel yielded an average toughness value of 8.5 MPa-m$^{1/2}$ while that formed from the 30% nickel preform gave an average toughness of 11.3 MPa-m$^{1/2}$. From prior experience with similar materials, toughness values only in the range of 4–7 in the same units would be expected in the absence of the nickel addition.

EXAMPLE 3

A mixture of fine-grained alumina (80 wt % of Alcan C-75 Alumina, Unground, 100–110 micron average particle size) and nickel metal powder (20 wt % of Atlantic Engineers Nickel Metal Powder, –325 mesh) was prefired in air at 1300° C. for three hours. The nickel and alumina reacted and sintered to form phases of NiAl$_2$O$_4$ and NiO. It is believed that this NiAl$_2$O$_4$ and NiO may exist as distinct particles and/or as a coating on the alumina particles. This sintered material was crushed, ball milled, and sieved to –200 mesh. The resulting powder mixture contained approximately 48 percent by weight NiAl$_2$O$_4$, 42 percent by weight unreacted Al$_2$O$_3$ and 10 percent by weight NiO. The powder mixture was sediment cast into a 4½ inch by 4½ by ⅝ inch preform using the techique described in Example 2. A 6 inch by 6 inch by 1 inch ingot of 380.1 aluminum alloy was placed below the preform. A surface dopant layer of a foundry material composed primarily of silica and sold under the trademark LeecoteR, a registered trademark of Acme Resin Co. of Madison, Ohio, was painted onto the alloy such that it was located adjacent to, and contacted with, the preform (it is noted that the surface dopant layer can also be sprayed onto the alloy and is usually approximately ⅛ inch or less in thickness). The 380.1 alloy lot used in these experiments was determined through chemical analysis to be consistent with the nominal specification for this alloy (i.e. comprising 7.5–9.5% Si, 3.0–4.0% Cu, $\leq$2.9% Zn, $\leq$1.5% Fe, $\leq$0.5% Mn, $\leq$0.5% Ni, $\leq$0.35% Sn, and $\leq$0.1% Mg), except that the Mg concentration was found to be approximately 0.17% to 0.18% by weight. The higher Mg level is believed to be important in view of the established role of Mg as a dopant or a promoter of the oxidation reaction.

The preform/metal assemblies were placed individually into inert refractory boats and surrounded on all sides by a layer of wollastonite particles (coarse fiber—Nyad SP, from NYCO, Inc.) having a thickness of approximately 3 inches, which particles acted as a barrier material to confine the oxidation reaction to the volume contained within the preform. The refractory boats, with their contents, were placed into an electric resistance furnace and heated in air to a temperature of 1000° C. for 160 hours. The ramp up and ramp down times were both 10 hours.

Upon removal from the furnace, it was found that an aluminum oxide ceramic matrix had grown from the surface of the molten aluminum alloy and had infiltrated the preform. After the infiltrated preform, which constituted the ceramic body, was mechanically separated from the remaining precursor metal carcass, metallographic examinations of cross-sections were performed which showed that a substantially uniform distribution of an interconnected residual metal constituent existed in the ceramic body. Further examination by Energy Dispersive X-Ray Analysis showed that this residual metal consisted of three distinctly different metallic phases with significantly different compositions. The predominant phase contained between 30–50 wt % nickel, 20–30 wt % aluminum, and 20–30 wt % silicon. This nickel-containing intermetallic is referred to herein as the "tailored" residual metal phase. The remaining phases were essentially pure aluminum and pure silicon, and are referred to herein as the "untailored" residual metal The average density of the produced ceramic bodies was about 3.8 grams/cc.

Without intending to be bound by any particular theory, it is believed that the aluminum oxide matrix is comprised of alumina formed (1) from the oxidation reaction between the precursor metal and the vapor-phase oxidant and (2) from the reduction of the metal aluminate by the precursor metal.

Samples of this ceramic body were exposed to a boiling 20% NaOH solution for time periods of 50 and 100 hours. The extent of attack by the NaOH solution upon the residual metal in the formed ceramic body was minor. Thus, the tailored residual metal resisted dissolution into the boiling 20% NaOH solution. In addition to the resistance to the boiling 20% NaOH solution, the ceramic bodies showed good resistance to corrosive attack in a solution of boiling 1% HCl. From prior experience, it is known that the residual metal in such bodies is extensively attacked by either solution in the absence of the nickel addition.

Further tests indicated that the ceramic bodies exhibited excellent erosion resistance. The erosion resistance of the ceramic bodies was determined by a dry grit-blast test, which is described in detail below. Particularly, the erosion rate of the ceramic bodies produced according to this example was determined to be about 0.2–0.4 cc/hour. This erosion resistance is excellent when compared to commercial materials presently being utilized for applications where these ceramic bodies could be utilized. For example, commercial NiHard wear-resistant cast iron materials, when subjected to the same grit-blast test, were found to have an erosion rate of approximately 6.25 cc/hour. Thus, ceramic bodies produced according to this invention could be useful for applications such as erosion/corrosion resistant pieces in industrial slurry handling systems. Such desirable erosion reistance may be attributed to their relatively high surface hardness of 89.5, as determined by the Rockwell A Hardness Scale.

The dry grit-blast test, referred to above, utilizes a modified, pressurized sandblast unit. Foundry sand (80–120 mesh silica, $SiO_2$, obtained from Pennsylvania Foundry Supply and Sand Company, Philadelphia, Pa.) is blasted at a stationary target (test specimen) at a blasting pressure of 40 psi. The test specimen is mounted at a 30° angle incident to the direction of flow of the sand. The blasting nozzle is positioned to be about 3 cm from the test specimen. The test specimen is continuously eroded with the stream of silica sand for 5 minutes. The test specimen is weighed before and after the test and the weight loss and density are used to calculate an erosion rate in cc/hour.

A significant increase in the flexural strength of the resulting ceramic body was obtained by modifying the starting materials used to produce the preform. Particularly, by reducing the particle size of the fine-grained alumina prior to prefiring the alumina powder with nickel metal powder and thereafter subjecting the preforms to the processing parameters discussed above, higher flexural strengths were achieved. The Alcan C-75 Unground Alumina (100–110 micron average particle size) was replaced with Alcan C-75 Regular Ground Alumina (15 micron average particle size). The room temperature flexural strength obtained with the unground alumina was typically between 300–400 MPa. The room temperature flexural strength obtained with the regular ground alumina was typically between 400–530 MPa. In addition, both ceramic materials retained approximately 40 to 60% of their room temperature strength when heated to 700° C. (i.e., temperatures where many "untailored" ceramic bodies retain only a small amount of their room temperature flexural strengths).

The flexural strength determinations were made in a four-point bend testing apparatus utilizing a crosshead speed of 0.5 mm/min. The samples prepared for the flexural strength measurements were bars cut from the prepared ceramic bodies. These test bars had the dimensions of 3 mm×6 mm×45 mm. The tensile surfaces of the bars were surface ground using a 320 mesh diamond wheel, and the corners were chamfered.

The room temperature four-point flexural tests were conducted in a Model CITS 2000 Syntech test machine using the procedures outlined in U.S. Army MIL-STD-1942 (MR). The steel flexure fixture had a 19.95 mm inner span and a 40.06 mm outer span. Flexural strengths were calculated from the peak breaking loads, the specimen dimensions and the fixture dimensions by using elastic beam equations.

The elevated temperature four-point flexural tests were conducted in a Model 1123 Instron test machine with hot-pressed silicon nitride flexure fixtures having an inner span of 19.3 mm and an outer span of 45.3 mm, loaded by silicon carbide push rods. Specimen deflections were measured with a Model 121 Zygo laser precision non-contact measuring device, having 3 micron repeatable accuracy.

These examples demonstrate that by utilizing a bed or preform containing nickel aluminate and, optionally, nickel oxide, it is possible to tailor the residual metal phase of the resulting ceramic body so that it contains a significant weight percentage of nickel-containing intermetallics. The incorporation of a secondary metal or intermetallic into the residual metal of the resulting ceramic body can significantly alter one or more properties of that ceramic body. Ceramic bodies produced by this method exhibit improved corrosion resistance, erosion resistance, room temperature strength, and high temperature strength, relative to ceramic bodies made by a similiar method, however, without this secondary metal or intermetallic included within the residual metal phase.

EXAMPLE 4

A 2 inch by 1 inch by ½ ingot of aluminum alloy 380.1 (having the composition described in Example 3, i.e. comprising 7.5–9.5% Si, 3.0–4.0% Cu, ≦2.9% Zn, ≦1.5% Fe, ≦0.5% Mn, ≦0.5% Ni, ≦0.35% Sn, and with a Mg concentration of approximately 0.17% to 0.18% by weight) was completely surrounded with a bed composed of a mixture of 90 grit 38 Alundum and powdered cobalt aluminate in a weight ratio of 10 parts cobalt aluminate to 90 parts 38 Alundum. The ingot, bed and containing refractory boat were placed in a furnace and heated in air to 1150° C. over a 5-hour period. The furnace and its contents were maintained at 1150° C. for 48 hours and then allowed to cool to ambient over a 5-hour period.

Upon removal from the furnace it was found that an aluminum oxide ceramic matrix had grown from the surface of the molten aluminum alloy and infiltrated the bed of alumina and cobalt aluminate. The infiltrated bed, which constituted the ceramic body, was separated from the remaining precursor metal carcass with a diamond saw and then sandblasted to remove any excess filler material. Examination of cross-sections of the resulting ceramic material showed particles of the bedding materials bonded together by an aluminum oxide matrix containing a metallic phase comprised of aluminum (from the precursor metal), silicon (from the precursor metal) and cobalt (reduced from the cobalt aluminate), plus other minor metallic constituents. Further examination using Energy Dispersive X-Ray Analysis revealed the presence of Al, Si, and Co, with a Co/Si intermetallic phase being located throughout the structure.

EXAMPLE 5

A 2 inch by 1 inch by ½ ingot of aluminum alloy 380.1 (with the composition described in Example 3, i.e. comprising 7.5–9.5% Si, 3.0–4.0% Cu, 2.9% Zn, 1.5% Fe, 0.5% Mn, 0.5% Ni, 0.35% Sn, and with a Mg concentration of approximately 0.17% to 0.18% by weight) was completely surrounded with a bed composed of a mixture of 90 grit 38 Alundum and powdered cobalt aluminate in a weight ratio of 5 parts cobalt aluminate to 95 parts 38 Alundum. The ingot, bed and containing refractory boat were placed in a furnace and heated in air to 1150° C. over a 5-hour period. The furnace and its contents were maintained at 1150° C. for 48 hours and then allowed to cool to ambient over a 5-hour period.

Upon removal from the furnace it was found that an aluminum oxide ceramic matrix had grown from the surface of the molten aluminum alloy and infiltrated the bed of alumina and cobalt aluminate. The infiltrated bed, which constituted the ceramic body, was separated from the remaining precursor metal carcass with a diamond saw and then sandblasted to remove any excess filler material. Examination of cross-sections of the resulting ceramic material showed particles of the bedding materials bonded together by an aluminum oxide matrix containing a metallic phase comprised of aluminum (from the precursor metal), silicon (from the precursor metal) and cobalt (reduced from the cobalt aluminate), plus other minor metallic constituents. Further examination using Energy DispersiveX-Ray Analysis revealed the presence of Al, Si, and Co, with a Co/Si intermetallic phase being located throughout the structure.

Examples 4 and 5 demonstrate that by utilizing a bed or preform containing cobalt aluminate, it is possible to produce a ceramic material with a metallic constituent containing a quantity of cobalt or an intermetallic of cobalt with at least one other metal.

EXAMPLE 6

A 3½ inch by 3½ inch by 1 inch ingot of aluminum alloy 380.1 (with the composition described in Example 3, i.e., comprising 7.5–9.5% Si, 3.0–4.0% Cu, ≦2.9%, Zn, ≦1.5% Fe, ≦0.5% Mn, ≦0.5% Ni, ≦0.35% Sn, and with a Mg concentration of approximately 0.17% to 0.18% by weight) was placed in contact with a 3 inch by 3 inch by 1 inch preform comprising 75% by weight C-75 unground alumina (supplied by Alcan Pigments and Chemicals of Cleveland, Ohio), 15% by weight A-17 calcined alumina, from Alcoa (supplied by Whittaker, Clarke and Daniels of South Plainfield, N.J.) and 10% by weight cobalt aluminate K-4704 (manufactured by Mason Color and Chemical Works, Inc., East Liverpool, Ohio) with an average particle size of 8.8 microns and containing minor amounts of alumina and silica. The preforms were sediment cast by the method described in Example 2, except that the slurry contained 4% by weight Elmer's Wood Glue, rather than 2% by weight. Before bringing the ingot and preform into contact, a foundry material composed primarily of silica and sold under the trademark LeecoteR, a registered trademark of Acme Resin Co., of Madison, Ohio, was painted onto the ingot such that it was located adjacent to, and contacted with, the preform.

Six of these preform/metal assemblies were placed individually in inert refractory boats and surrounded on all sides by a layer of wollastonite (coarse fiber—Nyad SR, from NYCO, Inc.) having a thickness of approximately 3 inches, which particles acted as a barrier material to confine the oxidation reaction to the volume contained within the preform. The top surface of the preform (which is the top surface of the preform/metal assembly) was initially left exposed to the atmosphere. The refractory boats, with their contents, were placed into an electric resistance furnace and heated in air to a temperature of 1050° C. and held for 160 hours. The ramp up and ramp down times were both 10 hours.

Upon removal from the furnace, it was found that an aluminum oxide ceramic matrix had grown from the surface of each molten aluminum alloy ingot and had infiltrated each preform. After these infiltrated preforms, which constituted the ceramic bodies, were mechanically separated from the remaining precursor metal carcasses, each preform was tested to determine its hardness. The average hardness of the six ceramic bodies produced by this method was 87.2 as measured on the Rockwell A Hardness Scale. Further tests determined that these bodies had room temperature flexural strengths of 325–384 MPa and high temperature strengths at 700° C. of 179–214 MPa. The average density of these bodies was about 3.77 g/cm$^3$, and the average erosion rate was about 0.22 cc/hour. The flexural strengths and erosion rates were determined by the same procedures set forth in Example 3.

EXAMPLE 7

A 3½ inch by 3½ inch by 1 inch ingot of aluminum alloy 380.1 (with the composition described in Example 3, i.e., comprising 7.5–9.5% Si, 3.0–4.0% Cu, ≦2.9% Zn, ≦1.5% Fe, ≦0.5% Mn, ≦0.5% Ni, ≦0.35% Sn, and with a Mg concentration of approximately 0.17%–0.18% by weight) was contacted with a 3 inch by 3 inch by 1 inch preform comprising 75% by weight C-75 unground alumina manufactured by Alcan of Cleveland, Ohio, 15% by weight A-17 calcined alumina, manufactured by Alcoa, and supplied by Whittaker, Clarke and Daniels, of South Plainfield, N.J., and 10% cobalt aluminate 6330 having an average particle size of 9.34 microns and manufactured by Mason Color and Chemical Works, Inc. of East Liverpool, Ohio.

The preforms were sediment cast by the method referred to in Example 6. Before bringing the ingot and preform into contact, a foundry material composed primarily of silica and sold under the trademark Leecote®, a registered trademark of Acme Resin Co., of Madison, Ohio, was painted onto the ingot such that it was located adjacent to, and contacted with, the preform.

Six of these preform/metal assemblies were placed individually into inert refractory boats and surrounded on all sides by a layer of wollastonite particles (coarse fiber—Nyad SP, of NYCO, Inc.) having a thickness of approximately 3 inches, which particles acted as a barrier material to confine the oxidation reaction to the volume contained within the preforms. The refactory boats, with their contents, were placed into an electric resistance furnace and heated in air to a temperature of 1025° C. for 160 hours. Ramp up and ramp down times were 10 hours.

Upon removal from the furnace, it was found that an aluminum oxide ceramic matrix had grown from the surface of each molten aluminum alloy ingot and had infiltrated each preform. After the infiltrated preforms, which constituted the ceramic bodies, were mechanically separated from the remaining precursor metal carcasses, each ceramic body was tested to determine its hardness. The average hardness of the six ceramic bodies produced by this method was 86.8 as measured on the Rockwell A Hardness Scale. Further tests determined that the ceramic bodies had room temperature flexural strengths of 270–342 MPa and high temperature strengths at 700° C. of 105–122 MPa. The average density of the ceramic bodies was about 3.90 gram/cc and the average erosion rate was about 0.34 cc/hour.

Examples 6 and 7 show that ceramic bodies produced through this method, and using cobalt aluminate as a starting material, displayed properties comparable to these obtained when unground alumina was mixed with nickel aluminate in Example 3.

EXAMPLE 8

The method of Example 3 was repeated except that powders of a commercial alloy known as "Monel", which contains copper and nickel, were utilized in place of the nickel powder. This alloy was used to create ceramic preforms which contained both copper and nickel aluminates. The benefits of using these copper and nickel aluminates is that the matrix growth process can be carried out at lower temperatures due to the fact that different intermetallics which form in the developing ceramic body, such as nickel and copper aluminides. The ceramic bodies produced through this method have mechanical properties which are similiar to the properties displayed by the ceramic bodies produced with nickel aluminate as the starting material.

EXAMPLE 9

The following example demonstrates the directed metal oxidation of an aluminum parent metal into a boron carbide filler material to form a boron carbide reinforced aluminum nitride composite body. Furthermore, the following Example demonstrates the use of a contiguous heat-treatment to modify the properties of the boron carbide reinforced aluminum nitride composite body. The heat-treatment promotes the reaction between the constituents of the boron carbide reinforced aluminum nitride composite body to form aluminum alumino-borocarbides which increase the amount of ceramic component within the composite body, thereby modifying the properties of the composite body. However, this Example is not limited to demonstrating the growth of composite materials or illustrating the heat-treatment processing. This Example also demonstrates other significant aspects of the present invention.

Two parent metal ingots measuring about 4.5 inches (114 mm) long, about 2 inches (51 mm) wide and about 0.5 inch (13 mm) thick and nominally comprising by weight about 5 percent magnesium, about 3 percent silicon and the balance aluminum were stacked in a bedding of a 100 grit (average particle diameter of about 173 microns) boron carbide powder to form a lay-up. An about ⅛ inch (3.2 mm) layer of 90 grit (average particle diameter of about 216 microns), 38 ALUNDUM® alumina (Norton Company, Worcester, Mass.) separated the parent metal ingots from the boron carbide powder.

The lay-up was placed into a controlled atmosphere retort furnace and the retort was closed. The retort furnace and its contents were heated from about room temperature to a set point temperature of about 1030° C. in about 10 hours, maintained at a set point temperature of about 1030° C. for about 36 hours and then cooled from about 1030° C. to about room temperature in about 5 hours. Forming gas (i.e., a gas mixture comprising about 96% nitrogen and about 4% hydrogen), at a flow rate of about 200 cubic centimeters per minute was maintained within the retort throughout the growth process. The temperature within the retort furnace was estimated to be about 1000° C.

At about room temperature, the retort furnace was opened and the lay-up was removed to reveal that aluminum nitride had grown into and embedded the boron carbide powder to form a boron carbide reinforced aluminum nitride composite material. Two pieces of the boron carbide reinforced aluminum nitride composite material, each measuring about 1 inch (25 mm) long, about 0.2 inch (5 mm) wide and about 0.16 (4 mm) thick were substantially buried in a bedding comprising 90 grit (average particle diameter of about 216 micron) 38 ALUNDUM® alumina (Norton Company, Worcester, Mass.) contained in two separate refractory boats, thereby forming two setups.

The first setup was placed into a controlled atmosphere retort furnace and heated to a temperature of about 1500° C. in an argon atmosphere, maintained at about 1500° C. for about 24 hours and cooled to about room temperature. The second setup, heated in a manner substantially the same as the first setup, was heat-treated at about 1250° C. for about 24 hours.

The average hardness and the constituents of the as-grown composite material and the two heat-treated composite materials were determined. Specifically, a portion of the as-formed composite material and each of the heat-treated composite materials were analyzed by x-ray diffraction to determine the composition of the composites. A sample from each composite material was prepared by chipping off a portion of the specific composite material and grinding the sample to a fine powder in a mortar and pedestal. The powdered sample was then placed into the target chamber of an x-ray diffractometer (Model D500, Simons AG, Munich, Germany) and scanned using unfiltered copper K-alpha x-ray radiation at an energy of about 40 KeV. The counting time was about 2 seconds at each 0.03° interval of 2-theta.

Qualitative X-ray diffraction results revealed the presence of the following phases in the as-grown composite material: Al, $B_4C$, AlN, and Si; in the composite material heat-treated at about 1250° C.: Al, $B_4C$, AlN, $Al_2O_3$ and $Al_{12}C_2$; and in the composite material heat-treated at about 1500° C.: AlN, Al, $AlB_{10}$, $AlB_{24}C_4$, $B_4C$ and $AlB_{12}C_2$.

Furthermore, the average Rockwell A hardness of each composite material was determined. The result of the hardness measurements and the results of the x-ray diffraction analysis are set forth in Table I below.

TABLE I

Comparison of As-grown and Heat-Treated
Boron Carbide Reinforced Aluminum Nitride Composite

|  | Hardness Rockwell $R_A$ | Phases Identified by XRD |
| --- | --- | --- |
| As-grown | 66 ± 3 | Al, $B_4C$, AlN, Si |
| 1250° C./24 hr. Heat Treatment: | 54 ± 10 | Al, $B_4C$, AlN, $Al_2O_3$, $AlB_{12}C_2$ |
| 1500° C./24 hr. Heat Treatment: | 71 ± 2 | AlN, Al, $AlB_{10}$ $AlB_{24}C_4$, $B_4C$ $AlB_{12}C_2$ |

The hardness measurement and x-ray diffraction results confirm that boron carbide and aluminum react to form $AlB_{12}C_2$ at 1250° C. and both $AlB_{12}C_2$ and $AlB_{24}C_4$ at 1500° C. Furthermore, the results indicate that a composite material containing boron carbide and aluminum can be heat-treated to increase the ceramic loading in the composite material via the formation of aluminum borocarbides.

Although only a few exemplary embodiments of this invention have been described in detail in the above Example, those skilled in the art will readily appreciate that the present invention embraces many variations other than those exemplified.

EXAMPLE 10

The following Example demonstrates, among other things, a method for forming a self-supporting body by the directed oxidation of a parent metal into a filler material mixture comprising an inert component and at least one compound which reacts with at least one component of the metallic constituent of the self-supporting body and/or dissociate under, or contiguous with, the processing conditions. Specifically, the processing may include subsequently heat treating the formed self-supporting body to promote a reaction between the embedded at least one compound in the filler material and at least one component of molten metallic constituent of the self-supporting body to form a reaction product having a specific volume greater than the specific volume of the at least one compound. Such a reaction can thereby liberate a desirable element into the residual parent metal and/or increase the volume fraction of ceramic constituent of the self-supporting body. Specifically, the present Example demonstrates the growth of aluminum parent metals into filler material mixtures comprising varying amounts of silicon carbide and silicon nitride to form self-supporting bodies. Subsequently, the self-supporting bodies are heat-treated at an elevated temperature which promotes a reaction between the residual aluminum parent metal and the embedded silicon nitride to form an aluminum nitride reaction product. Certain benefits of the reaction include an increase in the ceramic content of the self-supporting body and a simultaneous consumption of the residual aluminum parent metal. Furthermore, the residual aluminum parent metal is enriched with silicon metal.

Table II sets forth for Samples A–J the initial weight percent of silicon carbide and silicon nitride in the filler material mixture embedded by the directed oxidation of two separate aluminum parent metals. Specifically, five separate about 2000 gram filler material mixtures comprising by weight about 100 percent, about 75 percent, about 50 percent, about 25 percent, and about 0 percent 500 grit (average particle diameter of about 15 microns) 39 CRYSTOLON® SUPER STRONG silicon carbide (Norton Company, Worcester, Mass.) were respectively combined with about 0 percent, about 25 percent, about 50 percent, about 75 percent, and about 100 percent –325 mesh silicon metal powder (average particle diameter less than about 45 microns) utility grade silicon nitride (Elkem Materials, Inc., Pittsburgh, Pa.) in a Model RV02 Eirich mixer (Eirich Machines, Maple, Ontario, Canada). The Eirich mixer, containing about 2000 grams of filler mixture was set to high speed and about 80 grams of a binder solution comprising by weight about 16.6 percent AIRVOL® 205 polyvinyl alcohol (Air Products Company, Inc., Allentown, Pa.), about 10.4 percent CARBOWAX® PEG 400 polyethylene glycol, about 24.9 percent NYACOL® 2040 NH$_4$ colloidal silica (Nyacol Products, Inc., Ashland, Mass.) and the balance deionized water was added. After the binder solution had been substantially absorbed into the filler material mixture, an additional 80 grams of the binder solution was added. The binder solution addition was repeated once again. The filler material mixture was then mixed until a substantially homogeneous filler material mixture suitable for forming preforms by dry pressing was obtained.

Preforms measuring about 2 inches (51 mm) square by about 0.5 inches (13 mm) thick were formed by placing an appropriate amount of the filler material mixture into a die cavity. Once substantially leveled within the die cavity, the filler material mixture was subjected to about 80,000 pounds (36,298 kilograms) of force, that is a pressure equivalent to about 20,000 pounds per square inch (1,406 kilograms per square centimeter). At least two preforms were pressed from each filler material mixture.

The preforms, supported with a refractory plate, were placed into an air atmosphere furnace set at about room temperature. The furnace, containing the preforms, was heated from about room temperature to about 500° C. at about 100° C. per hour, held at about 500° C. for about 2 hours, heated from 500° C. to about 1000° C. at about 200° C. per hour, held at about 1000° C. for about 15 hours, after which time the power to the furnace was interrupted and the furnace and its contents cooled from about 1000° C. to about room temperature.

At about room temperature, the fired preforms were removed from the furnace and it was noted that the organic binder from the binder solution had been removed by combustion. Subsequently, the density of fired preforms for Samples A–E was measured. The theoretical loading set out in column 5 of Table II of the filler materials was determined from the measured densities. The fired preforms were then incorporated into a lay-up used to grow the self-supporting ceramic composite bodies.

FIG. 1 is a cross-sectional schematic of the growth lay-up 10 used to produce the self-supporting ceramic composite bodies. Specifically, FIG. 1 shows a refractory boat 11, having inner dimensions measuring about 13 inches (330 mm) long, about 12 inches (305 mm) wide, about 4 inches ((102 mm) deep, and having a wall thickness of about 1 inch (25 mm) prepared from a moldable material mixed from CASTOLAST® 3000 castable powder (C-E Refractories, Valley Forge, Pa.). The bottom of the castable boat 11 was covered substantially completely with –325 mesh (average particle diameter less than 45 microns) wollastonite bedding 12 (Nyco Inc., Willsboro, N.Y.). A parent metal ingot 13, measuring about 8 inches (203 mm) long by about 5 inches (127 mm) high and about 1 inch (25 mm) thick was used for Samples A–E while two parent metal ingots 13 measuring about 7 inches (178 mm) long by about 5 inches (127 mm) wide and about 0.5 inch (13 mm) thick were used with Samples F–J. For each growth lay-up 10, the parent metal ingots 13 were placed onto the wollastonite bedding 12. A suspension comprising by weight about 50 percent –325 mesh silicon metal powder (average particle diameter less than about 45 microns) and about 50 percent ethanol was painted onto one side measuring about 2 inches (51 mm) square of each fired preform. After the ethanol had substantially completely evaporated from the suspension leaving silicon metal, one fired preform 15 of each filler material mixture as set out in Table II was contacted with the parent metal 13. Additional –325 mesh wollastonite 12 was then placed within the refractory boat 11 substantially to the level of the side of each fired preform opposite the side contacting the parent metal 13 thereby forming a lay-up 10. Two lay-ups comprising five fired preforms, one for each parent metal composition, were formed.

The two lay-ups 10 were then placed into an air atmosphere furnace, and the furnace door was closed. The furnace and its contents were then heated from about room temperature to about 900° C. in about 5 hours, held at about 900° C. for about 90 hours, and then cooled from about 900° C. to about 700° C. in about 2 hours. At about 700° C., the grown self-supporting bodies were removed from the parent metal carcass and set aside on the wollastonite bedding. The furnace door was closed. The furnace and its contents were then allowed to cool to about 60° C. at which time the self-supporting bodies were removed from the furnace.

Figure 2:
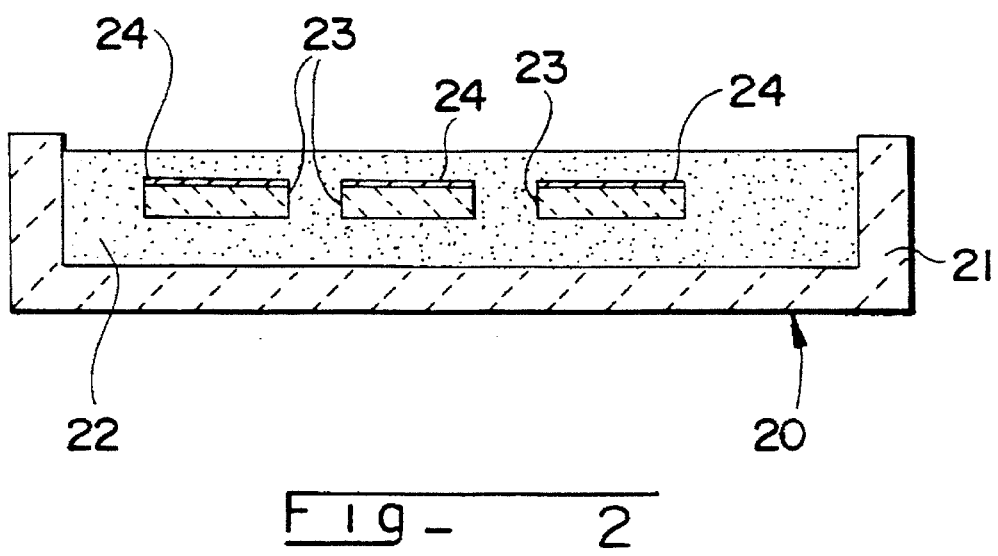
FIG. 2 is a cross-sectional schematic view of a heat-treatment lay-up used to heat-treat the grown ceramic composite bodies of Example 11.

After the as-grown self-supporting bodies had been cut in half using a diamond saw, one half of each of the as-grown bodies was prepared for a heat-treatment. Specifically, as depicted in FIG. 2, the bottom of a refractory boat 21 was filled with –325 mesh wollastonite 22 sufficient to separate the as-grown self-supporting ceramic composite bodies from the bottom of the refractory boat 21. After the –325 mesh wollastonite 22 was substantially leveled, the one half of each as-grown body 23 with some attached parent metal carcass 24 (only three depicted in FIG. 2) was placed onto the leveled wollastonite 22. Additional –325 mesh wollastonite 22 was poured over each half of the as-grown self-supporting bodies 23 with the attached parent metal carcass 24 to bury substantially the as-grown self-supporting bodies 23 and thereby form the heat-treatment lay-up 20.

The heat-treatment lay-up 20 and its contents were then placed into a resistance heated air atmosphere furnace and the furnace door was closed. The furnace and its contents were heated from about room temperature to about 1200° C. in about 24 hours, held at about 1200° C. for about 24 hours, at which time the energy to the furnace was interrupted and the furnace and its contents were allowed to naturally cool to about room temperature. At about room temperature, the heat-treated self-supporting bodies, along with the as-grown self-supporting bodies, were sectioned and mounted in order to prepare specimens to measure the hardness of the respective bodies.

Table II sets forth a comparison for each of Samples A–J of the hardness measured on a Rockwell "A" scale. Specifically, Table II sets forth for Samples A–J the hardness for the as-grown self-supporting bodies and the hardness for the heat-treated self-supporting bodies.

Table III sets forth a comparison of the Knoop hardness (measured using a 10 kilogram weight), the Rockwell A hardness, and the results of x-ray diffraction analysis for silicon carbide alumina, alpha-silicon nitride, beta-silicon nitride, aluminum nitride, aluminum and silicon for Sample H in the as-grown and heat-treated condition. The data of Table III demonstrate that subjecting a self-supporting body containing at least one reactive compound in the filler material to form a heat-treatment contiguous to the growth of the self-supporting body improves the hardness of the heat-treated self-supporting body and alters the relative amounts and composition of the ceramic constituents in the self-supporting body. Specifically, the results of x-ray diffraction analysis qualitatively demonstrate that the relative amounts of silicon nitride and aluminum are decreased in the heat-treated self-supporting body relative to the as-grown self-supporting body, while the amounts of aluminum nitride and primary silicon in the heat-treated self-supporting body are increased.

Figure 3:
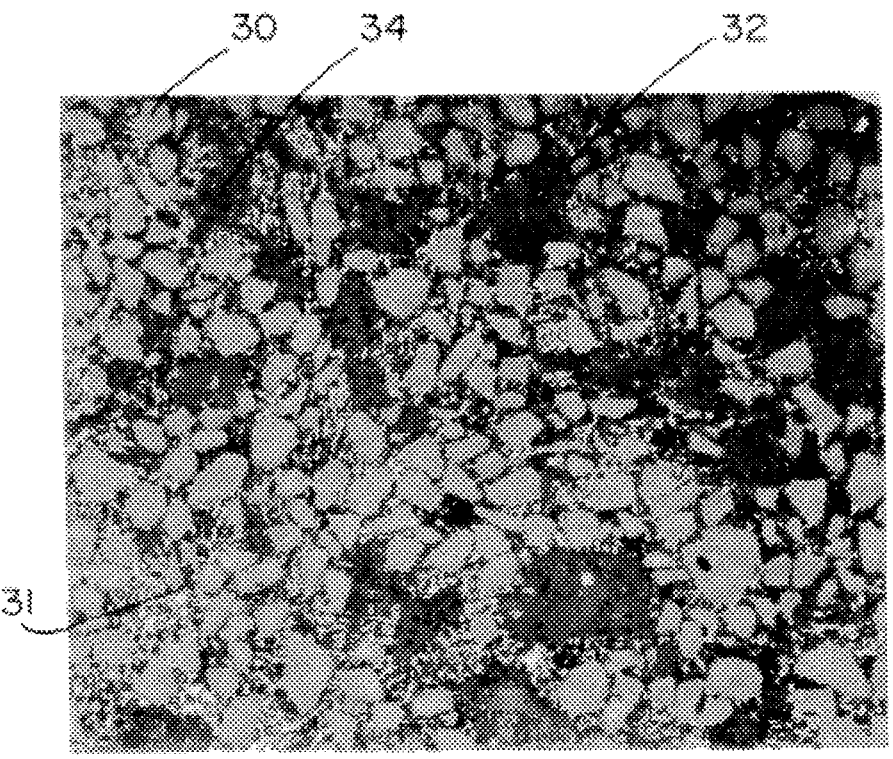
FIG. 3 is a photomicrograph of the microstructure taken at about 400× magnificaton of Sample H of Example 11 in the as-grown condition.
Figure 4:
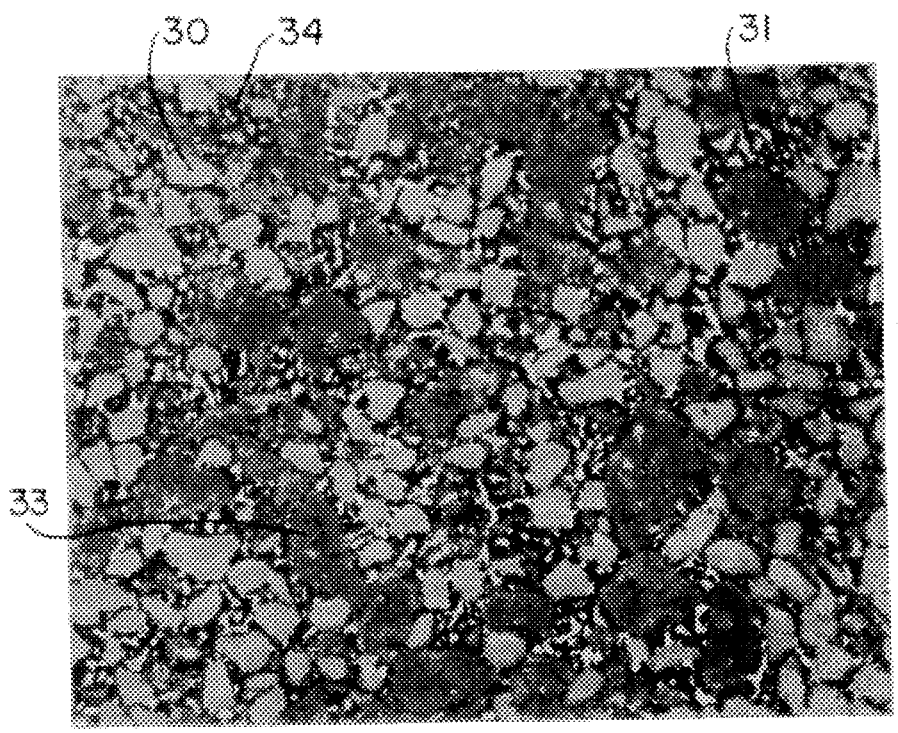
FIG. 4 s a photomicrograph of the microstructure taken at about 400× magnification of Sample H of Example 11 in the heat-treated condition.

FIGS. 3 and 4 are photomicrographs of the microstructure taken at about 400× magnification for Sample H in the as-grown and heat-treated condition respectively. In each of FIGS. 3 and 4, there is silicon carbide 30, a metallic constituent 31, and growth matrix 34. FIG. 3 contains silicon nitride 32 while FIG. 4 contains reacted silicon nitride 33.

TABLE III

| | Hardness and X-ray Diffraction Results for Sample H | |
|---|---|---|
| | As-Grown | Heat-Treated |
| Hardness | | |
| Knoop 10 kg (kb/mm$^2$) | 923 ± 61 | 1281 ± 75 |
| Rockwell A | 85.3 ± 0.6 | 89.0 ± 0.8 |
| XRD Phases | (Relative Peak Intensity) | |
| SiC | 100 | 100 |
| Al$_2$O$_3$ | 50 | 45 |
| alpha-Si$_3$N$_4$ | 15 | 10 |
| beta-Si$_3$N$_4$ | 10 | 10 |
| AlN | 10 | 25 |
| Al | 50 | — |
| Si | — | 35 |

Thus, this Example demonstrates that a self-supporting ceramic composite body may be formed by growing a reaction product of a parent metal into a filler material mixture containing at least one reactive component, wherein, upon contiguous heat-treatment, the at least one reactive component at least partially reacts or dissociates upon contact with the at least one component of the metallic constituent of the ceramic composite body to form a reaction product which has a higher specific volume than the at least one reactive component thereby increasing the ceramic content and altering the composition of the metallic constituent of the self-supporting body.

EXAMPLE 11

The following Example demonstrates, among other things, the formation of a ceramic composite body by the directed oxidation of a parent metal into a filler material comprising at least one reactive component which, upon subsequent heat-treatment to promote at least partial reaction with at least one component within the metallic constituent of the ceramic composite body, forms at least one reaction product having a specific volume greater than the specific volume of the at least one reactive component. Furthermore, the following Example demonstrates the large scale production of such ceramic composite bodies. Steps performed to form the heat-treated ceramic composite bodies include, among others, spray drying to produce a pressing mixture, forming preforms by dry pressing, firing the preforms, preparing parent metal, forming growth lay-ups, growing ceramic composite bodies, and heat-treating the grown ceramic composite bodies.

To form the heat-treated self-supporting ceramic composite bodies, first a flowable fine grit silicon nitride-silicon carbide powder mixture containing binders was formed by spray drying.

Preforms were formed using a dry pressing mixture which was spray dried and comprised by weight about 33.2% –325 mesh (average particle diameter less than 45 microns) utility grade silicon nitride (Elkem Metals, Inc., Pittsburgh, Pa.), about 61.7% 500 grit (average particle diameter of about 15 microns as measured using a MICROTRAC™ Model 7995-10 Particle Size Analyzer from Leeds and Northrop, North Wales, Pa., and about 12.5 microns as measured using a sedigraph Model 5100 from Micromeritics Instruments Corp. Norcoss, Ga.) 39 CRYSTOLON® SUPER STRONG (also referred to as "strong grain", "round grain" and "strong (rounded)") silicon carbide (Purchase Code 9538, Norton Company, Worcester, Mass.), about 1.9% AIRVOL® 205 polyvinyl alcohol (Air Products Company, Inc., Allentown, Pa.), about 1.2% CARBOWAX® PEG 400 polyethylene glycol (Union Carbide Corporation, Danbury, Conn.), and about 1.9% silica incorporated as NYACOL® 2040 NH$_4$ colloidal silica (Nyacol Products, Inc., Ashland, Mass.). To form the spray dried pressing mixture, a polyvinyl alcohol-deionized water solution was formed. Specifically, deionized water contained within a stainless steel beaker was boiled using a hot plate. AIRVOL® 205 polyvinyl alcohol in an amount sufficient to form a polyvinyl alcohol-deionized water solution comprised by weight of about 30% polyvinyl alcohol was added to the boiling water and agitate for about 25 minutes using a hand-held mixture. The stainless steel container and its contents were then removed from the hot plate and allowed to cool to about room temperature. The solution, at about room temperature, was transferred to NALGENE® plastic jugs (Nalgene Company, Rochester, N.Y.) having volumes of about 1 gallon (3.79 liters).

After the polyvinyl alcohol-deionized water solution had been formed, ingredients sufficient to yield about 78 kilograms of spray dried pressing mixture were accumulated at a Model BE 1405 Bowen No. 1 tower spray dryer (Bowen Engineering, Inc., Somerville, N.J.) equipped with a two-fluid type nozzle (i.e., a type 59-N-04 nozzle, a type 59-C-04 cap, and a type 59-D-21A diffuser). About 31.4 kilograms of deionized water were added to the 24 gallon stainless steel mixing tank adjacent to the spray dryer and the mixer was turned on. About 26.5 kilograms of −325 mesh (average particle diameter less than about 45 microns) utility grade silicon nitride, about 49.1 kilograms of 500 grit (average particle diameter of about 15 microns) 39 CRYSTOLON® SUPER STRONG silicon carbide (Purchase Code 9538, Norton Company, Worcester, Mass.), about 14.4 kilograms of cyclone fines comprised by weight of about 30% −325 mesh silicon nitride and the balance 500 grit 39 CRYSTOLON® SUPER STRONG silicon carbide, about 6.0 kilograms of polyvinyl alcohol-deionized water solution, about 1.13 kilograms of CARBOWAX® PEG 400 polyethylene glycol, and about 4.5 kilograms of NYACOL® 2040 NH4 colloidal silica were added to the stainless steel mixing tank. The contents of the stainless steel mixing tank were mixed for about 30 minutes to produce a slurry.

To verify the suitability of the slurry for spray drying, an about 250 milliliter volumetric flask was filled with the slurry and weighed. The resulting weight was divided by 250 to obtain a specific gravity of the slurry mixture. The volume percent solids of the slurry mixture was about 70%, since the measured specific gravity ranged between 1.86 grams per centimeter to about 1.9 grams per centimeter cubed. After the specific gravity of the slurry was established to be acceptable, the viscosity of the slurry was measured using a model RVTD Brookfield viscometer (Brookfield Engineering Labs, Inc., Stoughton, Mass.) equipped with a number 2 spindle at a speed of about 20 revolutions per minute. The viscosity of the slurry was measured within the acceptable range from about 200 centipoise to about 300 centipoise.

After establishing that the slurry mixture viscosity and specific gravity were within the acceptable defined ranges, spray drying of the slurry commenced. Specifically, the inlet temperature of the spray drier unit was set to about 225° C. while the outlet temperature measured about 180° C. The atomizing pressure was set at about 20 pounds per square inch (1.4 kilogram per centimeter squared) while feeding the slurry with a MOYNO® Products Model LD processing cavity pump (Robinson and Myers, Inc., Springfield, Ohio) powered by a 172 horse power Model B052 motor (Reeves Products, Columbus, Ind.) set at about 4.5 and experiencing a pressure drop of about 7.5 inches (191 mm) of water. The yield of spray dried material was about 54.5 kilograms of pressing mixture and about 25.0 kilograms of cyclone fines.

A square die cavity, having internal dimensions of about 4.0 inches (102 mm) square and about 1.25 inches (32 mm) deep was setup in a 2 ton press. Approximately 200 grams of the silicon nitride-silicon carbide spray dried pressing mixture were placed into a 500 milliliter plastic beaker. The mixture was then poured into the die cavity and evenly distributed making certain that the spray dried pressing mixture entirely occupied the die cavity. The mixture was then subjected to about 160 tons (145,120 kilograms) of force (i.e., about 20,000 pounds per square inch or about 1,406 kilograms per square centimeter) to consolidate the spray dry pressing mixture into a preform. The preform was removed from the die and it was noted that the preform measured about 4 inches (102 mm) square and about 0.386 inches (9.8 mm) thick.

A total of about 270 preforms were prepared in the manner above.

Figure 5:
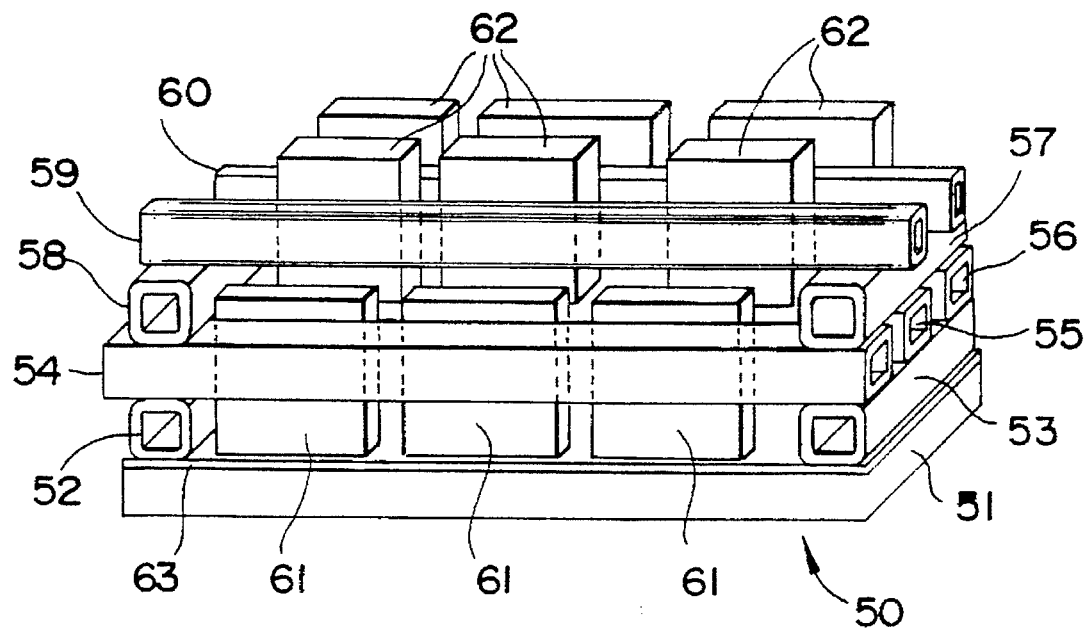
FIG. 5 is a isometric schematic view of the assembly used to fire the preforms of Example 12.

After a sufficient number of preforms were pressed, a firing lay-up 50 (as depicted in FIG. 5) was constructed. A base plate 51, measuring about 30 inches (762 mm) long, 28 inches (711 mm) wide, and about 2 inches (51 mm) thick was covered with a piece of FIBERFRAX® ceramic paper 63 measuring about 30 inches (762 mm) long and about 28 inches (711 mm) wide. Two first level spacer tubes 52, 53 measuring about 1.63 inches (41 mm) square and about 30 inches (762 mm) long were placed on the FIBERFRAX® ceramic paper 63 and aligned with the edges of the base plate 51 so as to be substantially parallel to the edges of the base plate and each other. Then 14 rectangular cross-section tubes made from substantially the same material as the first level spacer tubes 52, 53 and measuring about 28 inches (711 mm) long were evenly spaced parallel to each other and perpendicular to the first level spacer tubes 52, 53 to form an array of rows. These rectangular cross-section tubes include the first level row tubes 54, 55 and 56 depicted in FIG. 5. About six (6) first level preforms 61 were placed between each of the 13 spaces created by the 14 first level row tubes 54, 55, 56. Subsequently, second level spacer tubes 57, 58 were placed substantially above and parallel to the first level spacer tubes 52, 53 and on the first level row tubes 54, 55, 56. Second level row tubes 59, 60 were then placed parallel to the first level row tubes 54, 55, 56, however, off set so as to have the first level row tubes 54, 55, 56 align with the space between the second level row tubes 54, 55, 6 and support the second level preforms 62 thereby forming the firing lay-up 50.

The firing lay-up 50 was then placed into a Harrop air atmosphere furnace using a fork truck. The furnace door was closed and the top and bottom vents were opened. The furnace and its contents were then heated from about room temperature to about 500° C. at about 100° C. per hour; held at about 500° C. for about 2 hours; heated from about 500° C. to about 1000° C. at about 200° C. per hour; held at about 1000° C. for about 10 hours; and cooled from about 1000° C. to about room temperature at about 200° C. per hour. When the furnace had cooled to about 50° C., the firing lay-up 50 was removed from the furnace and the prefired preforms 78 were in a condition to be coated with a barrier material.

A barrier material to be applied to the outer surfaces of the prefired preforms 78 was prepared in the following manner. About 9000 grams of ethanol were placed into a NALGENE® plastic jar. About 112.5 grams of KLUCEL® LF hydroxypropylcellulose (Aqualon Company, Hopewell, Va.) were slowly added to the contents of the plastic jar while the ethanol was subjected to mixing using a CAFRAMO RZR50 Stirrer (CAFRAMO, Wiarton, Canada). After the hydroxypropylcellulose was substantially completely in solution, about 6000 grams of NYAD® −325 mesh fine wollastonite (NYCO®, Willsboro, N.Y.) were slowly added to the contents of the plastic jar while the mixing continued. After all of the fine wollastonite had been added to the mixing bowl, the mixture was subjected to an additional 10 minutes of mixing utilizing the CAFRAMO Stirrer. After about 10 minutes, the stirrer was turned off and the NALGENE® plastic jar was sealed. The jar and its contents were then placed on a jar mill and subjected to rolling for about 1 hour.

About 15 prefired preforms 78 were strategically arranged on a ⅜ inch (9.53 mm) thick white polyether foam (Foam Form, Wilmington, Del.) (measuring about 18 inches (457 mm) by about 25.5 inches (648 mm) supported by an aluminum tray. The tray and prefired preforms 78 were then placed onto a turntable within a ventilated spray booth. A Binks HVLP spray gun was used to apply the barrier mixture to the four sides and the top surface of each prefired preform. The tray was rotated on the turntable such that the top surface and all of the sides of each prefired preform were given a fine coating of barrier material. A total of about 0.85 gram of barrier material was applied to each preform. All 270 profired preforms were provided with a barrier material in essentially the After permitting the barrier material to dry on the prefired preforms for at least one hour, the profired preforms were coated with a second coat of barrier material in essentially the same manner as described above to form the final barrier material coating 79 (as depicted in FIG. 6).

A mixture which facilitated initiation of the growth of oxidation reaction product ("initiation") was prepared in the following manner. About 1700 grams of ethanol and about 1700 grams of 45 micron silicon metal powder (which contained about 0.5% iron), (Elkem Metals Co., Pittsburgh, Pa.) were added to a one gallon (3.79 g liter) plastic jar. The contents of the jar were thoroughly mixed utilizing the CAFRAMO RZR50 Stirrer. After thoroughly mixing the contents of the jar, the CAFRAMO RZR50 Stirrer was turned off and the jar and its contents were removed.

The barrier coatings 79 on the prefired preforms were allowed to dry for at least one hour and the prefired preforms were then turned over so that the surface which had not been coated with the barrier material 79 faced up. Any residual barrier material was removed from the uncoated surface. The uncoated surfaces of the prefired preforms were then lightly coated with about 1 gram of the initiator mixture utilizing a foam brush. The initiator mixture was allowed to dry substantially completely.

Figure 6:
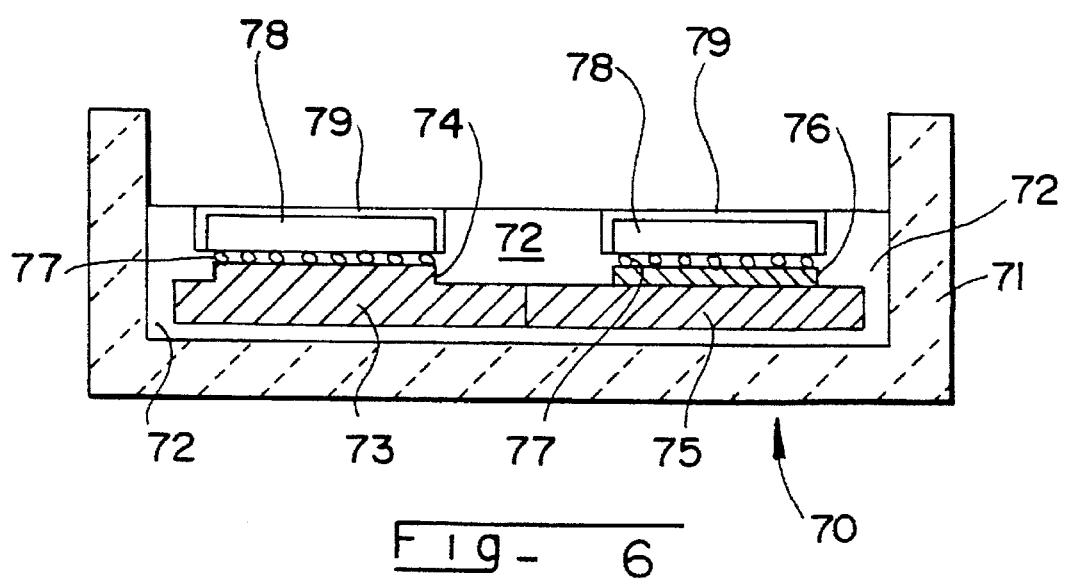
FIG. 6 s a cross-sectional schematic view of the growth lay-up used to produce the ceramic composite bodies of Example 12.

FIG. 6 depicts schematically two alternative growth lay-ups used to grow the composite bodies of this Example. As depicted schematically in FIG. 6, an about 0.75 inch (19 mm) thick layer of NYAD® FP wollastonite coarse grade (NYCO®, Willsboro, N.Y.) 72 was established within a refractory boat 71 having internal dimensions of about 28 inches (711 mm) wide by about 30 inches (762 mm) long by about 3 inches (76.2 mm) deep. A level surface was established within the refractory boat 71. In a first set up, a parent metal ingot comprising about 15.0–16.5 wt % Si; 3.0–3.8 wt % Cu; 2.7–3.3 wt % Zn; 0.20–0.30 wt % Mg; ≦0.01 wt % Ca; ≦0.10 wt % Ti; 0.7–1.0 wt % Fe; ≦0.50 wt % Ni; ≦0.50 wt % Mn; ≦0.35 Sn; ≦0.001 wt % Be; ≦0.15 wt % Pb, total others ≦0.5 wt %; and the balance Al, and measuring about 24 inches (610 mm) wide by about 26 inches (660 mm) long by about ¾ inch (19 mm) high was placed into the refractory boat 71 and onto the bed of NYAD® FP coarse grade wollastonite 72 with its smoothest surface facing up. The parent metal ingot 75 was adjusted so that the top surface of the ingot was substantially level. About 30 aluminum alloy plates 76 each measuring about 4 inches (102 mm) square by about 0.025 inches (6.4 mm) thick and comprising commercially available 6061 alloy were arranged to form an evenly spaced array on the exposed surface of the parent metal ingot 75. In a second setup, a parent metal ingot compositionally substantially the same as the parent metal ingot of the first setup but cast to have an array of 30 equally spaced protrusions 74 measuring about 4 inches (102 mm) square and extending about 0.1 inches above the surface of the parent metal ingot surface was used.

A total of 30 prefired preforms were placed into a first refractory boat 71 and onto the parent metal ingot 73 such that the surfaces of the prefired preforms 78 which had been coated with the initiator mixture 77 were in contact with the parent metal ingot 73. The prefired preforms 78 were arranged so that a space of about ¾ inch (19 mm) was provided between each preform and about 2.0 inches (102 mm) between the prefired preforms 78 and the edge of the parent metal ingot 73. It was noted that an about ¼ inch (6.4 mm) space remained between the top edge of the refractory boat and the top surfaces of the prefired preforms 78.

Likewise, a total of 30 prefired preforms 78 were placed into a second refractory boat 71 and onto the aluminum alloy plates 76 on the parent metal ingot 75 such that the surfaces of the prefired preforms 78 which had been coated with the initiator mixture 77 were in contact with the aluminum alloy plates 76.

A quantity of NYAD® FP coarse grade Wollastonite 72 was then carefully placed into each refractory boat 71, over the prefired preforms 78 and over the parent metal ingot. Coarse grit wollastonite was then cleared from the tops of the prefired preforms utilizing a small paint brush. The coarse grit wollastonite 72 was leveled to a surface substantially even with the top surface of the preforms but somewhat higher near the edges of the refractory boat.

This procedure was repeated until a total of 270 preforms were arranged in a similar manner.

The growth lay-ups 70 were then placed into a Harrop air atmosphere furnace. The furnace contained 9 boats, with 3 boats situated on 3 separate shelves such that about 1¼ inches (31.75 mm) remained between the top of the boats and the bottom of the shelf above the boats. The vent at the top of the furnace was closed, the fan was turned off and the furnace door was sealed.

A stainless steel purge tube was utilized to establish an oxygen flow within the furnace. An oxygen flow rate of about 300 cubic feet per hour was established and the temperature within the furnace was raised from about room temperature to about 890° C. at a rate of about 80° C. per hour. The oxygen flow rate was adjusted to maintain an oxygen concentration of about 65% within the furnace. After maintaining a temperature of about 890° C. and an oxygen level of about 65%, for about 120 hours, the oxygen flow rate was interrupted completely and the temperature within the furnace was programmed to decrease to about room temperature at a rate of about 80° C. per hour.

Upon reaching about room temperature, the refractory boats 70 were removed from the furnace.

A light hammer blow was applied to each parent metal carcass to separate the now formed ceramic composite bodies from the parent metal carcass. The ceramic composite bodies were then placed on a 60 inch (1524 mm) diameter turntable within a Wheelabrator grit blaster (Model #WMT60, The Wheelabrator Corporation, Shenandoah, Ga.) with the surface that had been in contact with the parent metal facing down. The top surfaces and sides of the ceramic composite bodies were subjected to grit blasting (utilizing GL25 Steel grinding media obtained from Wheelabrator) at 50% power for about 3 minutes. The ceramic composite bodies were turned over and the surface of the composites which had been in contact with the parent metal and the sides were subjected to grit blasting at about 70% power for about 5 minutes. All 270 ceramic composite bodies were subjected to grit blasting in substantially the same manner as described above.

A group of 16 ceramic composite bodies grown on the alloy pedestals and a second group of 16 ceramic composite bodies grown on the aluminum alloy plates were then subjected to a heat-treatment.

A coating material to be applied to the outer surface of the as-grown ceramic composite bodies was prepared in the following manner. About 2000 grams of −325 mesh utility grade silicon nitride (Elkem Metals Company, Pittsburgh, Pa.), about 52 grams KLUCEL® L hydroxypropylcellulos (Aqualon Company, Hopewell, Va.), and about 36 grams of Rheox Bentone SD-2 organic modified bentonite (Rheox Inc., Highstown, N.J.) were placed into a one gallon NAL-GENE® plastic Jar. The plastic jar was closed, then sealed and placed on a roll mill for about 10 minutes. The mixture was then placed into a two gallon jar mill which was half filled with ½ diameter alumina grinding media. About 2000 grams of ethanol were added to the jar mill, and the jar mill was sealed and placed on a roll mill for about 6 hours. Sixteen ceramic bodies were strategically arranged on a ⅜ inch (9.53 mm) thick commercially available white polyether foam (Foam Form, Wilmington, Del.) supported by an aluminum tray and both measuring about 18 inches (457 mm) by about 25.5 inches (648 mm). The tray and the ceramic bodies were then placed on a turn table within a ventilated spray booth. A Binks HVLP spray gun was used to supply the coating mixture to one surface measuring about 4 inches (102 mm) square of each ceramic composite body to a density of about 0.6 grams per square inch.

Additionally, a bedding material to contain the coated ceramic composite bodies was prepared in the following manner. About 1000 grams of C-75 calcined alumina (Alcan Corporation, Cleveland, Ohio), about 5000 grams of Lonza T150-600 graphite (Lonza Inc., Fair Lawn, N.J.) and five about 2 inch (51 mm) diameter alumina grinding media balls were placed into a cardboard drum. The cardboard drum was closed and then sealed using duct tape. The cardboard drum and its contents were then placed on a roll mill for about an hour.

Figure 7:
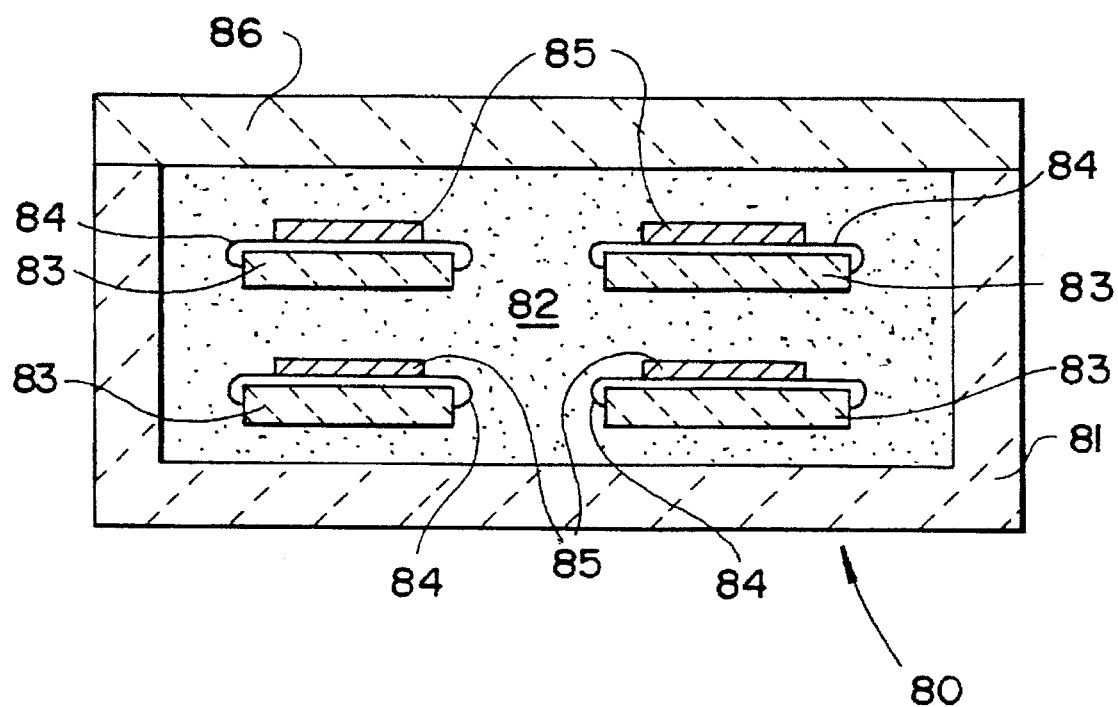
FIG. 7 s a cross-sectional schematic drawing of the heat-treatment lay-up used to heat-treat the ceramic composite bodies of Example 12.

After the coatings on the ceramic composite bodies had dried and the bedding material was prepared, a heat-treatment lay-up 80 was assembled, as schematically depicted in FIG. 7. An about 0.75 inch (19 mm) thick layer of the bedding material 82 was established within a refractory boat 81 having internal dimensions of about 24 inches (610 mm) wide by about 30 inches (762 mm) long by about 6 inches (152 mm) deep. A level surface was established within the refractory boat 81. The coated ceramic composite bodies 83 were pressed into the bedding material 82 in a pattern to maximize the refractory boat capacity while maintaining the coated ceramic composite bodies at least one inch (25 mm) from the refractory boat side walls. An aluminum feed plate 85 measuring about 3 inches (76 mm) square, about 0.025 inch (0.64 mm) thick and comprising commercially available 3003 aluminum alloy was placed in the center of and in contact with the coating 84 of each coated ceramic composite body 83. Additional bedding material 82 was then carefully sifted over the couples comprising the feed plates 85 contacting the coated ceramic composite bodies 83 covering the couples by about ½ (13 mm). The process was repeated with two additional layers for a total of 3 layers (only two layers depicted in FIG. 7). After the alloy feed plate ceramic composite body couples were substantially covered with the bedding material and the bedding material 82 was substantially leveled, a bonded silicon carbide plate 86 was placed on the refractory boat 81 as a lid.

The refractory boat 81 and its contents were then placed into an air atmosphere furnace and the furnace door was closed. The furnace and its contents were then heated from about room temperature to about 1200° C. at about 200° C. per hour; held at 1200° C. for about 24 hours; and cooled from about 1200° C. to about room temperature at a rate of about 200° C. per hour. When the thermocouple within the furnace indicated a temperature of about 900° C., the top vent of the furnace was opened and air was forced through the furnace. When the furnace was at about room temperature, the heat-treatment lay-up was disassembled. Residual portions of the alloy feed plates were easily removed from the net-shaped heat-treated ceramic composite bodies. The average density of the composite bodies measured about 3.34 grams per cubic centimeter.

Thus, this Example demonstrates a method for forming large numbers of net-shaped heat-treated ceramic composite bodies.

EXAMPLE 12

The following Example presents, among other things, a comparison of ceramic matrix composite bodies formed by conventional directed metal oxidation and ceramic matrix composite bodies formed by the directed oxidation of a parent metal into a filler material containing at least one reactive component. Specifically, the present Example demonstrates forming a ceramic matrix composite body by growing a parent metal into a filler material containing a reactive component and subsequently heat-treating said body to: increase the volume percent of ceramic, alter the composition of the metallic constituent; and thereby modify the chemical and mechanical properties of the resultant body.

To prepare conventional filler materials for incorporation into a slip for slip casting preforms, 39 CRYSTOLON® 500 grit (average particle diameter of about 17 microns) silicon carbide (Norton Co., Worcester, Mass.) was placed into a refractory boat measuring about 14 inches (356 mm) long by about 11 inches (279 mm) wide by about 6 inches (152 mm) deep, lined with a piece of FIBERFRAX® ceramic paper (The Carborundum Co., Fibers Division, Niagara Falls, N.Y.) measuring about 19 inches long by about 16 inches wide and about 0.125 inch (3.2 mm) thick. The FIBERFRAX® ceramic paper (The Carborundum Co., Fibers Division, Niagara Falls, N.Y.) was cut and folded so as to cover the bottom and sidewalls of the refractory boat. After the refractory boat had been substantially completely filled with the 500 grit silicon carbide, the refractory boat and its contents were placed into a resistance heated air atmosphere furnace. After the furnace door was closed, the furnace and its contents were heated from about room temperature to about 500° C. in about 2 hours, then heated from about 500° C. to about 800° C. in about 1 hour, then-heated from about 800° C. to about 1000° C. in about 2 hours, then heated from about 1000° C. to about 1325° C. in about 10 hours and held at about 1325° C. for about 24 hours, after which time the power to the furnace was interrupted. The furnace and its contents were then allowed to cool to about room temperature. At about room temperature, the fired 500 grit silicon carbide was removed from the boat, and it was noted that the silicon carbide had partially sintered or agglomerated. The partially sintered, fired 500 grit silicon carbide mass was then placed into a jaw crusher. The crushed product from the jaw crusher was then placed into a SWECO vibratory mill containing 1 inch (25 mm) diameter alumina milling balls and a 200 mesh (average opening of about 75 microns) screen. The fired silicon carbide material that passed through the 200 mesh (average opening of about 75 microns) screen was sized so as to be ready for incorporation into a mixture to form a slip. The silica content of the fired 500 grit silicon carbide conformed to the acceptable range of from about 15% to about 18% by weight.

A substantially similar process was used to prepare a 39 CRYSTOLON® 1000 grit (average particle diameter of about 5 microns) silicon carbide (Norton Co., Worcester, Mass.) for incorporation into a slip, except that the firing schedule was altered. Specifically, the furnace and its contents were heated from about room temperature to about 500° C. in about 2 hours, then heated from about 500° C. to about 800° C. in about 1 hour, then heated from about 800° C. to about 1000° C. in about 2 hours, then heated from about 1000° C. to about 1250° C. in about 7 hours and held at about 1250° C. for about 4.5 hours. As with the fired 500 grit silicon carbide, the fired 1000 grit silicon carbide was first jaw crushed and then fed into a SWECO vibratory mill containing 1 inch (25 mm) aluminum balls. The product from the vibratory mill was then sized for incorporation into a mixture to form a slip. The silica content of the fired 1000 grit silicon carbide conformed to the acceptable range of from about 15% to about 18% by weight.

About 25 kg of a slip were prepared by combining in a 20 liter NALGENE® plastic jug (Nalge Co., Rochester, N.Y.) about 10 kg of about ¾ inch (19 mm) diameter BORUNDUM® alumina milling media, about 6.25 kg of deionized water, about 1.875 kg of 39 CRYSTOLON® 1200 grit (average particle diameter of about 4 microns) silicon carbide, about 9.375 kg of the fired 39 CRYSTOLON® 1000 grit silicon carbide, about 5.625 kg of the fired 39 CRYSTOLON® 500 grit silicon carbide (Norton Co., Worcester, Mass.), about 1.875 kg of CARBOGRAN® UF-15 silicon carbide (Lonza Inc., Fair Lawn, N.J.) having an average particle diameter of about 0.8 microns and about 0.208 kg of a deflocculant solution comprised by weight of about 50% DARVAN-821A deflocculant (R. T. Vanderbilt Co., Inc., Norwalk, Conn.) and about 50% deionized water. After all of the above ingredients were placed into the plastic jar, the plastic jar was closed and placed on a jar mill. After about 23 hours of roll milling, the plastic jar was removed from the jar mill and about 0.75 kg of an ammonium alginate solution comprising by weight about 1% SUPERLOID® ammonium alginate (Kelco, Clark, N.J.) and the balance deionized water was added to the contents of the plastic jar. The plastic jar and its contents were then placed back on the jar mill and roll milled for about an additional hour.

After a total of about 24 hours of roll milling, the plastic jar and its contents were removed from the jar mill. The lid of the plastic jar was replaced by a plastic having holes measuring about 0.5 inch (13 mm) and the contents of the plastic jar were poured through the holes to separate the slip from the alumina milling media. About 500 ml of the slip were then placed into a 1000 ml beaker which was then placed in position under a Model RV Brookfield viscometer (Brookfield Engineering labs, Inc., Stoughton, Mass.) with a No. 2 spindle to measure the viscosity of the slip. With the viscometer set at a speed of about 100 revolutions per minute, a dial reading within the acceptable range of about 40.5±4.5 was obtained. The specific gravity of the slip was measured to be within the acceptable range of about 2.0±0.01 grams per cubic centimeter by placing about 100 ml of the slip into a graduated cylinder and onto a balance. The pH of the slip was measured to be within the acceptable range of about 7.0±1 by allowing the pH electrode of the pH meter to sit submerged in the slip for about a minute. The slip was then placed back into a second jar without alumina milling media until it was to be poured into plates, tubular shapes or other complex shapes.

To slipcast a silicon carbide plate preform, a two-piece plaster of paris mold with an internal cavity measuring about 3.125 inches (79 mm) square by about 0.375 inch (9.5 mm) thick was moistened slightly with water to a moisture content between about 5 weight percent and about 8 weight percent. The two-piece mold was then assembled and held together with rubber bands.

After degassing in a vacuum chamber (Supervacmac Model No. 160-015, Swest, Dallas, Tex.) to about 30 inches (760 mm) of mercury vacuum for about 5 minutes, the slip was then poured into the cavity of the two-piece plaster mold. The slip was poured slowly down the side of the two-piece plaster mold to prevent any trapping of air into the slip. Approximately 30 minutes were required for the slip to fill the entire mold cavity. After forming, the preform was removed from the two-piece plaster mold. The preform was then dried on a drying rack for about 12 hours under ambient conditions. The preform was then placed into a drying oven set at about 40° C. for about 6 hours for additional drying, then the dry preform was hand sanded to provide clean and smooth surfaces which were free of casting defects.

The sanded preform was placed on top of slotted firebricks and loaded into a room temperature resistance heated air atmosphere furnace. The furnace and its contents were heated from about room temperature to about 1025° C. in about 12 hours. After about 16 hours at about 1025° C., the power to the furnace was interrupted and the furnace and its contents were allowed to cool to about room temperature. The fired preform was then coated on 5 sides with a slurry comprising by weight about 50% –325 mesh (particle diameter less than about 45 microns) wollastonite (NYCO Corporation, Willsboro, N.Y.) and about 50% YK thinner (Zyp Coating, Inc., Oak Ridge, Tenn.). Prior to application, the slurry had been roll mixed on a jar mill for about 2 hours. The uncoated side of the preform was coated with a slurry comprising by weight about 90% –325 mesh (particle diameter less than about 45 microns) silicon metal powder (Atlantic Equipment Engineers, Bergenfield, N.J.) suspended in ethanol. The coatings were dried for about 6 hours in a forced air oven set at about 40° C.

A parent metal ingot measuring about 4 inches (102 mm) square by about 1 inch (25 mm) thick comprising by weight about 23 wt % silicon, about 6% zinc and the balance aluminum was polished to remove any oxide on the surface of the ingot. A bedding comprised of coarse wollastonite (NYCO Corporation, Willsboro, N.Y.) was then placed, to a depth of about 1 inch (25 mm), into the bottom of a refractory boat. The parent metal ingot was then placed into the coarse wollastonite bedding with the polished surface facing up. The coated and prefired preform was placed on top of the parent metal ingot with the silicon coating facing down. Additional coarse wollastonite was then placed into the refractory boat to a level flush with the top of the coated and prefired preform to form a growth lay-up.

The lay-up and its contents wire then placed into a resistance heated air atmosphere furnace at about room temperature. The furnace and its contents were then heated from about room temperature to about 950° C. in about 12 hours, held at about 950° C. for about 100 hours, then cooled from about 950° C. to about 800° C. in about 2 hours. At a temperature of about 800° C., the power to the furnace was interrupted, the furnace door was opened and it was observed that the ceramic matrix composite body had formed by the growth of an oxidation reaction product matrix from the parent metal into the coated and prefired preform. The ceramic matrix composite body was then removed from the surface of the parent metal alloy pool and set to the side on the bedding of coarse wollastonite. The furnace door was then closed, and the furnace and its contents were allowed to cool to about room temperature. At about room temperature, the formed ceramic matrix composite body was sandblasted to remove any residual metal or barrier material adhered to its exterior.

To prepare the novel filler material mixture containing at least one reactive component for incorporation into a slip for slip casting preforms, the method for preparing the conventional filler material slip was substantially repeated. Specifically, the about 25 kilogram of slip were prepared by combining in a twenty liter NALGENE® plastic jug (Nalgene Company, Rochester, N.Y.), about 10 kilograms of about 0.75 inch (19 mm) diameter BORUNDUM® aluminum milling media, about 6.75 kilograms of deionized water, about 1.825 kilograms of 39 CRYSTOLON® 1200 grit (average particle diameter of about 4 microns) silicon carbide, about 9.125 kilograms of fired 39 CRYSTOLON® 1000 grit silicon carbide, about 4.562 kilograms of −325 mesh utility grade silicon nitride (Elkem Metals Company, Pittsburgh, Pa.), about 1.825 kilograms of CARBOGRAN® UF-15 silicon carbide (Lonza Inc., Fair Lawn, N.J.) having an average particle diameter of about 0.8 microns and about 0.022 kilograms of a defluctulant solution comprised by weight of about 50 percent DARVAN-821A defluctulant (R. T. Vanderbilt Company, Inc., Norwalk, Conn.) and about 50 percent deionized water. Furthermore, during the growth of the parent metal through the novel preforms of the present invention, the furnace was held at about 950° C. for about 150 hours rather than about 100 hours. Additionally, rather than subjecting the as-grown ceramic matrix composite bodies to sand blasting and removing any residual metal (e.g., parent metal carcass) or barrier that had adhered to the exterior, the as-grown ceramic matrix composite bodies were placed directly into an air atmosphere furnace and a refractory plate and the furnace door was closed. The furnace and its contents were then heated from about room temperature to about 500° C. in about 2 hours, then from 500° C. to 1200° C. at about 200° C. per hour, held at 1200° C. for about 24 hours, at which time the power to the furnace was interrupted and the furnace and its contents were allowed to naturally cool to room temperature.

The conventional ceramic composite bodies and the as-grown and heat-treated novel ceramic composite bodies of the present invention were then prepared for mechanical testing.

The flexural strengths of the composites were measured using the procedure defined by the Department of the Army's proposed MIL-STD-1942A (Nov. 21, 1983). This test was specifically designed for strength measurements of high-performance ceramic materials. The flexural strength is defined in this standard as the maximum outer fiber stress at the time of failure. A four-point-¼-point flexural test was used. The flexural strengths were measured with test bars, measuring about 2 inches (50 mm) long by about 0.24 inch (6 mm) wide by about 0.12 inch (3 mm) thick, from the respective fiber reinforced ceramic composite bodies. The height and width of the test bars were measured with a precision of about 390 microinch (0.01 mm). The test bars were subjected to stress applied at four points by two lower span bearing points and two upper span bearing points. The lower span bearing points were about 1.6 inches (40 mm) apart, and the upper span bearing points were about 0.79 inch (20 mm) apart. The upper span was centered over the lower span, so that the load was applied substantially symmetrically on the test bar. The flexural strength measurements were made using a universal testing machine (Model CITS-2000/6 Syntech, Stoughton, Mass., or Model 1123, Instron Corp., Canton, Mass.). The crosshead speed during testing was about 0.02 inch per minute (0.51 mm/minute). Flexural strengths determined at about 800° C., about 1000° C., about 1300° C., and about 1400° C., were performed on the Syntech universal testing machine equipped with an air atmosphere resistance heated furnace (Advanced Test Systems, Butler, Pa.). Flexural strengths determined at about 1550° C. were performed on the Instron universal testing machine equipped with an air atmosphere furnace (Advanced Test Systems, Butler, Pa.).

The method of Munz, Shannon and Bubsey (International Journal of Fracture, Vol. 16 (1980) R137–R141) was used to determine the fracture toughness of the silicon carbide reinforced ceramic composite bodies. The fracture toughness was calculated from the maximum load of Chevron notch specimens in four point loading. Specifically, the geometry of each Chevron notch specimen was about 1.8 to 2.2 inches (45 to 55 mm) long, about 0.19 inches (4.8 mm) wide and about 0.24 inches (6 mm) high. A Chevron notch was cut in each specimen with a diamond saw to permit the propagation of a crack starting it the notch and traveling through the sample. The Chevron notched specimens, having the apex of the Chevron notch pointing downward, were placed into a fixture within a Universal test machine. The notch of the Chevron notch specimen was placed between two pins about 1.6 inches (40 mm) apart and about 0.79 inch (20 mm) from each pin. The top side of the Chevron notch specimen was contacted by two pins about 0.79 inch (20 mm) apart and about 0.39 inch (10 mm) from the notch. The maximum load measurements were made with either a Sintec Model CITS-2000/6 Universal Testing Machine (System Integration Technology Incorporated, Straton, Mass.) or a Instron Model 1123 Universal Testing Machine (Instron Corp., Carton, Mass.). A crosshead speed of 0.02 inches/minute (0.51 millimeters/minute) was used. The load cell of the Universal testing machine was interfaced to a computer data acquisition system. The Chevron notch sample geometry and maximum load were used to calculate the fracture toughness of the material. Several samples were used to determine an average fracture toughness for a given group of parameters (e.g., temperature, reinforced ceramic composite body, etc.)

Table IV contains a comparison of the average flexural strengths of conventional silicon carbide reinforced alumina composite bodies with the flexural strength of heat-treated silicon carbide reinforced composite bodies whose metallic constituent has been reduced by the present invention, at temperatures of about room temperature, about 800° C., about 1000° C., about 1300° C., about 1400° C. and about 1550° C. Specifically, Table IV shows that the average flexural strength measured at about 800°–1550° C. of the heat-treated silicon carbide reinforced alumina composites as compared to the average flexural strengths of the conventional silicon carbide reinforced alumina composite is improved.

Some ceramic matrix composite bodies formed by the present invention were subjected to heat treatments as set out in Table V. Specifically, the bodies were heat-treated at 1150° C., 1200° C., 1425° C. and 1500° C. for various times. After the ceramic composite bodies had cooled to about room temperature, the total metallic constituent content of the bodies and the composition of the metallic constituent of the bodies was determined using a standard wet chemical analysis method (NaOH Method of Dissolution for ICP Analysis, BURALCAN® Composite Casting Guidelines, Appendix 0, DURALCAN U.S.A., San Diego, Calif.). Table V sets forth the results of the chemical analysis which show that the total metal content of the heat-treated ceramic matrix composite bodies can decrease with heat-treatment. Additionally, the results indicate that the composition of the metallic constituent changes and specifically that the silicon content increases at the expense of the aluminum content of the residual parent metal.

TABLE IV

Mechanical Properties

| | Strength (MPa) | | Toughness (MPa-m$^{1/2}$) | |
|---|---|---|---|---|
| | Conventional | This Invention | Conventional | This Invention |
| RT | 476 | 379 | 7.9 | 4.4 |
| 800° C. | 213 | 343 | | |
| 1000° C. | 225 | 367 | 4.0 | 3.6 |
| 1300° C. | 235 | 275 | | |
| 1400° C. | 200 | 236 | 4.5 | 4.0 |
| 1550° C. | 123* | 293* | | |

*Significant yielding occurred.

TABLE V

Residual Metal Analyses

| | | Total Metal |
|---|---|---|
| Conventional ceramic composite body | 60% Al, 26% Si & 6% Zn | 13.5% |
| Ceramic Composite Body of this Invention | | |
| As-grown | 60% Al, 26% Si & 6% Zn | 13.5% |
| 18 h at 1150° C. | 57% Al, 33% Si & 4% Zn | 19.7% |
| 24 h at 1200° C. | 47% Al, 48% Si & 3% Zn | 14.5% |
| 6 h at 1425° C. | 54% Al, 40% Si & 5% Zn | 10.5% |
| 500 h at 1500° C. | 46% Al, 51% Si & 2% Zn | 7.0% |

Thus this Example demonstrates, among other things, that the properties of composite bodies formed by the present invention are improved related to similarly produced (i.e., non-treated according to the invention) ceramic composite bodies.

EXAMPLE 13

The present Example demonstrates, among other things, a method for forming a shaped self-supporting body by the directed oxidation of a parent metal into a filler material mixture comprising an inert component and at least one component which reacts with at least one component of the metallic constituent of the shaped self-supporting body and/or disassociates under or contiguous (e.g., subsequent to embedding at least a portion of the filler material mixture or to substantially completely embedding the filler material mixture thereby forming the self-supporting body), with the processing conditions.

Specifically, the present Example demonstrates a method for forming a net shaped hollow cylindrical self-supporting body containing at least one reactive component by the directed oxidation of an aluminum parent metal into a filler material mixture comprising silicon carbide and silicon nitride. The self-supporting body is then heat-treated at an elevated temperature to promote a reaction between at least one component of the residual aluminum parent metal and at least a portion of the embedded silicon nitride (i.e., the at least one reactive component) to form an aluminum nitride reaction product. Benefits arising out of the reaction include an increase in the ceramic content of the self-supporting body comprising the hollow cylinder and a decrease of aluminum content of the residual aluminum parent metal. That is, the residual aluminum parent metal becomes enriched with silicon upon reaction with silicon nitride, thereby producing a self-supporting body having enhanced properties (e.g., high temperature strength, corrosion resistance, oxidation resistance, etc.).

The hollow cylindrical self-supporting body of the present Example was made in several steps including: (1) preparing a sediment castable filler material mixture; (2) sediment casting a hollow cylindrical preform; (3) freezing and demolding the preform; (4) drying the preform; (5) applying a barrier mixture material to the inner surface of the hollow cylindrical preform; (6) applying an initiator material to the outer surface of the hollow cylindrical preform; (7) assembling a growth setup to grow the parent metal into the hollow cylindrical preform; (8) growing the self-supporting body comprising the hollow cylinder; (9) patching ungrown portions of the self-supporting body comprising the hollow cylinder; (10) growing into the patched portions to complete the formation of the self-supporting body comprising the hollow cylinder body; and (11) heat-treating the self-supporting body comprising the hollow cylinder. A discussion of these and other steps follows.

About 14 kilograms of a sediment casting mixture comprising nominally by weight 46% 16 grit (average particle diameter of about 1660 microns) green silicon carbide (Exolon, Tonawanda, N.Y.), about 12.5% 90 grit (average particle diameter of about 216 microns) green silicon carbide (Exolon, Tonawanda, N.Y.), about 25.1% –325 mesh (particle diameter less than 45 microns) silicon nitride (Elkem Materials, Inc., Pittsburgh, Pa.), about 0.1% 581-B blank defoamer (Colloids, Inc., Newark, N.J.), about 15.1% deionized water and about 1.2% Elmer's® professional polyvinyl acetate glue (Borden Company, Columbus, Ohio) was prepared. Specifically, the defoamer, the Elmer's® professional polyvinyl acetate glue and deionized water were combined in a stainless steel bowl and hand mixed until a homogeneous solution was formed. Subsequently, the 16 grit (average particle diameter of about 1660 microns) green silicon carbide, the 90 grit (average particle diameter of about 216 microns) green silicon carbide and the –325 mesh (average particle diameter less than about 45 microns) silicon nitride were combined with the homogeneous solution. This combination was then mixed by hand to eliminate any agglomeration of materials while assuring that the silicon nitride and silicon carbide filler materials were fully wetted. The mixing was completed after about 10 minutes thereby forming a sediment castable filler material mixture.

A three piece aluminum mold was then assembled so as to form a hollow cylindrical cavity having a outer diameter measuring about 7.6 inches (193 mm), an inner diameter measuring about 5.5 inches (140 mm) and a height measuring at least about 14.25 inches (368 mm). The aluminum mold was then placed onto a Syntron Model VR5D1 vibration table (FMC Corporation, West Reading, Pa.). After the oscillator to the vibrating table was turned on, the intensities setting for the oscillator was adjusted to a level such that the aluminum mold would vibrate without moving along the surface of the table. Handfuls of the sediment castable filler material mixture were then deposited into the cavity of the aluminum mold to fill the mold at about ½ (13 mm) increments. To assure the even distribution and aid in the deaering of the castable filler material mixture, a polyethylene rod having a diameter of about 0.5 inches (13 mm) and a length of about 2 feet (60 mm) was inserted into the cavity of the aluminum mold and contacted with the castable slurry material. The steps were repeated until the cavity of the aluminum mold was substantially completely filled. Then the vibrating table and the substantially filled mold were allowed to vibrate for about 1 hour. During this time, the solids in the castable filler material mixture settled thereby exposing the solution at the top of the mold. The solution was removed from the mold using, in combination, a coarse pipet and a sponge. Once the solution had been removed, the aluminum mold and its contents were allowed to sit in air at about room temperature for about an hour while the vibrating table remained on.

The aluminum mold and its contents were then placed into a freezer set at about −15° F. (−20° C.) approximately at the center of the freezer. After about 8 hours, the mold and its contents were removed from the freezer and the now frozen preform was removed from the aluminum mold by disassembling it.

The frozen preform was then placed onto a loose bed of 24 grit (average particle diameter of about 1035 microns) green silicon carbide particulate supported by an about 0.25 inch (6.5 mm) aluminum plate. The cylindrical perform was stabilized to prevent it from rolling thereby forming a drying setup. The drying setup was placed into a convection oven (Blue M, Blue Island, Ill.), set at about 71° C. (160° F.) for about 14 hours. Upon removal from the furnace, any 24 grit (average particle diameter of about 1035 microns) green silicon carbide which had adhered to the outer surfaces of the hollow cylindrical preform was removed, to prepare the preform for coating with growth initiator mixture and barrier material mixture.

A barrier material mixture comprising by weight about 60% −325 mesh (average particle diameter less than about 45 microns) NYAD®SP wollastonite (purchased from East Tech, Philadelphia, Pa.), about 34% commercially available isopropyl alcohol, and about 6% of a solution comprising 5 weight percent KLUCEL® "L" hydroxyl propylcellulose (Aqualon Company, Wilmington, Del.) and the balance ethyl alcohol was prepared. Specifically, the about 5 weight percent KLUCEL® "L"/ethyl alcohol solution was prepared by combining about 100 grams of KLUCEL® "L" with about 1900 grams of commercially available ethyl alcohol. After the KLUCEL® "L"/ethyl alcohol solution was prepared, the −325 mesh (particle diameter less than about 45 microns) wollastonite, the commercially available isopropyl alcohol, the about 5 percent KLUCEL® "L"/ethyl alcohol solution and about 1.8 kilograms of ¼ inch (6.5 mm) diameter alumina mixing media were combined in a one gallon NALGENE® plastic jar. The jar was closed and sealed and then placed on a jar mill for about 45 minutes. The jar and its contents were then removed from the jar mill and the contents were poured through a colander to separate the ¼ inch (6.5 mm) diameter alumina mixing media from the barrier mixture.

Figure 8:
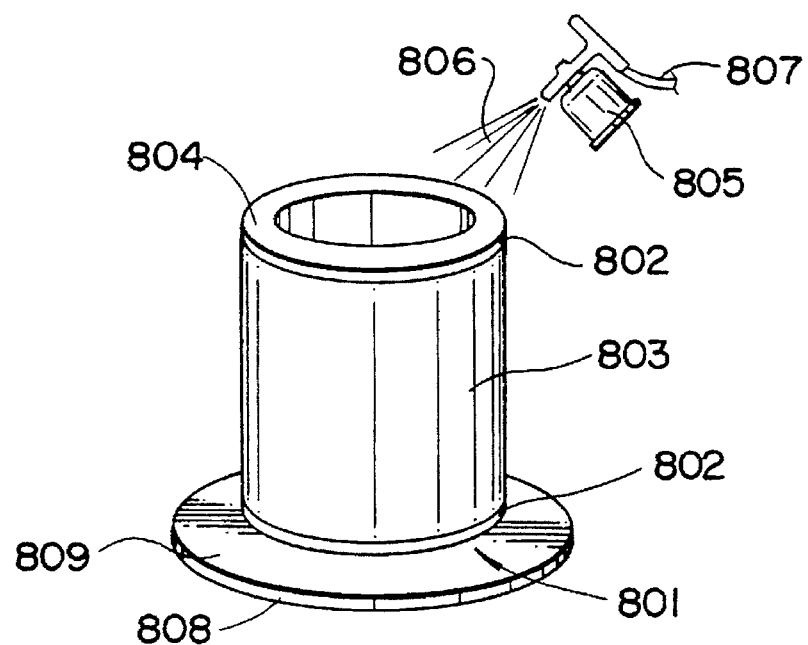
FIG. 8 s a schematic of the barrier application step of Example 13.

In the meantime, the hollow cylindrical preform was prepared for barrier coating. Specifically, as depicted in FIG. 8, the inner surface of the hollow cylindrical preform 804 was prepared for a spray coating by covering the outer surface with a piece of brown paper 803 held in position on the outer surface of the preform with commercially available masking tape 802. The paper covered hollow cylinder preform 804 was then placed onto a turn table 808 also covered with brown paper 809. The reservoir chamber 805 of a Binks spray gun having a devilbiss JGV-560 nozzle (Binks, Franklin Park, Ill.) was filled with the barrier material mixture. The compressed air supplied through hose 807 was set at about 20 pounds per square inch (1.046 kilograms per square centimeter). The spray of barrier material 806 from the spray gun was inpinged at about a 45° angle with the inner surface of the hollow cylindrical preform 804 as the turn table 808 was rotated thereby coating the inner surface of the hollow cylindrical preform. In about 15 minutes, after the barrier material mixture dried as a coating on the inner surface of the cylindrical preform, the brown paper on the outer surface of the hollow cylindrical preform was removed, thereby preparing the hollow cylindrical preform for the application of a growth initiator mixture.

A growth initiator mixture comprising by weight about 18% of an about 5% by weight KLUCEL® "L"/ethynol solution, about 1.3% Bentone inorganic thixotropic agent, about 30.7% isopropyl alcohol, and about 50% 200 grit (average particle diameter of about 73 microns) silicon metal powder. After the ingredients for the growth initiator mixture were combined in a plastic jar and the jar was sealed, the jar and its contents were mixed by vigorously hand shaking the jar. The growth initiator mixture was then placed into a reservoir jar of a Model 62-2 Paasche airbrush. The hollow cylindrical preform was replaced on the turn table. The growth initiation mixture material was then spray coated on the outer surface of the hollow cylindrical preform to a thickness of at least 0.02 inches (0.5 mm). After allowing the growth initiator mixture to dry for about 30 minutes, the hollow cylindrical preform was completed for incorporation into a growth lay-up.

Figure 9:
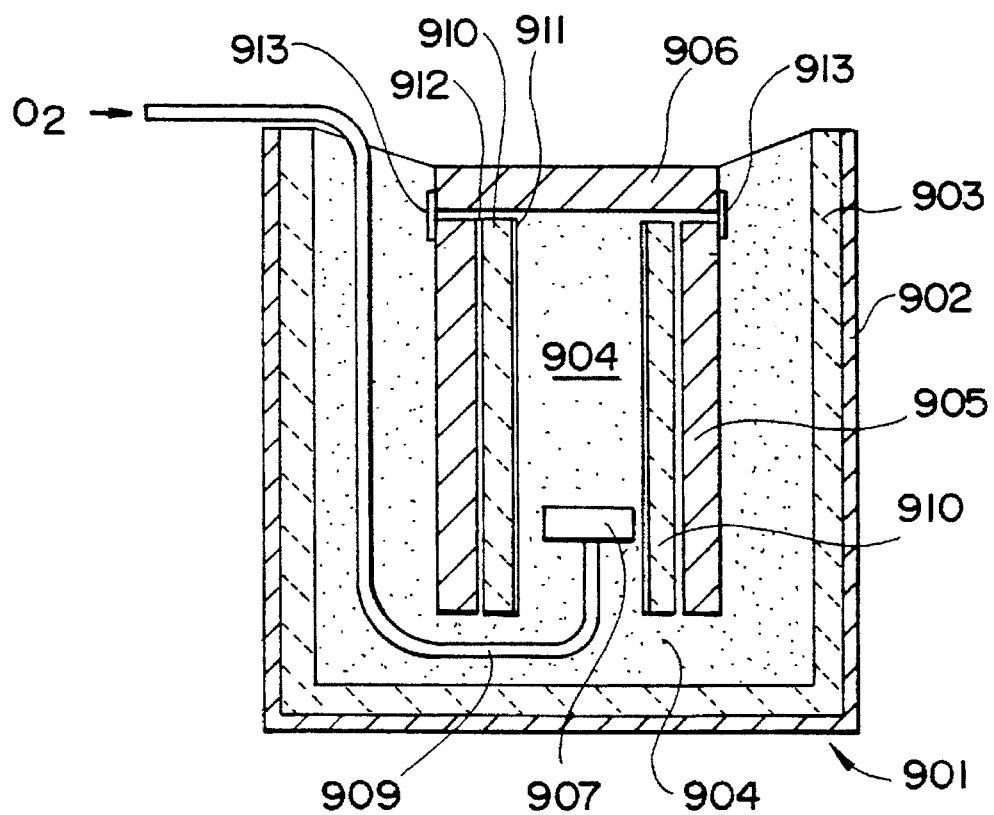
FIG. 9 is a cross-sectional schematic drawing of the growth lay-up used to produce the ceramic composite body of Example 13.

The growth lay-up is depicted in FIG. 9. Specifically, a refractory boat 903 made from 3000 CASTOLAST® castable powder (C.E. Refratories, Valley Forge, Pa.) and supported by a steel shell 902 was obtained. NYAD®SP coarse wollastonite (purchased from East Tech, Philadelphia, Pa.) was poured into the bottom of the refractory boat 903 and leveled to make a layer of about 2 inches (51 mm) in the bottom of the refractory boat 903. A stainless steel tube 909 having a 0.25 inch (6.4 mm) outer diameter was bent to the configuration as depicted in FIG. 9 and embedded into the wollastonite material about an inch (25 mm) below the surface of the 2 inch (51 mm) wollastonite layer. A reticulated ceramic foam 907 measuring about 2.75 inches (69.9 mm) in diameter and about an inch (25 mm) thick and having a receptacle measuring about 0.5 inch (12.7 mm) in diameter and about ½ (12.7 mm) high was placed on the end of the stainless steel tube 909. The reticulated ceramic (HiTech Ceramics, Inc., Alfred, N.Y.) comprised about 92 percent alumina and had about 20 pores per inch (0.79 pores per mm). The hollow cylindrical preform 910 coated with a growth initiator layer 912 and a barrier material layer 911 was then placed coaxially with respect to the stainless steel tube 909 projecting upward from the bottom of the refractory boat 902 and the reticulated ceramic 907. The inner diameter of the hollow cylinder 910 was then filled with NYAD®SP coarse wollastonite 909 and a hollow cylinder of parent metal alloy ingot 905 weighing about 10 kilograms and comprising by weight about 14.5% Si, 3.5% Cu, 3.0%, Zn, 0.25% Mg, 0.90% Fe, and the balance Al and having an inner diameter of about ⅛ inch (3.2 mm) greater than the outer diameter of the preform and being substantially the same length as the preform was placed so that its inner surface faced the outer surface of the growth initiator layer 912 coated surface of the preform. A parent metal alloy cap 906 weighing about 6 kilograms and having substantially the same composition as the hollow cylinder of parent metal alloy ingot 905 was then placed in contact with the hollow cylinder parent metal ingot 905. The gap between the hollow cylinder of parent metal ingot 905 and the cap of parent metal ingot 906 was covered with commercially available duct tape 913. The remaining space between the outer surface of the parent metal ingots and wall of the refractory boat 903 was then filled with coarse wollastonite material as schematically depicted in FIG. 9 thereby completing the formation of the growth lay-up.

The growth lay-up and its contents were then placed into an air atmosphere resistance heated furnace. The oxygen supply line 909 was connected to a gaseous oxygen source and the furnace door was closed. The furnace and its contents were then heated from about room temperature to about 910° C. at about 100° C. per hour, held at about 910° C. while flowing substantially pure oxygen through the supply line 909 at a flow rate of about 20 cubic feet per hour, for about 550 hours and then cooled from about 910° C. to about 810° C. at about 160° C. per hour. At about 810° C. the power to the furnace was disconnected and the hollow cylindrical self-supporting body was then removed from the furnace using metal tongs and wrapped with a commercially available refractory ceramic fiber blanket to insulate the body thereby forming a cooling lay-up. The insulated self-supporting body was allowed to cool to about room temperature. The insulated self-supporting body was then disassembled to reveal that the parent metal had grown into and embedded most of the preform; however, minor portions of the inner diameter of the preform were incompletely grown.

The minor portions of the preform in which incomplete growth had occurred were then patched with a filler material mixture substantially as described above. Then, an additional preform layer comprising by weight about 50% 90 grit (average particle diameter of about 216 microns) silicon carbide and about 50% –325 mesh (particle diameter less than about 45 microns) silicon nitride was placed on the entire inner diameter of the partially grown hollow cylindrical self-supporting body. A barrier material mixture layer was then applied to the partially grown hollow cylindrical self-supporting bodies substantially according to the methods described above.

A growth lay-up, substantially as described above, was again assembled and the lay-up as placed into the air atmosphere furnace for about 300 hours substantially according to the steps described above.

At about room temperature, the cooling lay-up formed substantially as described above was disassembled to reveal that the oxidation reaction product had grown into and embedded the patched portions of the self-supporting body thereby forming a hollow cylindrical ceramic matrix composite body comprising an alumina oxidation reaction product embedding silicon nitride and silicon metal filler material The hollow cylindrical self-supporting ceramic matrix composite body was then prepared for heat-treatment. The entire surface of the hollow cylindrical self-supporting body was spray coated with a barrier material mixture substantially according to the methods described above for applying the barrier material mixture soley to the inner diameter of the hollow cylindrical preform. Specifically, a heat treatment lay-up was formed by placing the hollow cylindrical self-supporting ceramic matrix composite body in a refractory boat substantially the same as that used in the growth lay-up. The hollow cylindrical self-supporting ceramic matrix composite body was then surrounded substantially completely along both the inner and outer diameter as well as the top with course NYAD®SP wollastonite (purchased from East Tech, Philadelphia, Pa.) to form the heat treatment lay-up. The heat treatment lay-up and its contents were then placed into air atmosphere resistance heated furnace and the furnace door was closed. The furnace and its contents were then heated from about room temperature to about 1200° C. at about a 100° C. per hour, held at about 1200° C. for about 24 hours and after about 24 hours, the power to the furnace was interrupted and the furnace and its contents were allowed to naturally cool to about room temperature. At about room temperature, the furnace door was opened and the heat treatment lay-up was disassembled. It revealed a hollow cylindrical self-supporting ceramic matrix composite body. During the heat treatment at least a portion of the silicon nitride embedded by the alumina oxidation reaction product was converted to aluminium nitride when at least a portion of the residual aluminum parent metal within the ceramic matrix composite body reacted with at least a portion of the silicon nitride filler material. Through this heat treatment the ceramic content of the hollow cylindrical self-supporting body increased while simultaneously the composition of the residual metallic constituent increased in silicon content. By this heat treatment a self-supporting ceramic matrix composite body suitable for use in chemically agressive wear environments was produced.

EXAMPLE 14

The present Example, among other things, presents:

1. The characterization of the mechanical and physical properties of a self-supporting ceramic composite body produced according to the methods of the present invention;
2. The characterization of the flexural strength and fractural toughness at elevated temperatures for a self-supporting ceramic composite body produced according to the methods of the present inventions.
3. The characterization of the phases that develop as a function of temperature and time at temperature in a self-supporting ceramic composite body produced according to the methods of the present invention;
4. The flexural strength measured at 1000° C., and subsequently thermally aged, at various temperatures and for various times for a self-supporting ceramic composite body produced according to the methods of the present invention, and
5. The coating thickness developed during the thermal aging on the surface of self-supporting ceramic composite bodies of the present invention as a function of thermal aging temperature and time at temperature.

Figure 10:
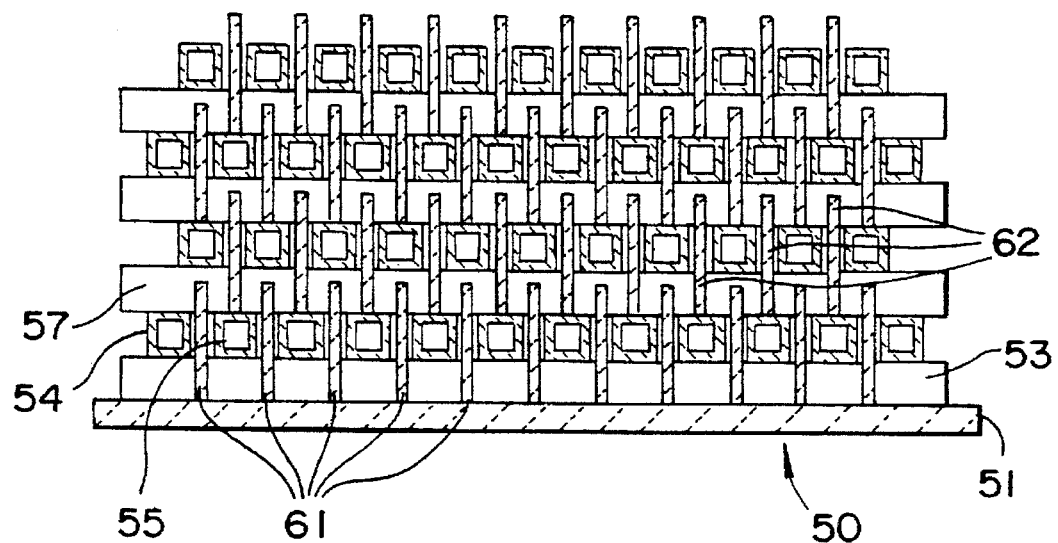
FIG. 10 is a cross-sectional schematic of the prefire lay-up used in Example 14.

The self-supporting ceramic composite bodies of the present Example were formed substantially according to the methods described in Example 11 except:

1. The polyvinyl alcohol/deionized water solution comprised by weight about 15% rather than about 30% polyvinyl alcohol and was mixed for about 35 rather than about 25 minutes;
2. About 0.02% by weight COLLOID™ 581B defoamer (a proprietary blend obtained from Colloids, Inc., Newark, N.J.) was added to the contents of the stainless steel mixing tank to form the slurry mixture for spray drying;
3. The specific gravity of the slurry mixture for spray drying ranged between about 1.80 and 2.0 g/cm$^3$ rather than about 1.86 to 1.9 g/cm$^3$;
4. The viscosity of the slurry mixture prior to spray drying measured between about 180 to 280 centipoise rather than between about 200 to 300 centipoise;
5. The outlet temperature in the spray dryer measured about 140° C. rather than 180° C.;
6. The pressing mixture was passed through a 25 mesh (opening of about 710 microns) sieve prior to pressing;
7. The pressed preforms (about 210 preforms) were arranged as dipicted in FIG. 10 for firing. The firing was done in an air atmosphere furnace into which substantially pure gaseous oxygen was supplied at a rate of about 300 cubic feet per hour to create an oxygen content within the furnace of between about 60 and 65 percent by volume;

8. The barrier material applied to the fired preforms was permitted to dry for at least 30 minutes at least rather than at least one hour prior to applying a second barrier coat; and 9. The bedding material used the heat treatment of the grown ceramic composite bodies comprised LONZA® T150-600 graphite (Lonza, Inc., Fair Lenon, N.J.). The spacing and arrangement of the grown ceramic composite bodies was such that up to 5 layers of grown ceramic composite bodies were contained in a single heat treatment boat.

Some of the resultant self-supporting ceramic composite bodies were then prepared to determine the mechanical and physical properties of the composite at about room temperature; the flexural strength and fracture toughness at about 1000°, 1200°, 1325°, 1450°, 1500° and 1550° C.; as well as the effect of thermal aging at 1200°, 1300°, 1400° and 1500° C. for 24, 100 and 500 hours respectively on (1) the weight change of the self-supporting ceramic matrix bodies, (2) the phases that developed in the bodies during thermal aging in air, and (3) the effect of thermal aging on the flexural strength measured at 1000° C.

Table VII sets forth mechanical and physcially properties of the self-supporting ceramic composite produced according to the methods of the present invention. The specific properties measured for the self-supporting ceramic composite include hardness, flexural strength, compressive strength, fracture toughness, bulk density, elastic or Young's modulus, shear modulus, bulk modulus, Poisson's ratio, coefficient of thermal expansion (CTE) and volume resistivity.

The flexural strength and fracture toughness reported in this Example were measured substantially according to the methods described in Example 12. The compressive strength reported in this Example was measured according to ASTM designation C 73–88: Standard Test Method for Compressive (Crushing) Strength of Fired White Wear Materials except that, to accomodate the physical limitations of the MTS Servo Hydraulic Testing Machine, Model 810 materials test system with a capacity of 100 kilonewtons, (MTS Corporation, Minneapolis, Minn.), a bearing plate measured approximately 2.5 inches (6.4 mm) in diameter by about 0.5 inches (13 mm) thick, contact cylinders measured about 0.5 inches (13 mm) high and about 1 inch (25 mm) in diameter the specimen dimensions measured about 0.220 inch±0.001 inch (5.58 mm±0.025 mm) in diameter by about 0.500 inch±0.002 inch (12.70 mm±0.051) in length were used.

The Young's or elastic modulus, shear modulus and Poisson's ratio were measured by using ASTM standard recommended practice of E-494-75 (reapproved in 1980). Equipment to effect these measurements included a Textronic 2465BDM 400 Mhz oscilloscope, a Panametrix Pulsar Reciever, Model 5055PR; longitudinal wave and transverse wave transducers having about 0.25 inch (6.4 mm) diameter and operating at a frequency of about 5 Mhz; and glycerin was used as a couplant for the longitudinal wave transducer while honey was used for a couplant of the tranverse waves transducer.

The coefficient of thermal expansion (CTE) was measured using a Unitherm dilatometer system, Model 1161 (Anter Laboratories, Inc., Pittsburgh, Pa.). The CTE (25°–600° C.) results shown in Table VII were determined by ramping up the samples of the self-supporting ceramic composite body at a rate about 2° C./minute to 600° C., holding about 600° C. for about 10 minutes, and then ramping down from about 600° C. to about 25° C. at a rate of about 2° C./minute. Throughout the entire ramp up and ramp down steps the ambient air atmosphere contacted the samples.

Table VIII sets forth the flexural strength and fracture toughness at elevated temperatures for self-supporting ceramic composite body of the present invention. Specifically, Table VIII sets forth flexural strength and fracture toughness measure at about 25°, 1000°, 1200°, 1325°, 1450°, 1500° and 1550° C. The properties set forth in Table VIII were measured substantially according to the methods described in Example 12.

Figure 11:
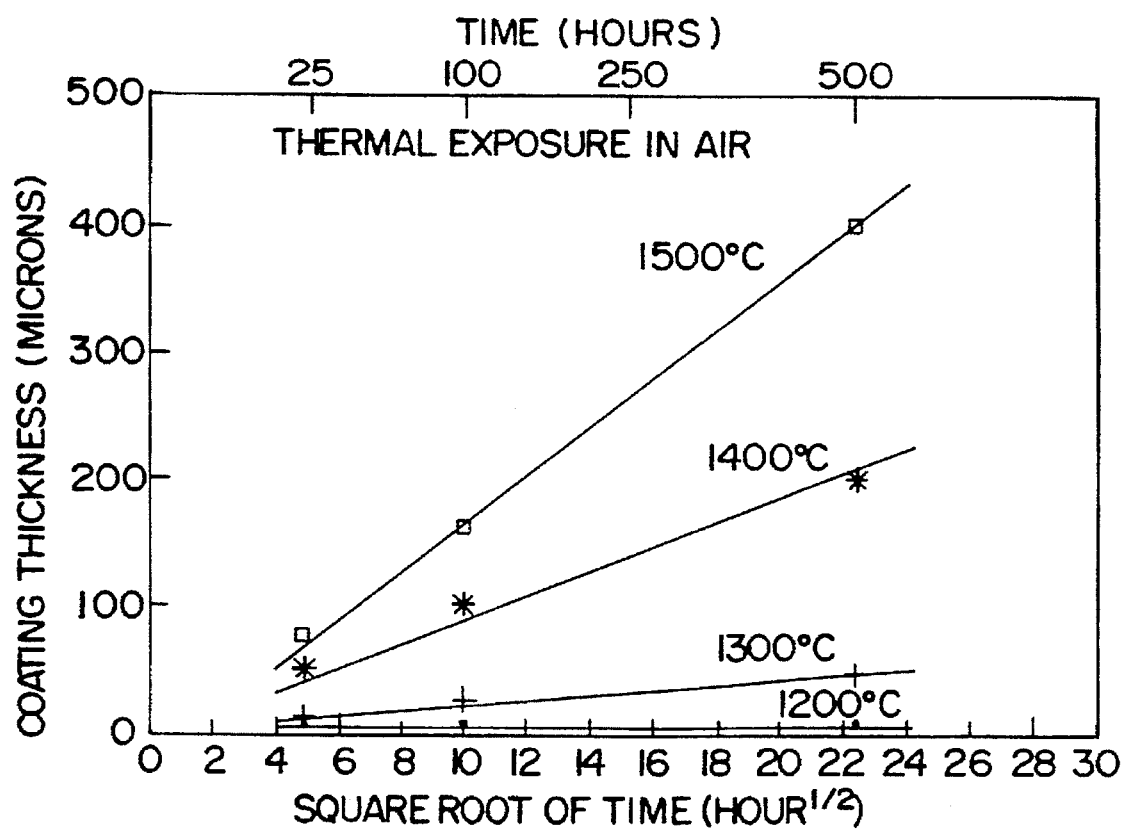
FIG. 11 is a graph of the coating thickness formed during thermal aging as a function of the square root of time at temperature.

In addition to measuring properties of the self-supporting ceramic composite body formed according to the methods of the present invention and set forth in Table VII and elevated temperature flexural strength and fracture toughness of the self-supporting ceramic composite body of the present invention as set forth in Table VIII, samples of the self-supporting ceramic composite body of the present example were thermally aged at 1200°, 1300°, 1400° and 1500° C. for 24, 100, and 500 hours to determine the effect of thermal aging on the self-supporting ceramic composite bodies of the present invention. Tables IX, X, XI, XII, XIII and XIV set forth percent weight gain after thermal aging, the various phases found in the thermally aged bodies after a particular temperature and time at temperature, the flexural strength measured at 1000° C. after thermal aging at a particular temperature and time at temperature, the coating thickness formed on self-supporting ceramic composite body after a particular temperature and a time at temperature, coating thickness verses the square root of time after a particular temperature and time at temperature and the raw data for the weight changes. The samples for this thermal aging test, were prepared in a manner substantially as described in Example 12 for flexural strength measurement and fracture toughness measurement samples. After the samples had been prepared, and supported at both, by a commercially available alumina rod, the samples were placed in an air atmosphere furnace at the appropriate temperature for the appropriate time. After the samples had been thermally aged, the percent weight change for each sample was determined as set forth in Table IX. The fracture toughness of the thermally aged samples was measured at 1000° C. results as set forth Table XI. Portions of the samples were submitted for x-ray diffraction analysis substantially as described in Example 12 the results of which are set forth in Table X. The numbers in the parenthesis next to a compound indicate the relative intensity for the particular compound after a given time at a given temperature. Additionally, samples were mounted and polished for metallographic examination. The coating thickness as a function of thermal aging time and temperature was measured. These results are set forth in Table XII and represented in Table XIII as a function of the square root of time. Data from Table XIII has been plotted in FIG. 11 to show the linear relationship between coating thickness as a function of the square root of time at temperature. Finally, Table XIV sets forth the actual weight gains for some of the samples characterized in the present example.

Figure 12A:
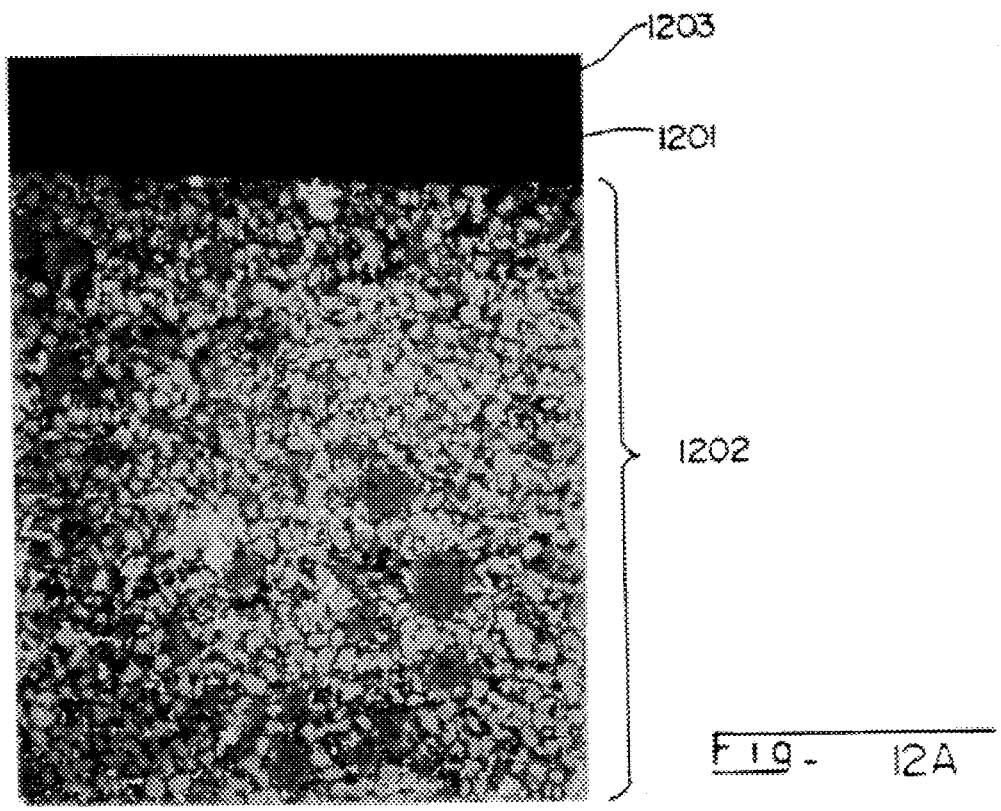
FIGS. 12A, 12B and 12C show photomicrographs at a magnification of about 200× of the microstructures of samples in a region proximate to the surface of the samples formed in Example 14 to illustrate the microstructure of the self-supporting ceramic composite body after a 24, 100, and 500 hour thermal aging at 1200° C.
Figure 12B:
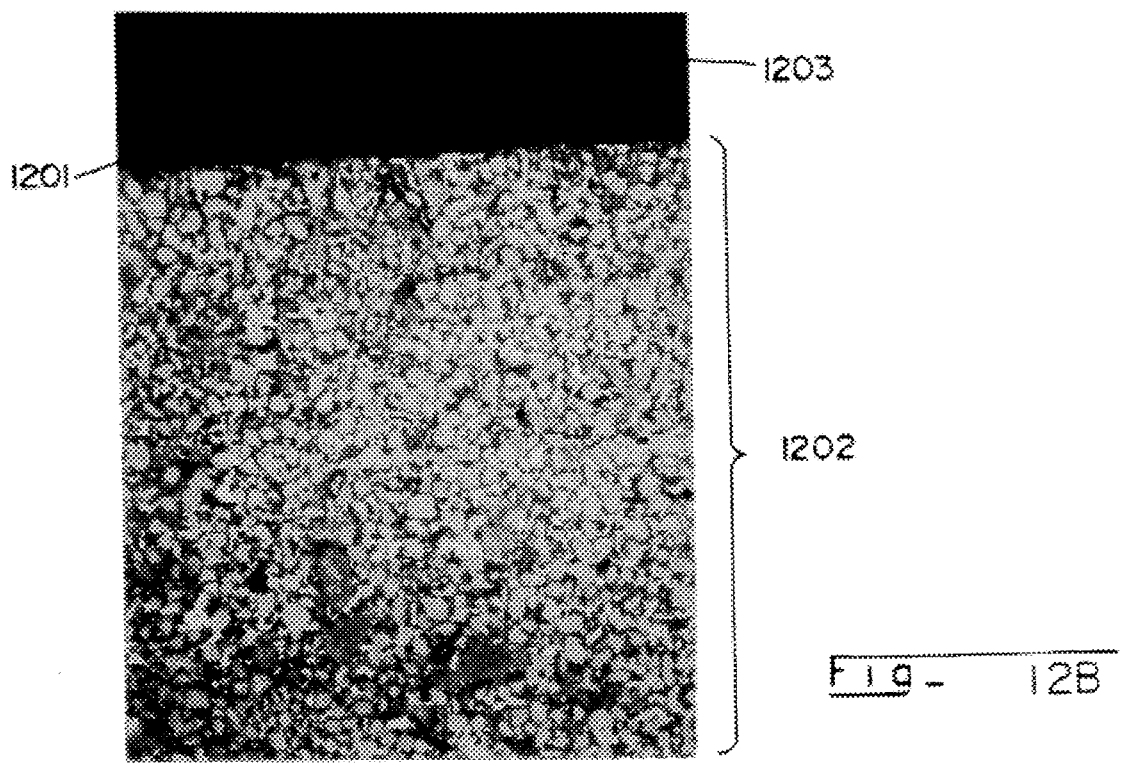
Figure 12C:
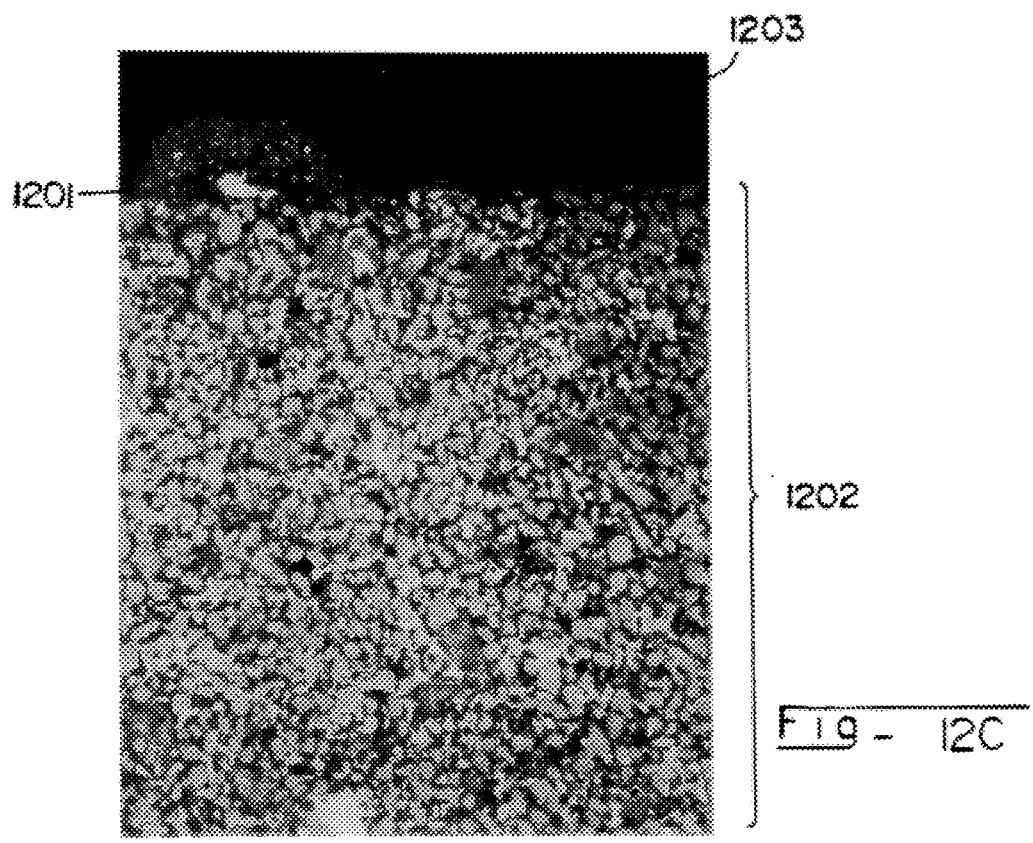

FIGS. 12A, 12B and 12C show photomicrographs at a magnification of about 200× of the microstructures of samples in a region proximate to the surface of the samples to illustrate the microstructure of the self-supporting ceramic composite body after a 24, 100, and 500 hour thermal aging at 1200° C.

Figure 12D:
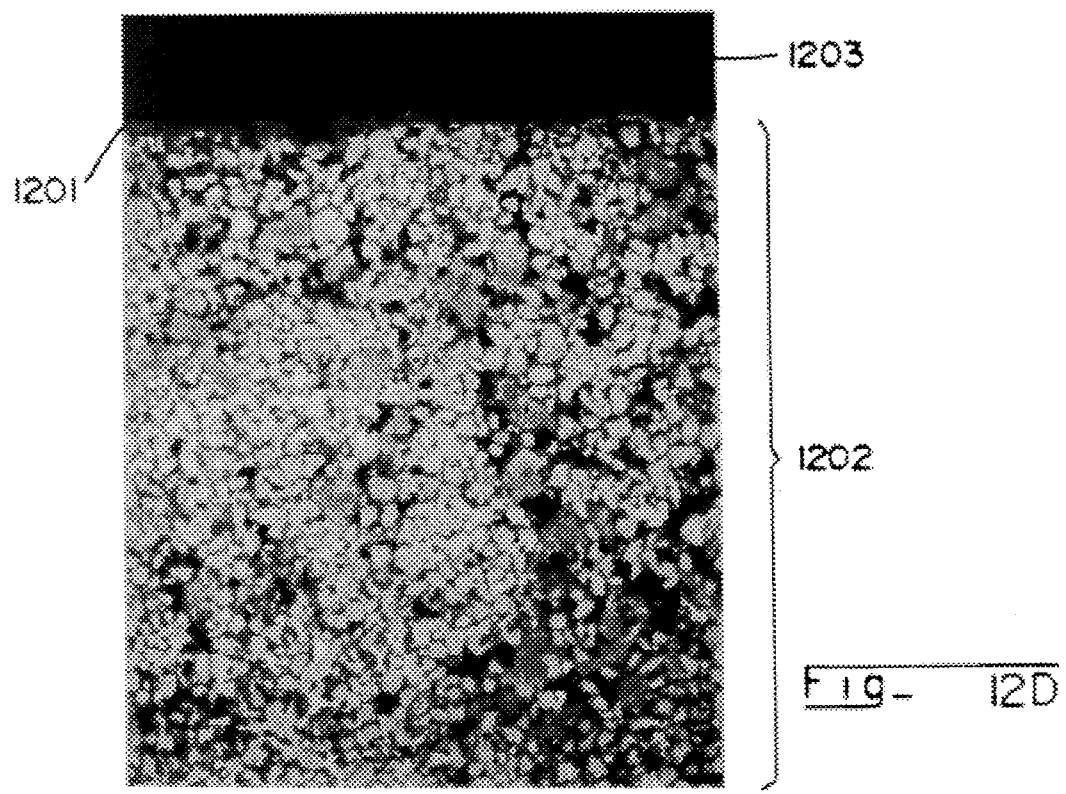
FIGS. 12d, 12E and 12F show photomicrographs at a magnification of about 200× of the microstructures of the samples formed in Example 14 in a region proximate to the surface of the samples to illustrate the microstructure of the self-supporting ceramic composite body after a 24, 100, and 500 hour thermal aging at 1300° C.
Figure 12E:
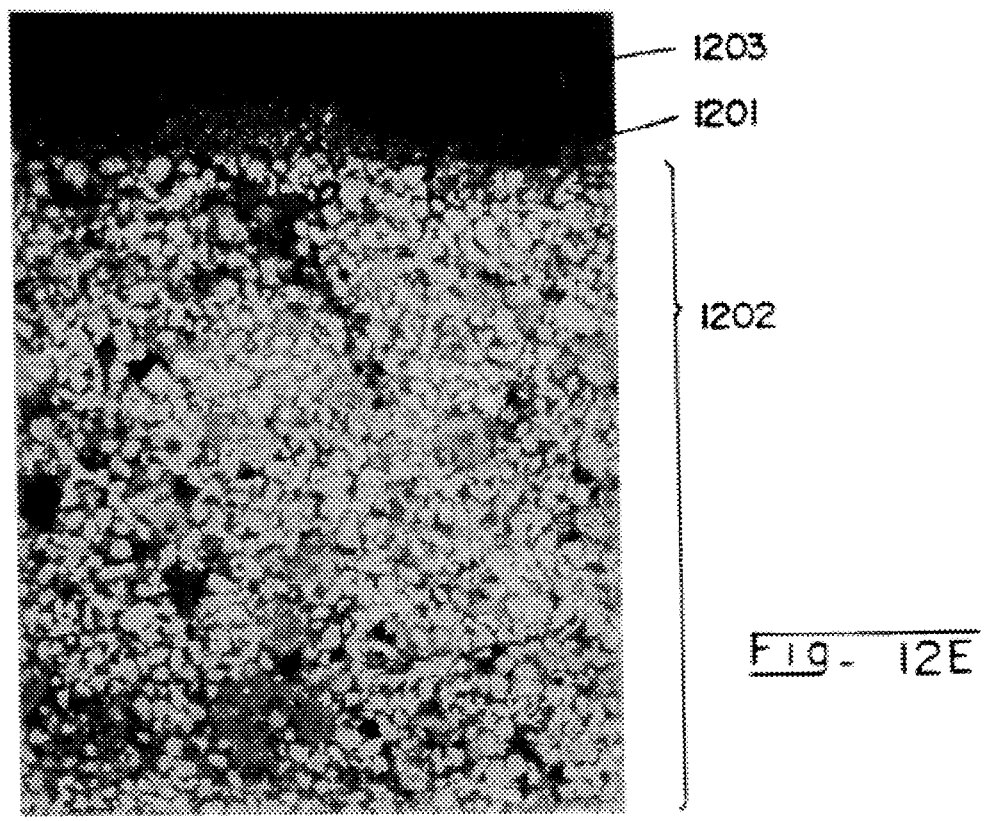
Figure 12F:
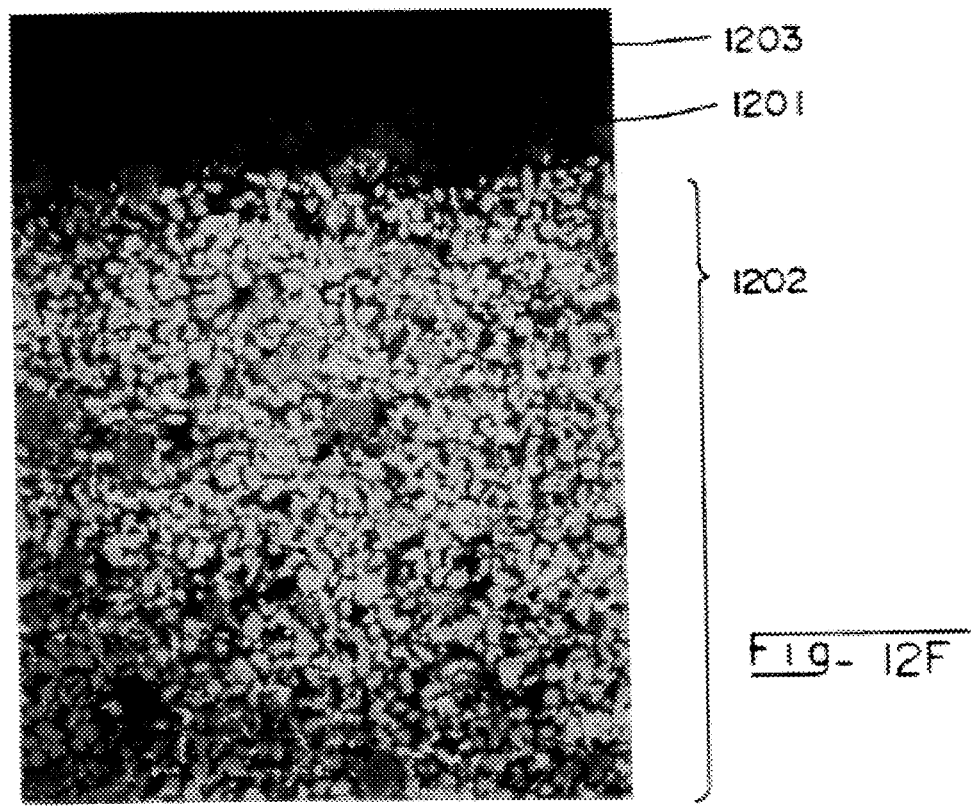

FIGS. 12D, 12E and 12F show photomicrographs at a magnification of about 200× of the microstructures of the samples in a region proximate to the surface of the samples to illustrate the microstructure of the self-supporting ceramic composite body after a 24, 100, and 500 hour thermal aging at 1300° C.

Figure 12G:
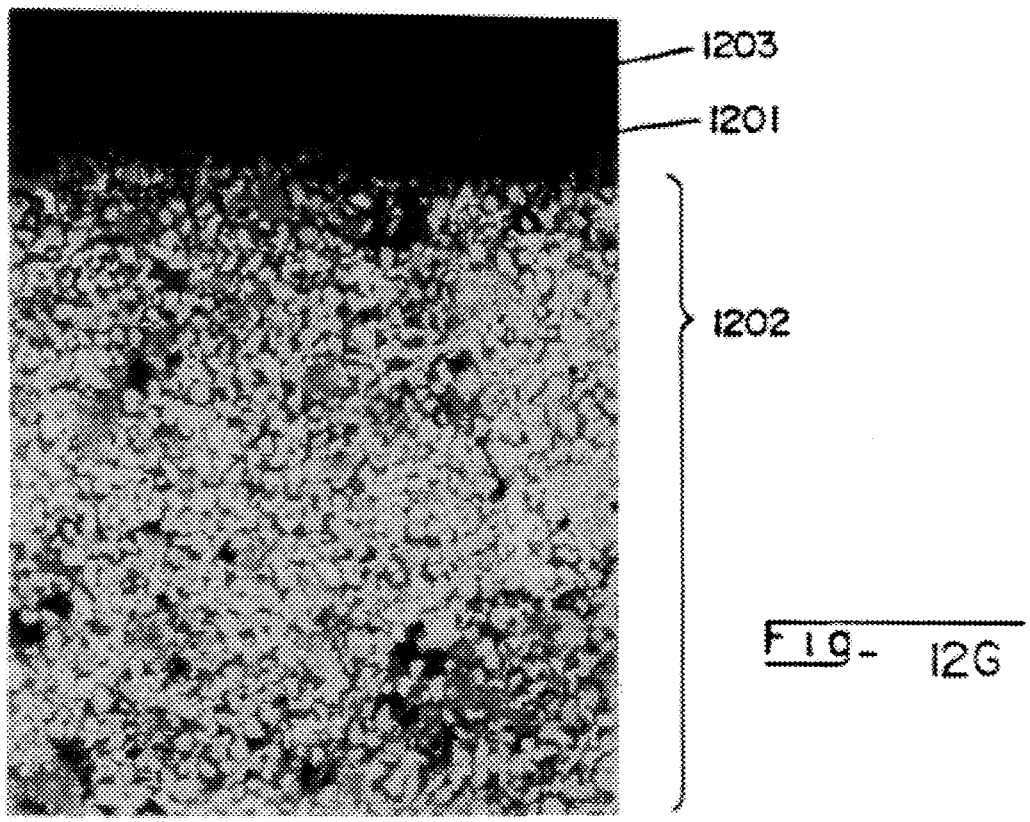
FIGS. 12G, 12H and 12I show photomicrographs at a magnification of about 200× of the microstructures of the samples formed in Example 14 in a region proximate to the surface of the samples to illustrate the microstructure of the self-supporting ceramic composite body after a 24, 100, and 500 hour thermal aging at 1400° C.
Figure 12H:
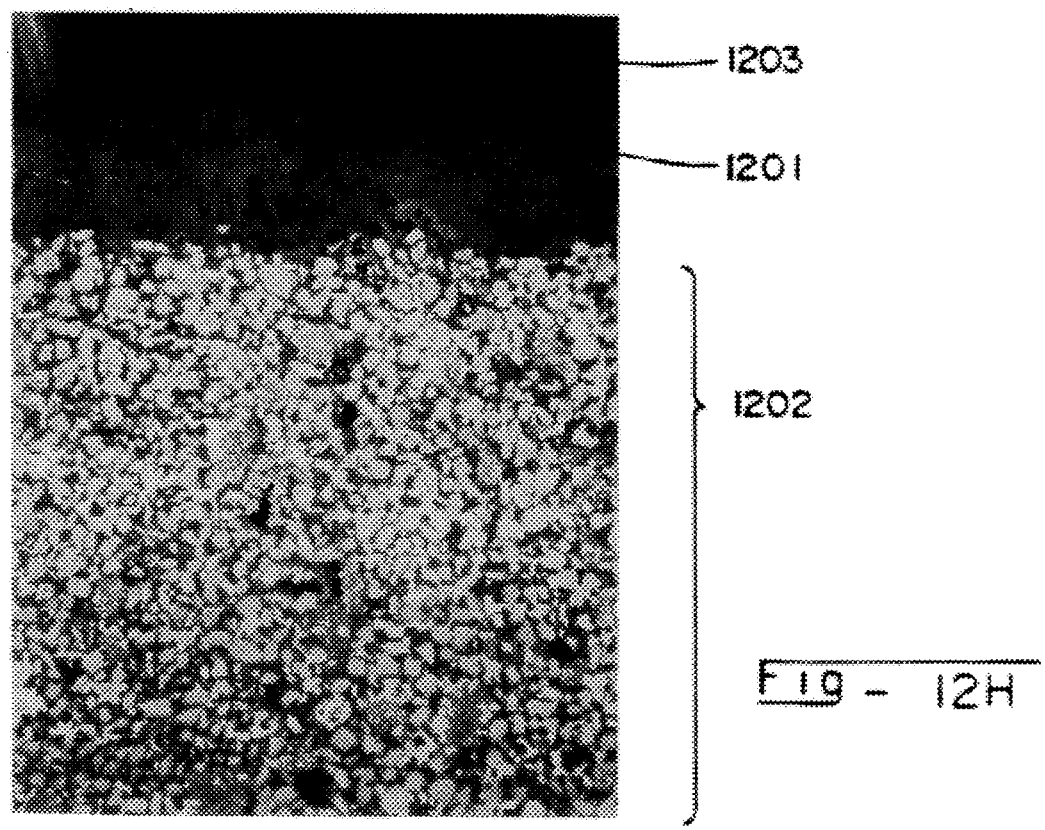
Figure 12I:
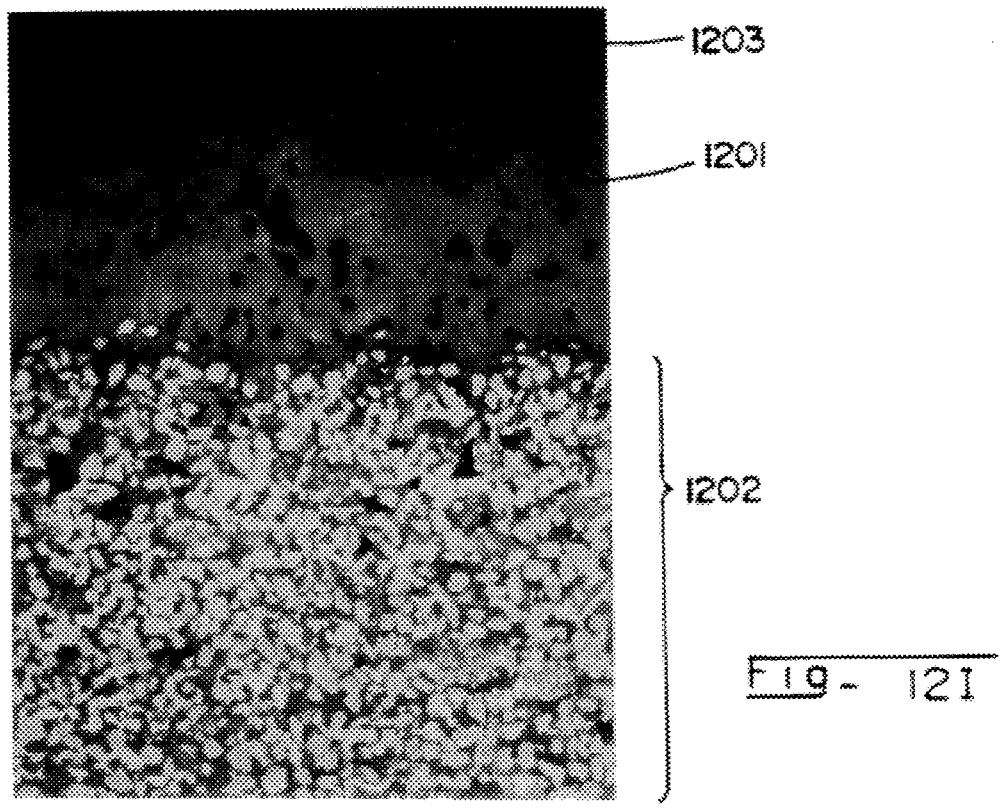

FIGS. 12G, 12H and 12I show photomicrographs at a magnification of about 200× of the microstructures of the samples in a region proximate to the surface of the samples to illustrate the microstructure of the self-supporting ceramic composite body after a 24, 100, and 500 hour thermal aging at 1400° C.

Figure 12J:
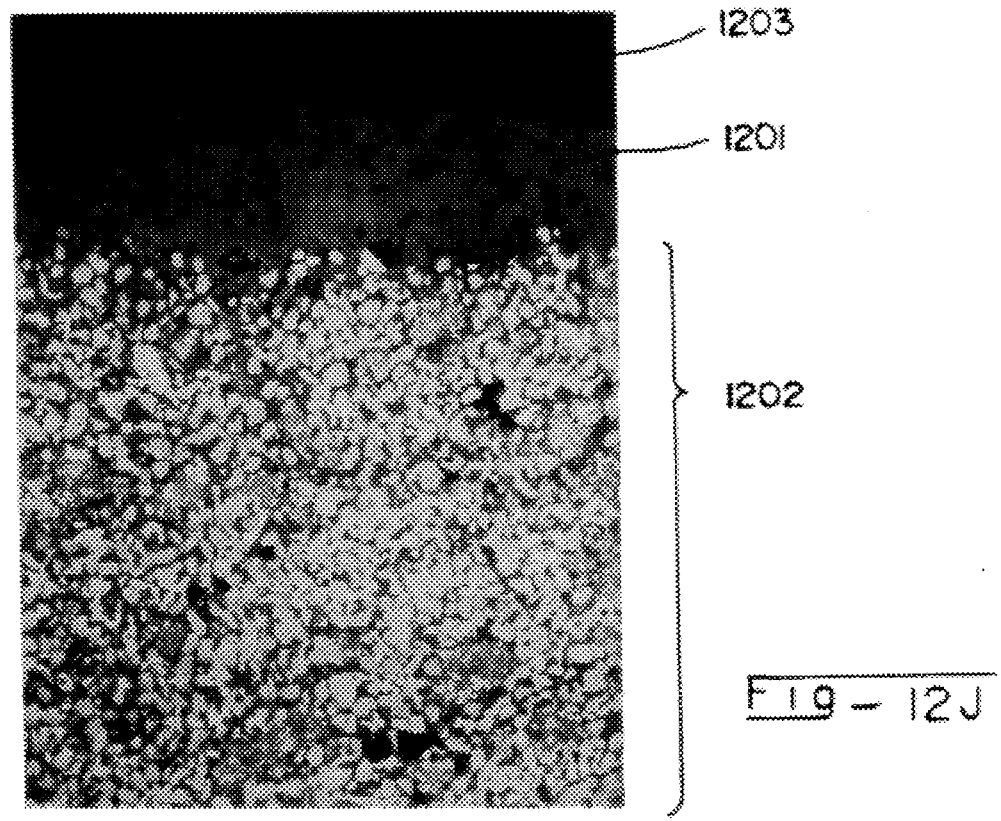
FIGS. 12J, 12K and 12L show photomicrographs at a magnification of about 200× of the microstructures of the samples formed in Example 14 in a region proximate to the surface of the samples to illustrate the microstructure of the self-supporting ceramic composite body after a 24, 100, and 500 hour thermal aging at 1500° C.
Figure 12K:
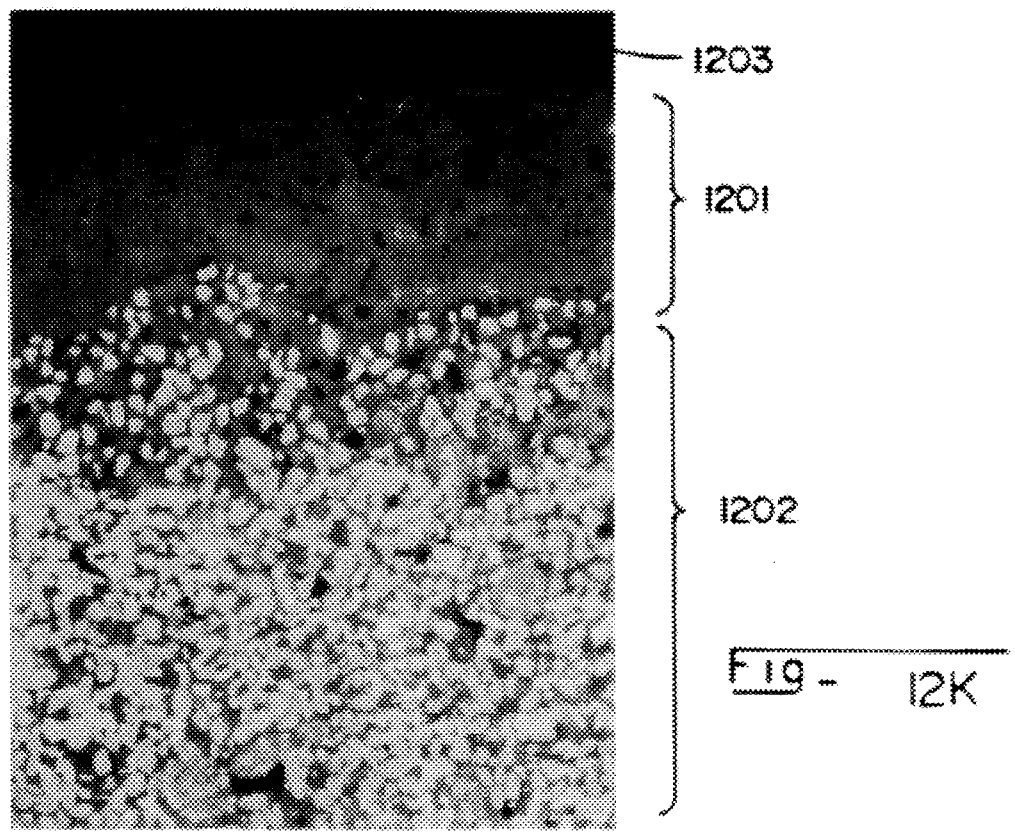
Figure 12L:
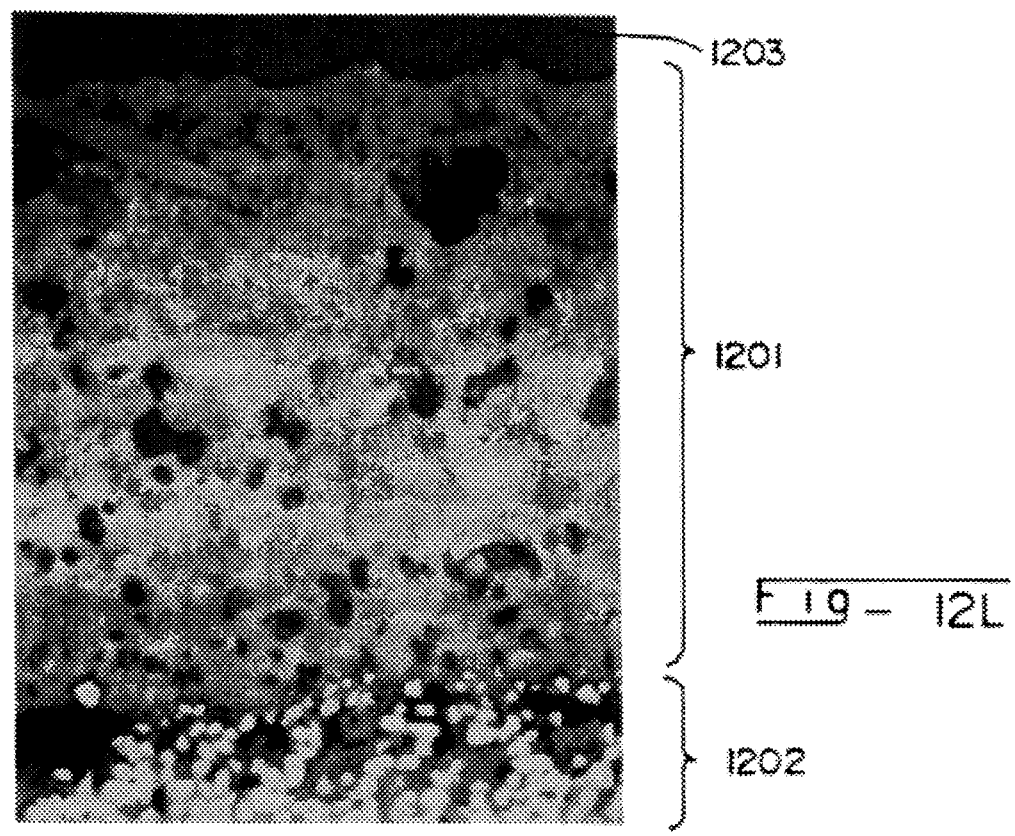

FIGS. 12J, 12K and 12L show photomicrographs at a magnification of about 200× of the microstructures of the samples in a region proximate to the surface of the samples to illustrate the microstructure of the self-supporting ceramic composite body after a 24, 100, and 500 hour thermal aging at 1500° C.

The surface coating formed on the body is designated by the numberal 1201, the composite is designated by the numeral 1202, and the sample mounting compound is designated 1203.

Thus, this example presents detailed characterization of the self-supporting ceramic composite body of the present invention. First, characterization of the self-supporting ceramic matrix composite body with respect to its mechanical and physical properties at room temperature and at elevated temperatures were presented. Then, the characteristics of self-supporting ceramic matrix composite body after thermal aging were presented.

While the present invention has been described with a certain degree of particularity, it is to be understood that the invention should not be limited to the subject matter described herein, and modifications of the invention which would occur to those skilled in the art, are also intended to be within the spirit of the invention, as defined in the claims appended hereto.

TABLE VIII

Flexural Strenth and Fracture Toughness at Elevated Temperatures

| Temperature | Strength(MPa) | Toughness(MPa·m$^{1/2}$) |
|---|---|---|
| 25 | 322 ± 35 | 4.8 ± 0.4 |
| 1000 | 288 ± 8 | 4.3 ± 0.4 |
| 1200 | 205 ± 15 | 3.5 ± 0.5 |
| 1325 | 195 ± 12 | 2.9 ± 0.09 |
| 1450 | 198 ± 14 | 3.2 ± 0.4 |
| 1500 | 217 ± 24 | — |
| 1550 | 209 | 4.1 ± 0.8 |

**Extensive yielding occurred during flexural strength test

TABLE IX

Percent Weight Gain After Thermal Aging in Air

| Exposure Time | Aging Temperature | | | |
|---|---|---|---|---|
| | 1200° C. | 1300° C. | 1400° C. | 1500° C. |
| 24 hours | 0.32% | 0.81% | 1.36% | 2.20% |
| 100 hours | 0.25% | 1.37% | 2.43% | 3.76% |
| 500 hours | 0.25% | 1.60% | 4.71% | 10.76% |
| | | 2.13% | 5.11% | |

TABLE VII

MECHANICAL AND PHYSICAL PROPERTIES OF COMPOSITE

| PROPERTY | UNITS | MEAN | 95% CONFIDENCE INTERVAL |
|---|---|---|---|
| Knoop Hardness, 10 kg | kg/mm$^2$ | 1240 | 1210–1260 |
| Flexural Strength | MPa | 321 | 313–329 |
| Compressive Strength | MPa | 2620 | 2550–2670 |
| Fracture Toughness | MPa-m$^{1/2}$ | 4.43 | 4.18–4.68 |
| Bulk Density | g/cc | 3.33 | 3.32–3.34 |
| Young's Modulus | GPa | 329 | 327–331 |
| Shear Modulus | GPa | 134 | 133–135 |
| Bulk Modulus | GPa | 199 | 197–201 |
| Poisson's Ratio | | 0.225 | 0.224–0.226 |
| CTE (25°–600° C.) | × 10$^{-6}$/K° | 5.6 | 5.5–5.7 |
| Volume Resistivity | Ohm-cm | 0.2 | 0.1–0.3 |

TABLE X

Relative X-ray Diffraction Peak Intensities Measured for Various Phases after Thermal Aging in Air

| Time | Aging Temperature | | | |
|------|---------|---------|---------|---------|
|  | 1200° C. | 1300° C. | 1400-°C. | 1500° C. |
| 24 h | $Al_2O_3(100)$* | $Al_2O_3(100)$ | $Al_2O_3(71)$ | Mullite(100) |
|  | SiC(77) | $MgAl_2O_4(37)$ | Mullite(62) | $Al_2O_3(10)$ |
|  | $MgAl_2O_4(58)$ | SiC(28) | $MgAl_2O_4(28)$ | $SiO_2(2)$ |
|  | Si(31) | Si(19) | SiC(16) |  |
|  | AlN(19) | AlN(10) | Si(7) |  |
| 100 h | $MgAl_2O_4(100)$ | $Al_2O_3(88)$ | Mullite(100) | Mullite(100) |
|  | SiC(87) | $MgAl_2O_4(60)$ | $Al_2O_3(11)$ |  |
|  | $Al_2O_4(71)$ | SiC(23) |  |  |
|  | Si(35) | Mullite(21) |  |  |
|  | AlN(19) | $CaSiO_3(11)$ |  |  |
|  | $CaAl_2Si_2O_8(7)$ | Si(11) |  |  |
| 500 h | SiC(100) | $CaAl_2Si_2O_8(57)$ | Mullite(100) | Mullite(100) |
|  | $Al_2O_3(90)$ | Mullite(48) | $Al_2O_3(7)$ |  |
|  | $MgAl_2O_4(47)$ | $Al_2O_3(23)$ |  |  |
|  | Si(34) |  |  |  |
|  | AlN(27) | Second Sample | Second Sample |  |
|  |  | $Al_2O_3(100)$ | Mullite(100) |  |
|  |  | $MgAl_2O_4(77)$ |  |  |
|  |  | Mullite(62) |  |  |
|  |  | $Mg_2Al_4Si_5O_{18}(30)$ |  |  |
|  |  | SiC(9) |  |  |

*Numbers in parentheses are Relative Peak Intensities

TABLE XI

Flexural Strenth Measured At 1000-°C. after Thermal Aging

| Exposure Time | Aging Temperature | | | |
|------|---------|---------|---------|---------|
|  | 1200° C. | 1300° C. | 1400° C. | 1500° C. |
| 24 hours | *236 MPa | 206 MPa | 206 MPa | 136 MPa |
| 100 hours | 308 | 166 | 209 | 125 |
| 500 hours | 210 | 151 | 127 | 87 |

*Results are based on only 1 sample except for 500 h at 1300 and 1400° C. which had 2 samples each.
**1000° C. Strength for Unaged Material = 288 MPa

TABLE XII

Coating Thickness (Microns) as a Function of Thermal Aging Time & Temperature

| Exposure Time | Aging Temperature | | | |
|------|---------|---------|---------|---------|
|  | 1200° C. | 1300° C. | 1400° C. | 1500° C. |
| 24 hours | 5 um | 10/15 | 40/60 | 80/110 |
| 100 hours | 7 | 25/60 | 65/100 | 120/160 |
| 500 hours | *5/10 | 40/50 | 100/200 | 400/480 |

*Results are based on only 1 sample, except for 500 h at 1300 and 1400° C. which had 2 samples each. Bold face numbers reflect localized deviations from the apparent average thickness.

TABLE XIII

Coating Thickness (Microns) vs the Square Root of Time

| (Exp. Time)$^{1/2}$ | Aging Temperature | | | |
|------|---------|---------|---------|---------|
|  | 1200° C. | 1300° C. | 1400° C. | 1500° C. |
| 4.90 h$^{1/2}$ | 5 um | 10/15 | 40/60 | 80/110 |
| 10 h$^{1/2}$ | 7 | 25/60 | 65/100 | 120/160 |
| 22.36 h$^{1/2}$ | *5/10 | 40/50 | 100/200 | 400/480 |

TABLE XIV

Raw Data for Weight Changes

| Exposure Time | Thermal Aging Temperature | | | |
|------|---------|---------|---------|---------|
|  | 1200° C. | 1300° C. | 1400° C. | 1500° C. |
| 24 hours |  |  |  |  |
| before | 1.9790 g | 1.9832 | 1.9786 | 1.9879 |
| after | 1.9853 | 1.9992 | 2.0055 | 2.0316 |
| 100 hours | 1.9832 | 1.9871 | 1.9905 | 1.9777 |
|  | 1.9881 | 2.0143 | 2.0334 | 2.0605 |
| 500 hours | 1.9737 | 1.9916 | 1.9851 | 1.9859 |
|  | 1.9813 | 2.0234 | 2.0786 | 2.1996 |
|  |  | 1.9843 | 1.9784 |  |
|  |  | 2.0265 | 2.0795 |  |

We claim:

1. A method for producing a ceramic body comprising infiltrating a permeable mass with an oxidation reaction product obtained by oxidation of a precursor metal comprising aluminum to form a polycrystalline material comprising (i) the oxidation reaction product of said precursor metal with a vapor-phase oxidant, and (ii) a metallic phase, said method comprising the steps of:

(a) forming a permeable mass comprising a filler material and at least one second material selected from the group consisting of boron carbide and silicon nitride or a preform of filler material and at least one second material selected from the group consisting of boron carbide and silicon nitride;

(b) orienting said permeable mass and a source of said precursor metal relative to each other so that formation of said oxidation reaction product of said precursor metal will occur into said permeable mass and towards said oxidant;

(c) heating said source of precursor metal and said permeable mass in the presence of said oxidant to a temperature above the melting point of said precursor metal but below the melting point of said oxidation reaction product to form a body of molten precursor metal;

(d) reacting said body of molten precursor metal with said oxidant at said temperature to permit said oxidation reaction product to form;

(e) maintaining at least a portion of said oxidation reaction product in contact with and between said molten precursor metal and said oxidant at said temperature to progressively draw molten precursor metal through said oxidation reaction product towards said oxidant to permit fresh oxidation reaction product to continue to form at an interface between said oxidant and previously formed oxidation reaction product that has infiltrated said permeable mass, and reacting said molten precursor metal with said at least one second material in said permeable mass, thereby forming at least one reaction product; and (f) continuing step (e) at said temperature for a time sufficient to infiltrate at least a portion of said permeable mass with said polycrystalline material, thereby forming said ceramic body comprising (a) said oxidation reaction product; and (b) a metallic constituent comprising unreacted precursor metal and (c) at least one reaction product, wherein said at least one reaction product has a specific volume greater than the specific volume of said at least second material.

2. A method for producing a ceramic body comprising infiltrating a permeable mass with an oxidation reaction product obtained by oxidation of a precursor metal to form a polycrystalline material comprising (i) the oxidation reaction product of said precursor metal with a vapor-phase oxidant, and (ii) a metallic phase, said method comprising the steps of;

(a) forming a permeable mass comprising a filler material and at least one second material or a preform of filler material and at least one second material;

(b) orienting said permeable mass and a source of said precursor metal relative to each other so that formation of said oxidation reaction product of said precursor metal will occur into said permeable mass towards said oxidant;

(c) heating said source of precursor metal and said permeable mass in the presence of said oxidant to a temperature above the melting point of said precursor metal but below the melting point of said oxidation reaction product to form a body of molten precursor metal;

(d) reacting said body of molten precursor metal with said oxidant at said temperature to permit said oxidation reaction product to form;

(e) maintaining at least a portion of said oxidation reaction product in contact with and between said molten precursor metal and said oxidant at said temperature to progressively draw molten precursor metal through said oxidation reaction product towards said oxidant to permit fresh oxidation reaction product to continue to form at an interface between said oxidant and previously formed oxidation reaction product that has infiltrated said permeable mass;

(f) continuing step (e) at said temperature for a time sufficient to infiltrate at least a portion of said permeable mass with said polycrystalline material, thereby forming said ceramic body comprising (a) said oxidation reaction product; (b) a metallic constituent comprising unreacted precursor metal and (c) said at least one second material; and (g) contiguously heating said ceramic composite body to a temperature above the melting point of at least a portion of said unreacted precursor metal and reacting said unreacted precursor metal with at least a portion of said at least one second material, thereby forming at least one reaction product, wherein said at least one reaction product has a specific volume greater than the specific volume of said at least one second material.

3. A method for producing a ceramic body comprising infiltrating a permeable mass with an oxidation reaction product obtained by oxidation of a precursor metal to form a polycrystalline material comprising (i) the oxidation reaction product of said precursor metal with a vapor-phase oxidant, and (ii) a metallic phase, said method comprising the steps of:

(a) forming a permeable mass comprising a filler material and at least one second material or a preform of filler material and at least one second material;

(b) orienting said permeable mass and a source of said precursor metal relative to each other so that formation of said oxidation reaction product of said precursor metal will occur into said permeable mass and towards said oxidant;

(c) heating said source of precursor metal and said permeable mass in the presence of said oxidant to a temperature above the melting point of said precursor metal but below the melting point of said oxidation reaction product to form a body of molten precursor metal;

(d) reacting said body of molten precursor metal with said oxidant at said temperature to permit said oxidation reaction product to form;

(e) maintaining at least a portion of said oxidation reaction product in contact with and between said molten precursor metal and said oxidant at said temperature to progressively draw molten precursor metal through said oxidation reaction product towards said oxidant to permit fresh oxidation reaction product to continue to form at an interface between said oxidant and previously formed oxidation reaction product that has infiltrated said permeable mass;

(f) continuing step (e) at said temperature for a time sufficient to infiltrate at least a portion of said permeable mass with said polycrystalline material, thereby forming said ceramic body comprising (a) said oxidation reaction product; (b) a metallic constituent comprising unreacted precursor metal and (c) at least one second material;

(g) cooling said ceramic body;

(h) heating said ceramic body to a temperature above the melting point of at least a portion of said metallic constituent of said ceramic body; and (i) continuing step (h) at said temperature for a time sufficient to at least partially react said at least a portion of said metallic constituent and said at least one second material to form at least one reaction product, thereby producing said ceramic body comprising (a) said oxidation reaction product; (b) a metallic constituent comprising said unreacted metallic constituent; and at least one reaction product, wherein said at least one reaction product has a specific volume greater than the specific volume of said at least one-second material.

4. The method of claim 1, wherein said at least one reaction product comprises at least one material selected from the group consisting of aluminum boride aluminum borocarbide and aluminum nitride.

5. The method of claim 1, comprising providing a source of additional metal in contact with said previously formed oxidation reaction product.

6. The method of claim 5, wherein said source of additional metal comprises a metal having a composition substantially the same as said source of precursor metal.

7. The method of claim 5, wherein said source of additional metal comprises a metal having a composition substantially different from said source of precursor metal.

8. The method of claim 1, wherein said reacting of said molten precursor metal with said at least one second material is limited primarily to a surface of said composite body.

9. The method of claim 2, wherein said source of precursor metal comprises aluminum.

10. The method of claim 9, wherein said at least one second material comprises at least one material selected from the group consisting of boron carbide titanium oxide silicon nitride, molybdenum oxide and mixtures thereof.

11. The method of claim 9, wherein said at least one reaction product comprises at least one material selected from the group consisting of aluminum boride, aluminum borocarbide, aluminum-titanium intermetallic, aluminum nitride, aluminum oxide and molybdenum silicide.

12. The method of claim 2, wherein said at least one reaction product in combination with any liberated components into the metallic constituent occupy a smaller volume than the combined volume of at least said at least one second material in said permeable mass and said reacting molten precursor metal.

13. The method of claim 2, further comprising providing a source of additional metal in contact with said ceramic composite body.

14. The method of claim 13, wherein said source of additional metal comprises a metal having a composition substantially the same as said metallic constituent of said ceramic body.

15. The method of claim 12, wherein said source of additional metal comprises a metal having a composition substantially different from the composition of the metallic constituent of the composite body.

16. The method of claim 2, wherein said reacting of said unreacted precursor metal with said at least one second material is limited primarily to a surface of said composite body.

17. The method of claim 2, wherein said reacting of said unreacted precursor metal with said at least one second material comprises substantially complete reaction.

18. The method of claim 12, wherein said at least one second material comprises at least one material selected from the group consisting of boron carbide and silicon nitride.

19. The method of claim 3, wherein said source of precursor metal comprises aluminum.

20. The method of claim 19, wherein said at least one second material comprises at least one material selected from the group consisting of boron carbide, titanium oxide, silicon nitride, molybdenum oxide and mixtures thereof.

21. The method of claim 19, wherein said at least one reaction product comprises at least one material selected from the group consisting of aluminum boride, aluminum borocarbide, aluminum-titanium intermetallic, aluminum nitride, aluminum oxide and molybdenum silicide.

* * * * *